Figure 1:
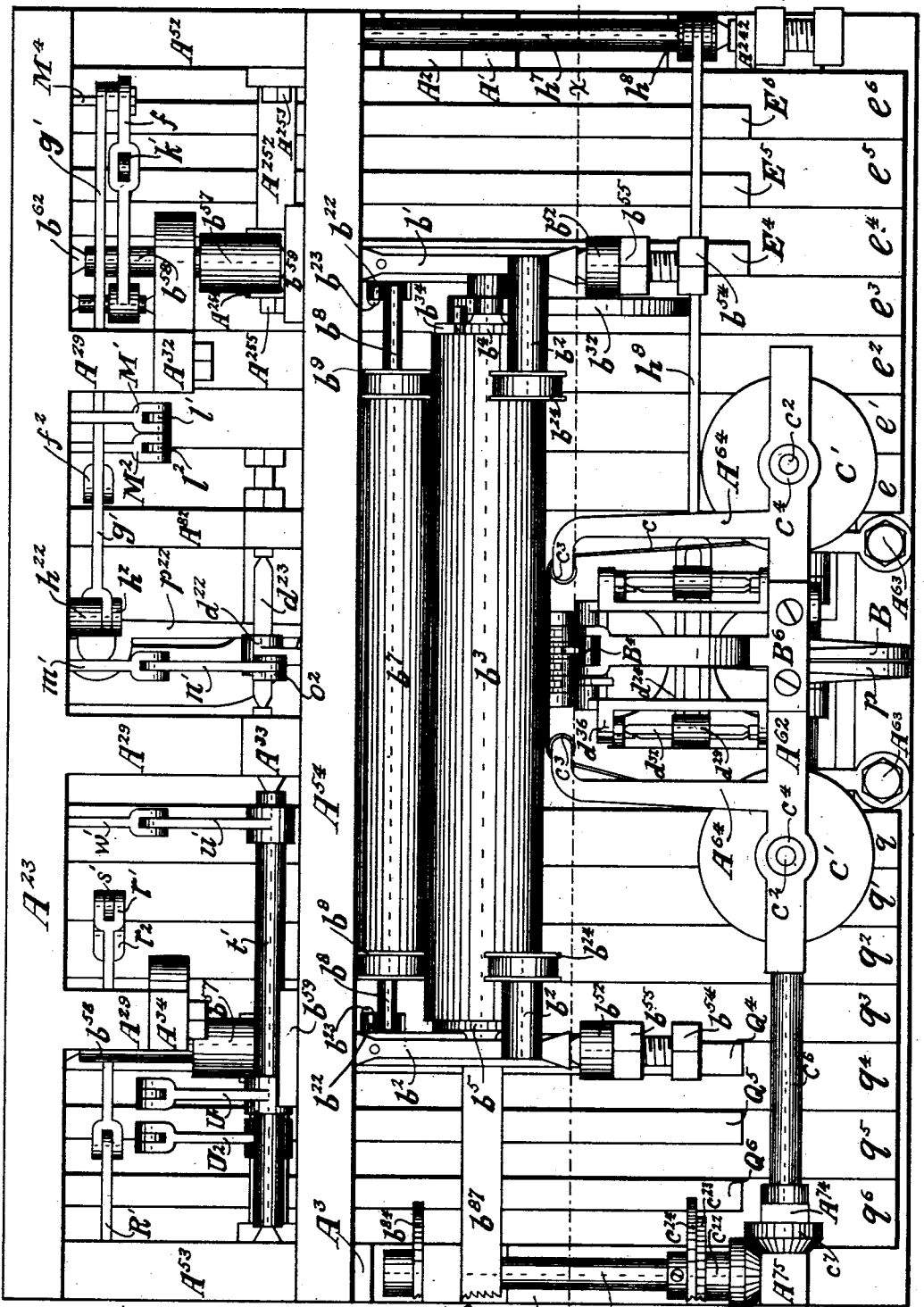

(No Model.) 32 Sheets—Sheet 2.

T. CAHILL.
TYPE WRITING MACHINE.

No. 541,222. Patented June 18, 1895.

Attest: Arthur T. Cahill, M. H. Cahill.
Inventor: Thaddeus Cahill.

(No Model.) 32 Sheets—Sheet 3.
T. CAHILL.
TYPE WRITING MACHINE.
No. 541,222. Patented June 18, 1895.
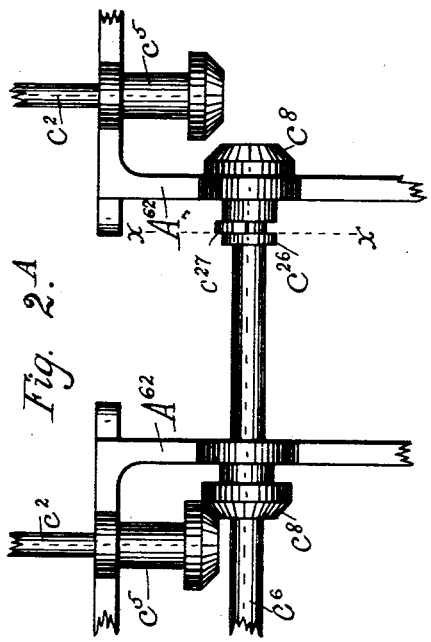
Fig. 2.A.
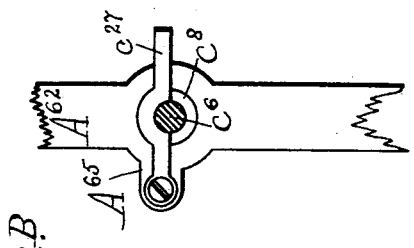
Fig. 2.B.
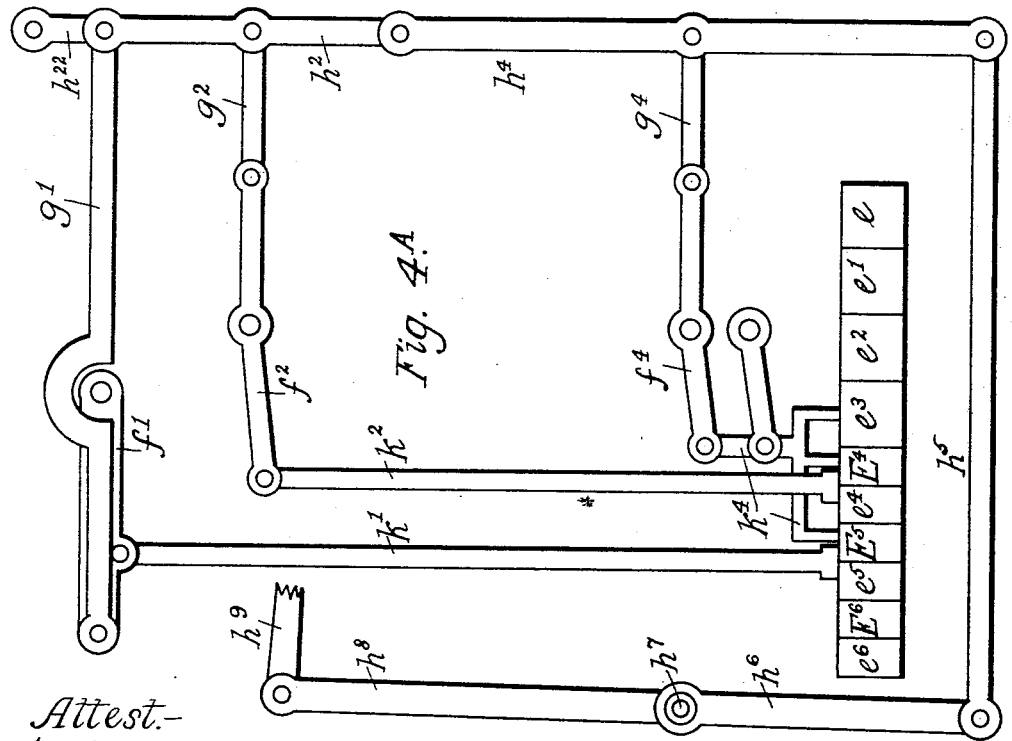
Fig. 4.A.
Attest:
Arthur T. Cahill,
M. H. Cahill
Inventor:
Thaddeus Cahill

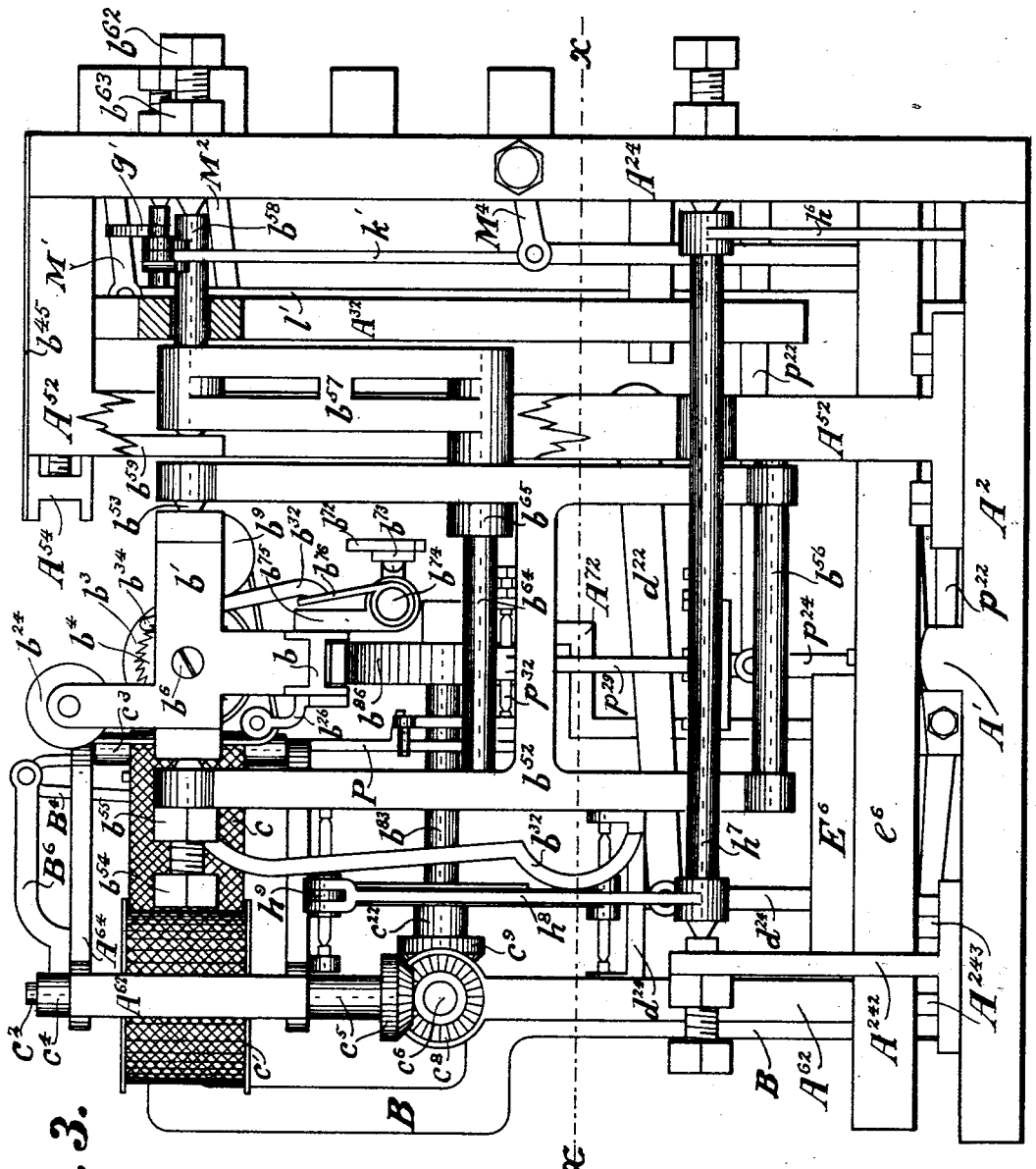

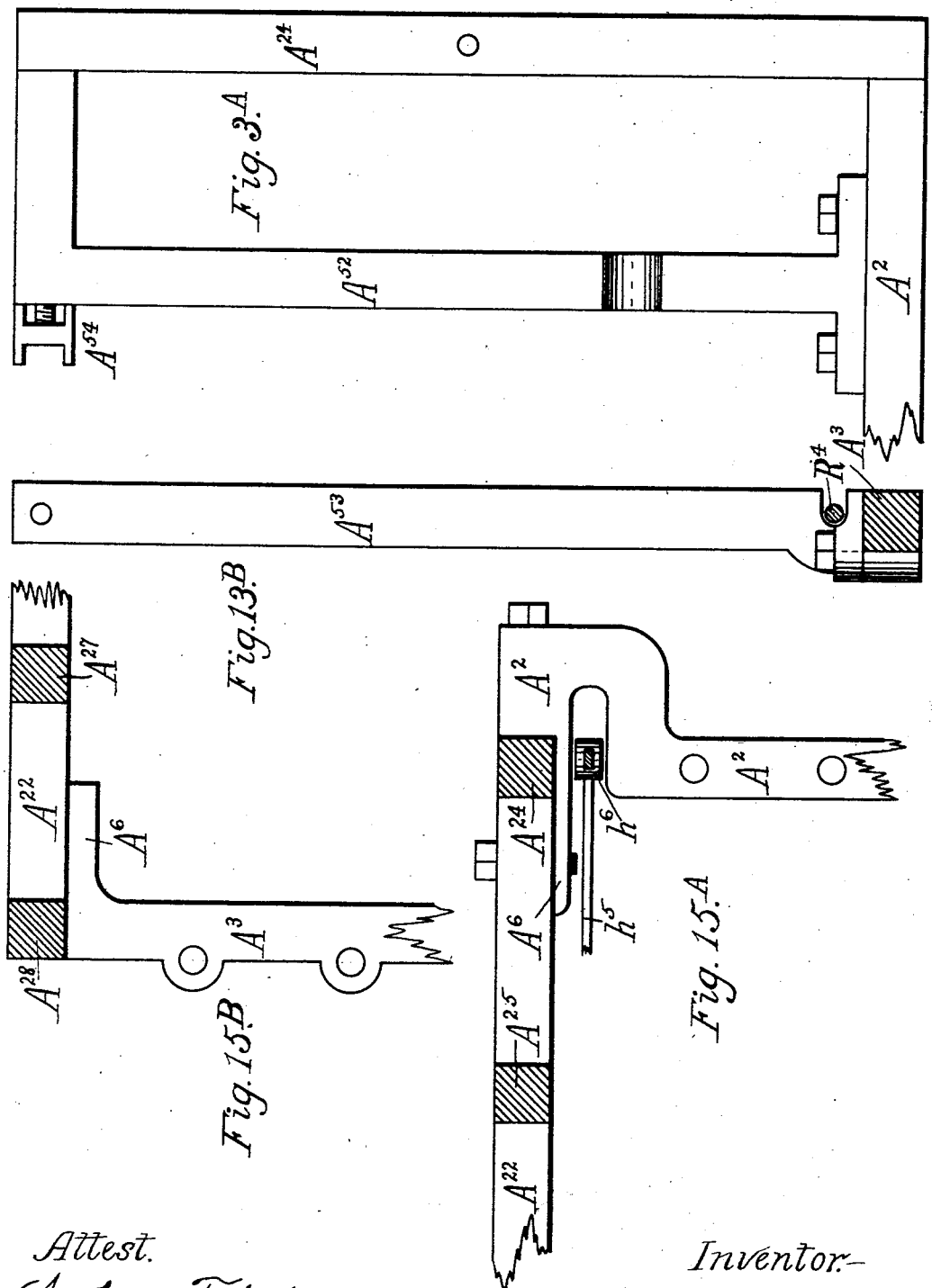

(No Model.) 32 Sheets—Sheet 6.

T. CAHILL.
TYPE WRITING MACHINE.

No. 541,222. Patented June 18, 1895.

Attest- Arthur T. Cahill,
M. H. Cahill

Inventor-
Thaddeus Cahill

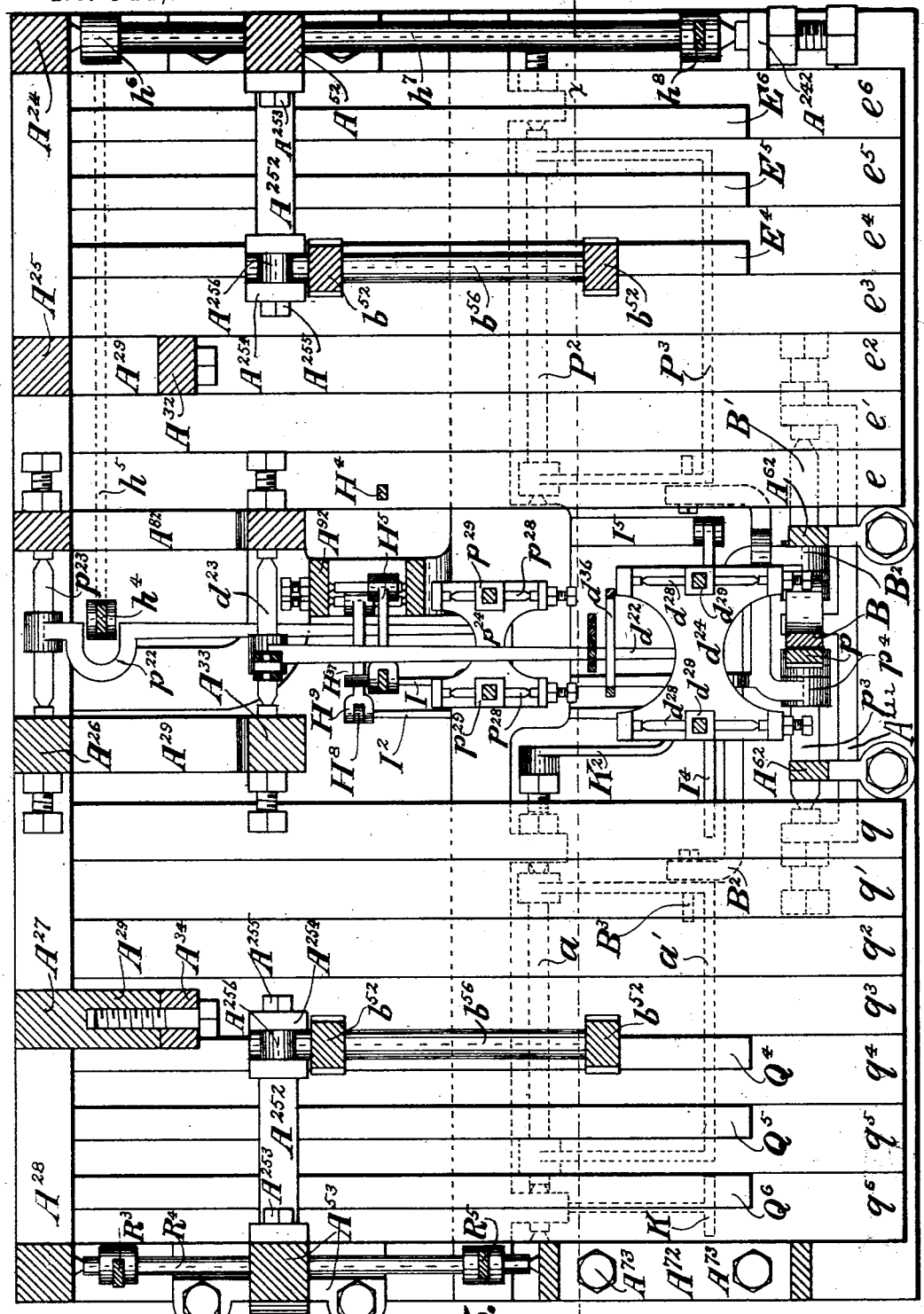

(No Model.) 32 Sheets—Sheet 8.
T. CAHILL.
TYPE WRITING MACHINE.
No. 541,222. Patented June 18, 1895.
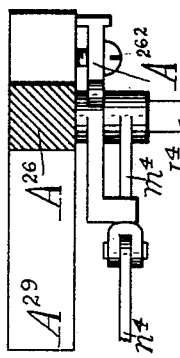
Fig. 34.
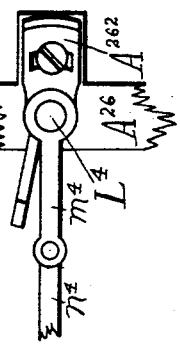
Fig. 35.
Fig. 36.
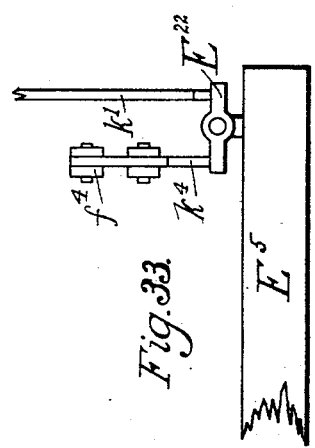
Fig. 33.
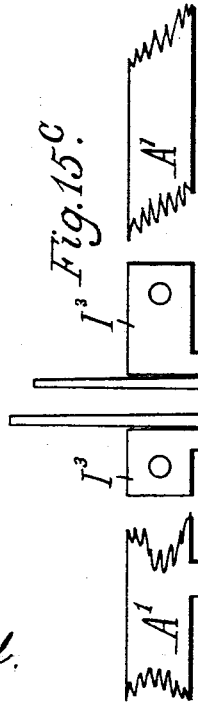
Fig. 15.C
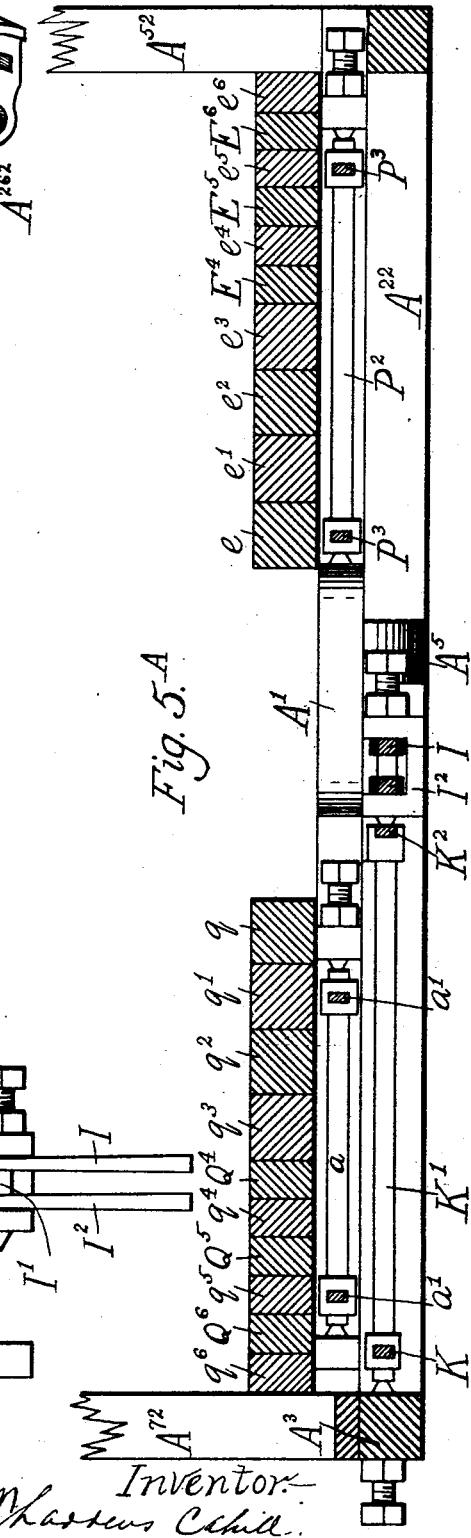
Fig. 5.A
Attest:
Arthur T. Cahill.
M. H. Cahill.
Inventor:
Thaddeus Cahill.

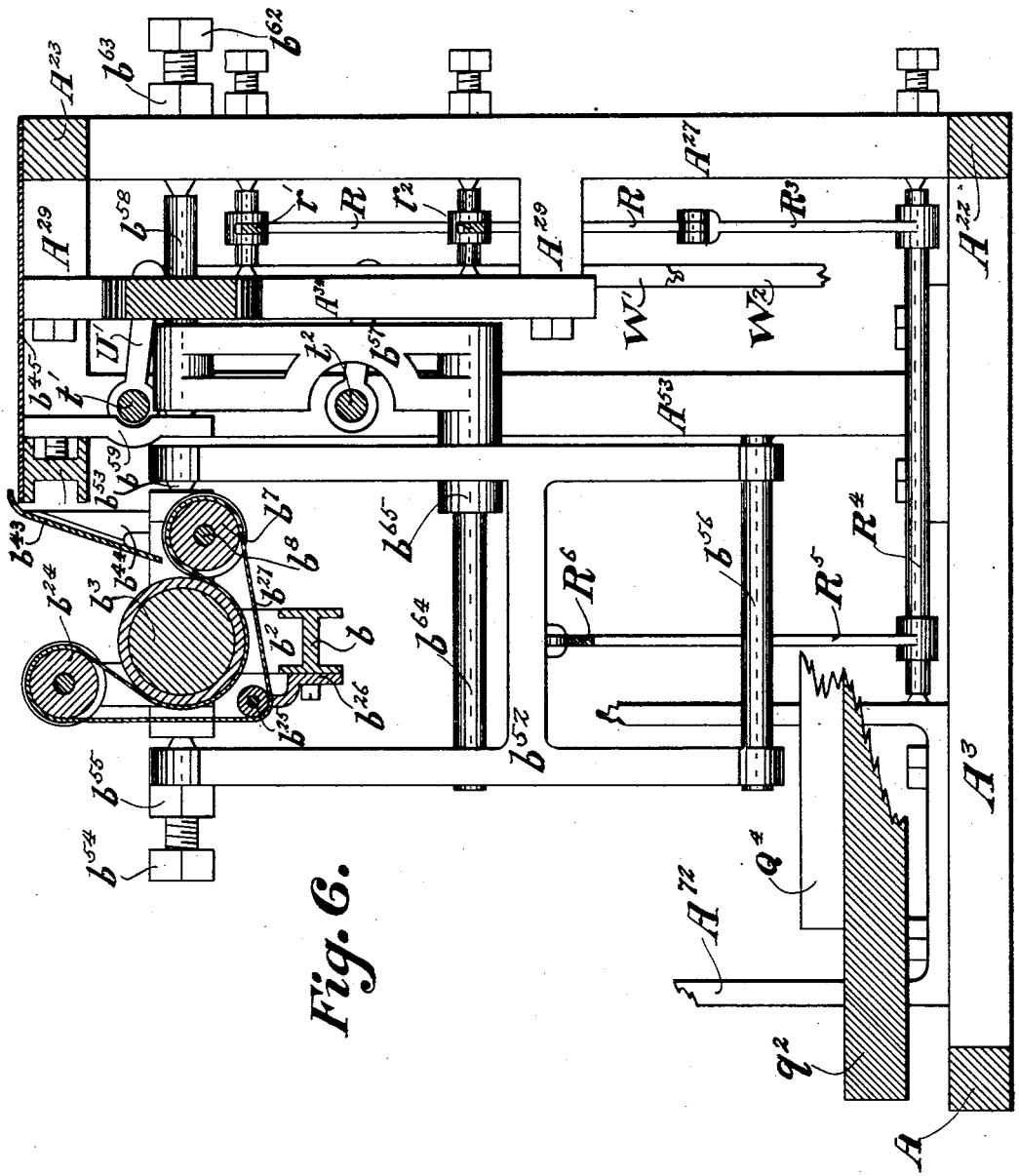

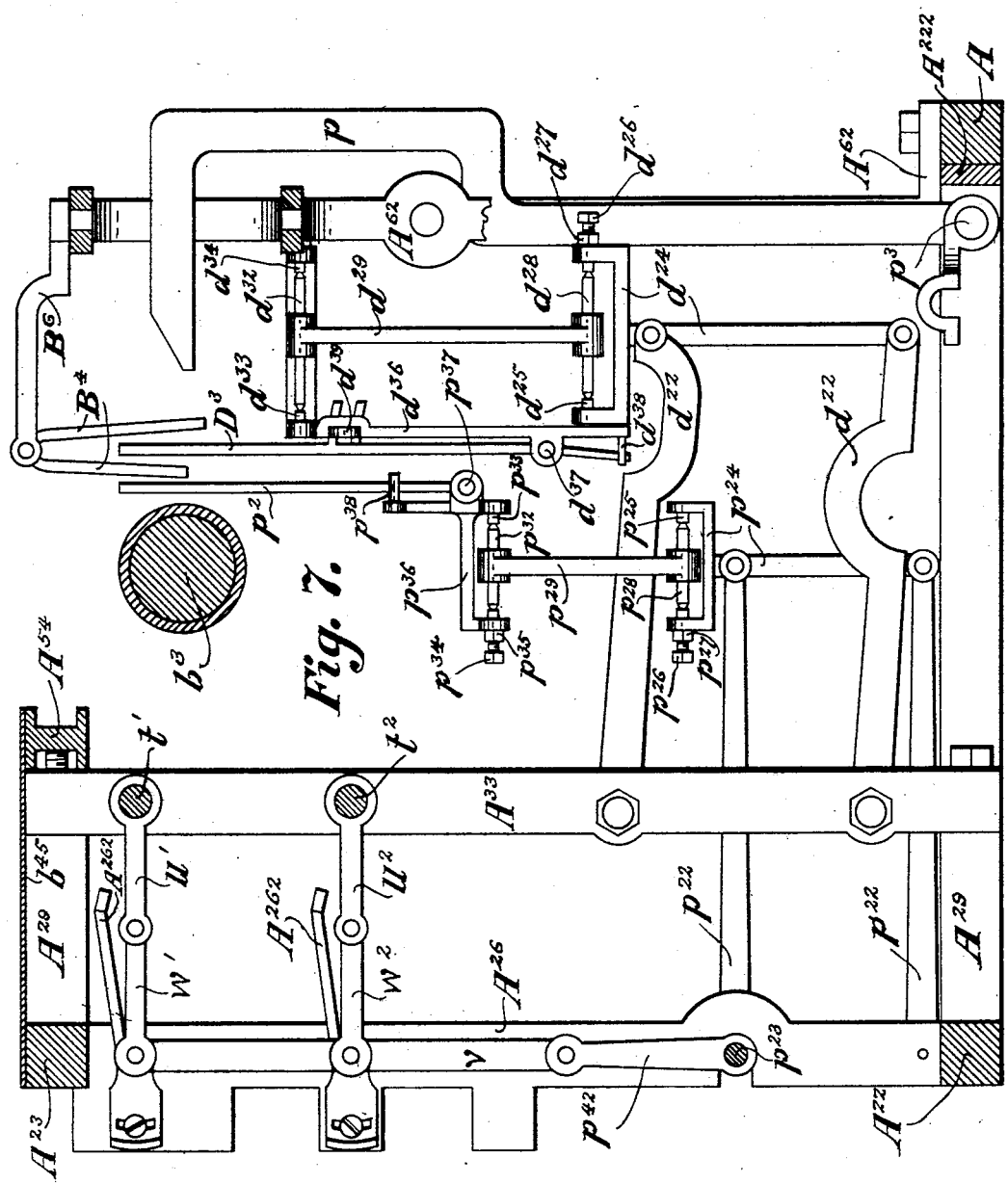

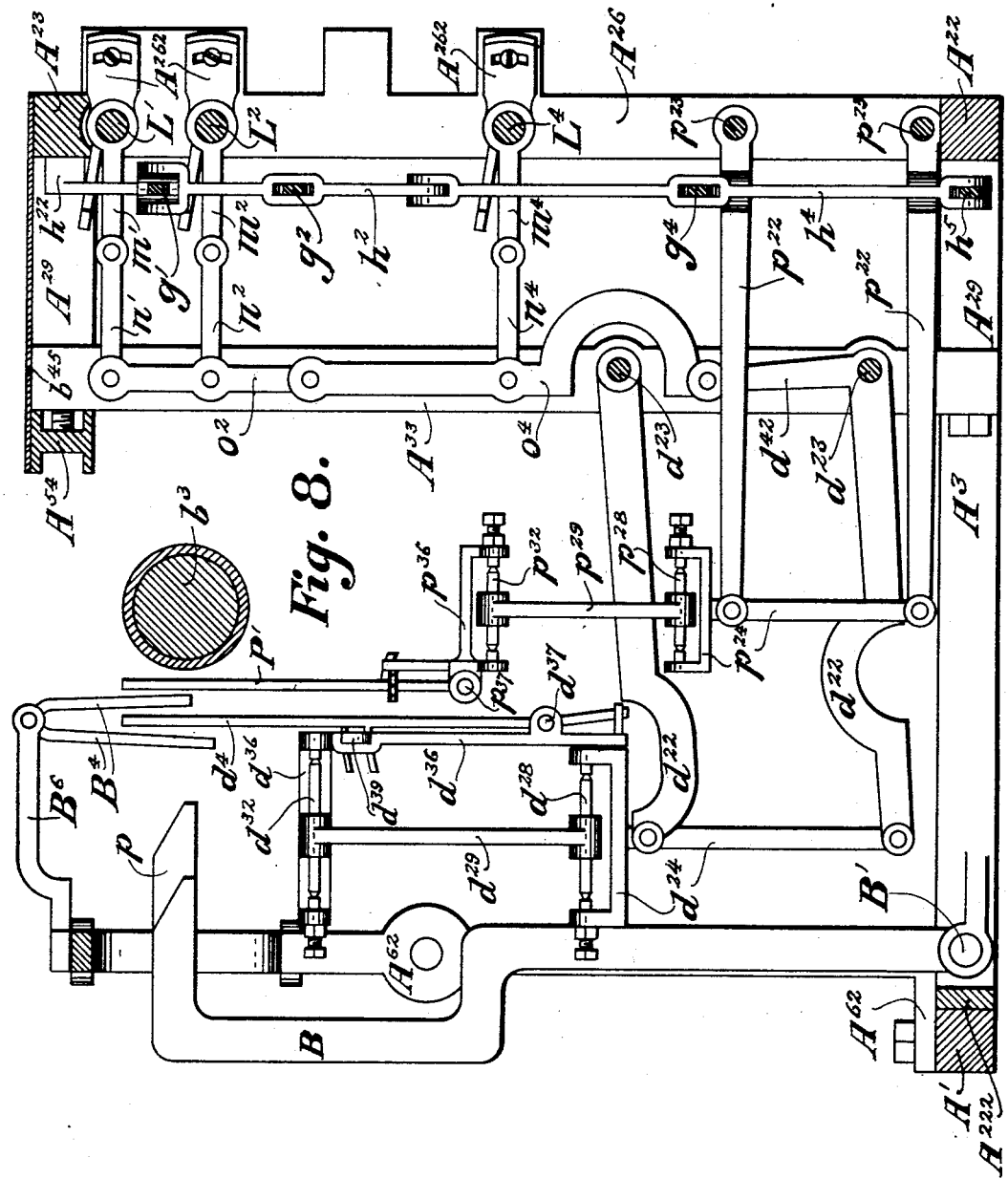

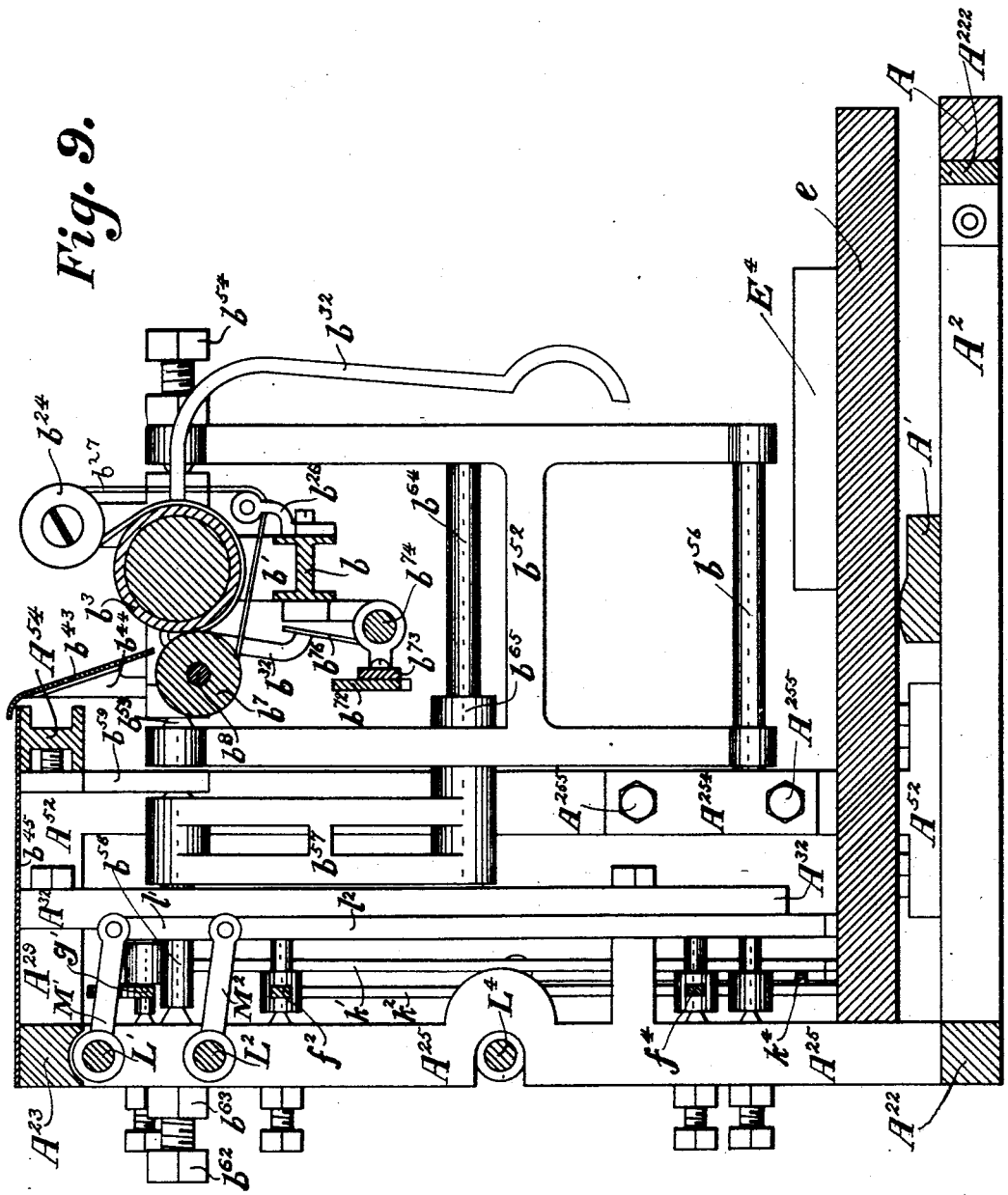

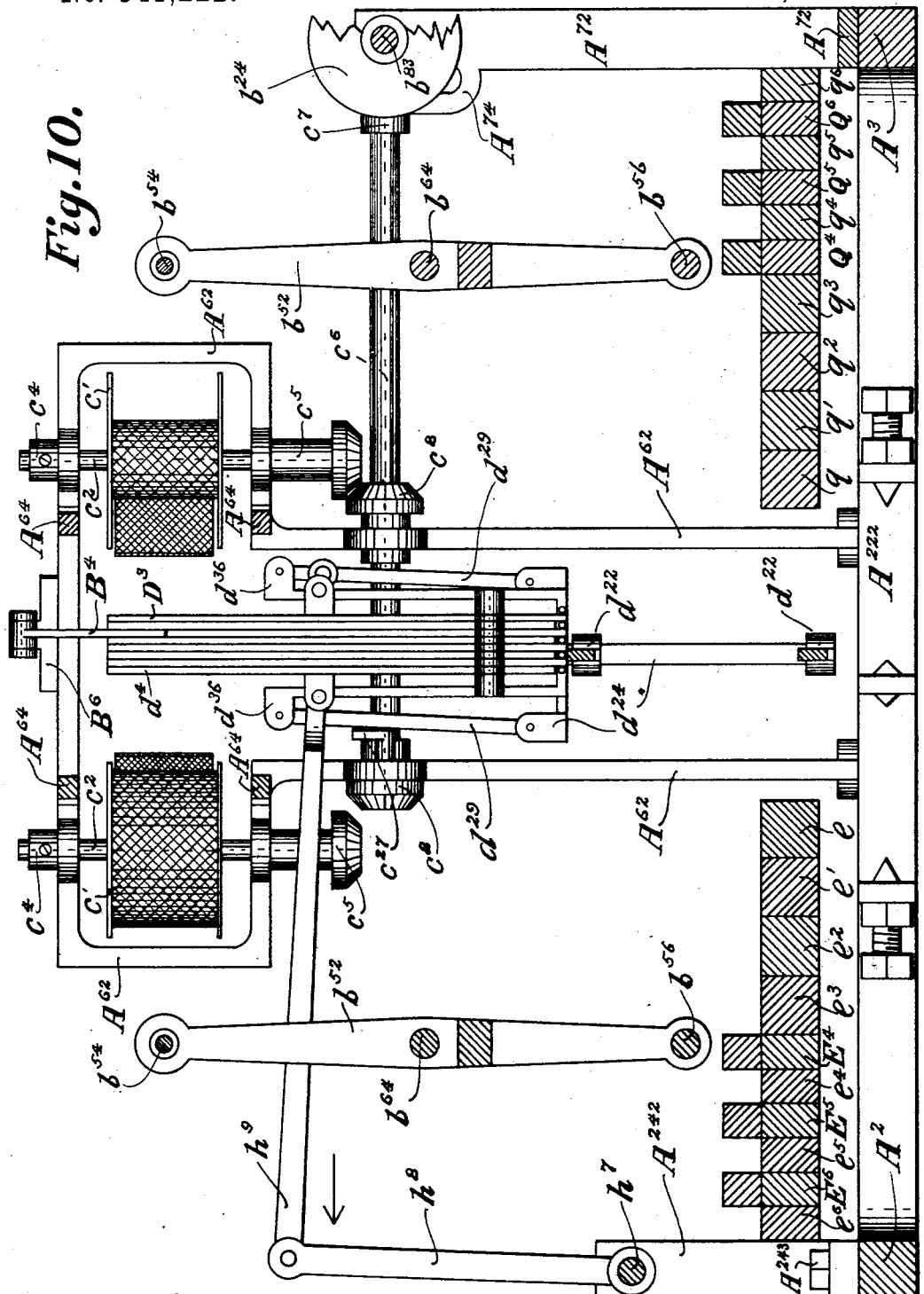

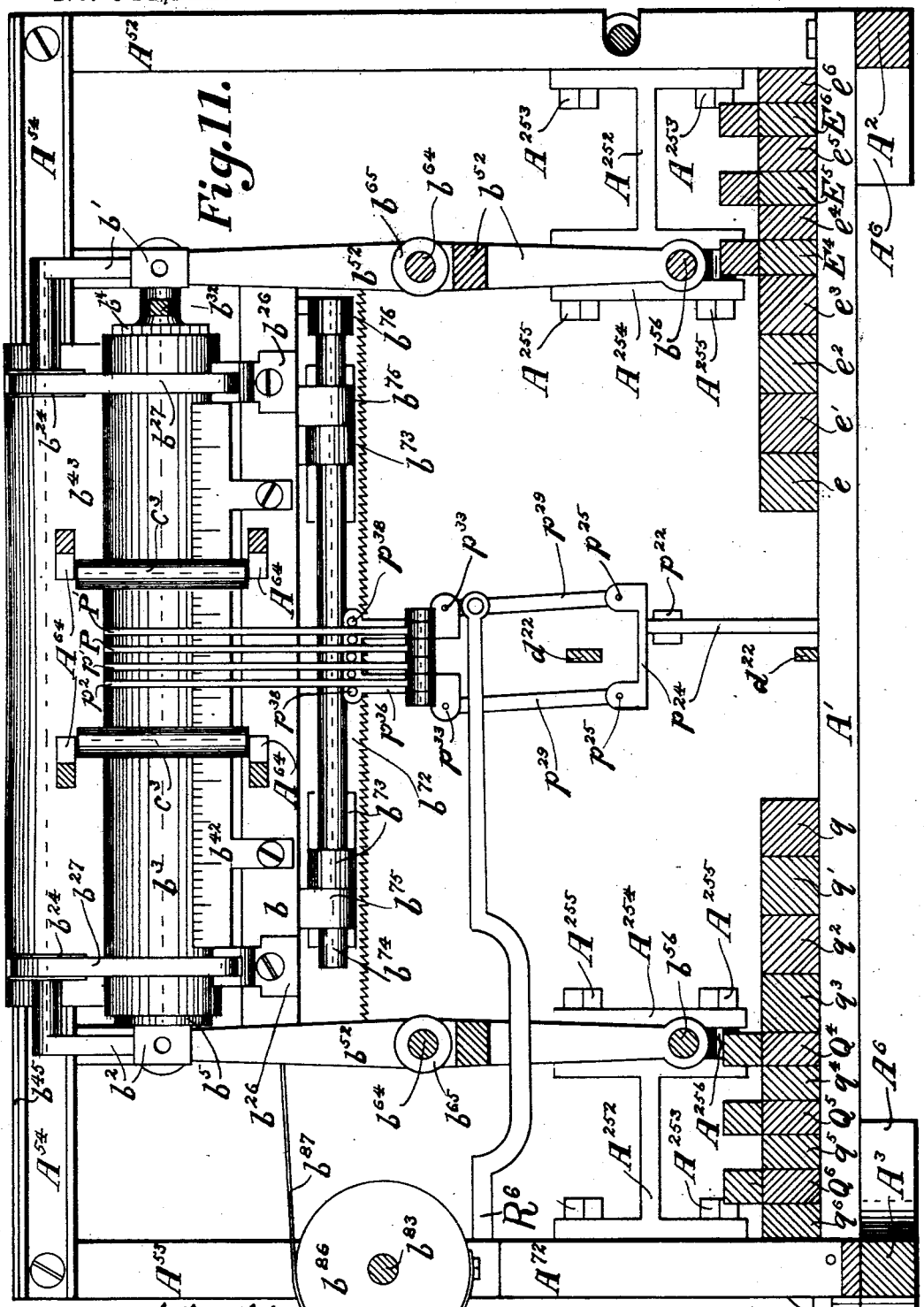

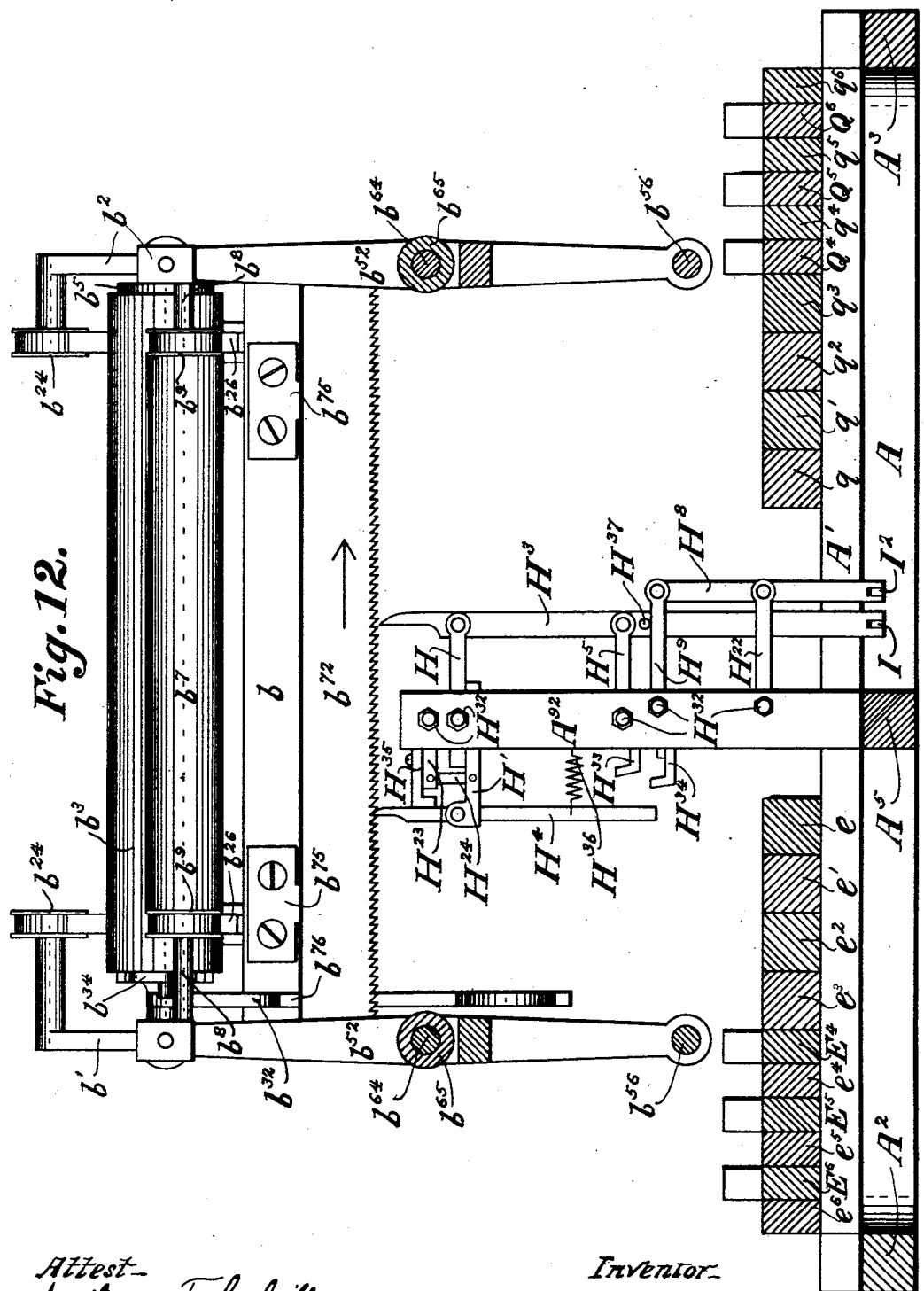

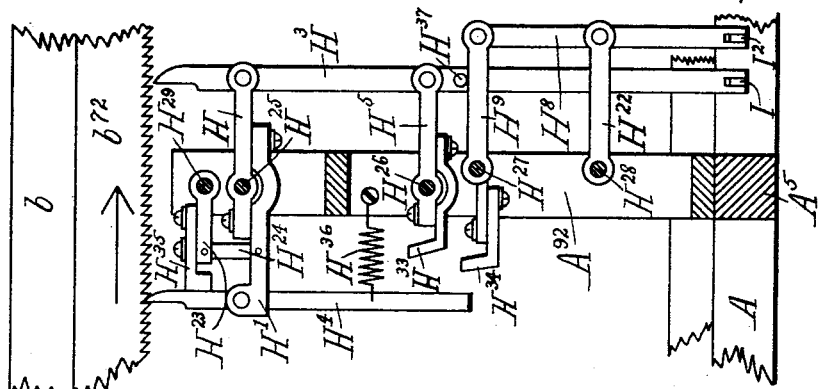

(No Model.) 32 Sheets—Sheet 17.

T. CAHILL.
TYPE WRITING MACHINE.

No. 541,222. Patented June 18, 1895.

Attest:
Arthur T. Cahill.
M. H. Cahill.

Inventor:
Thaddeus Cahill

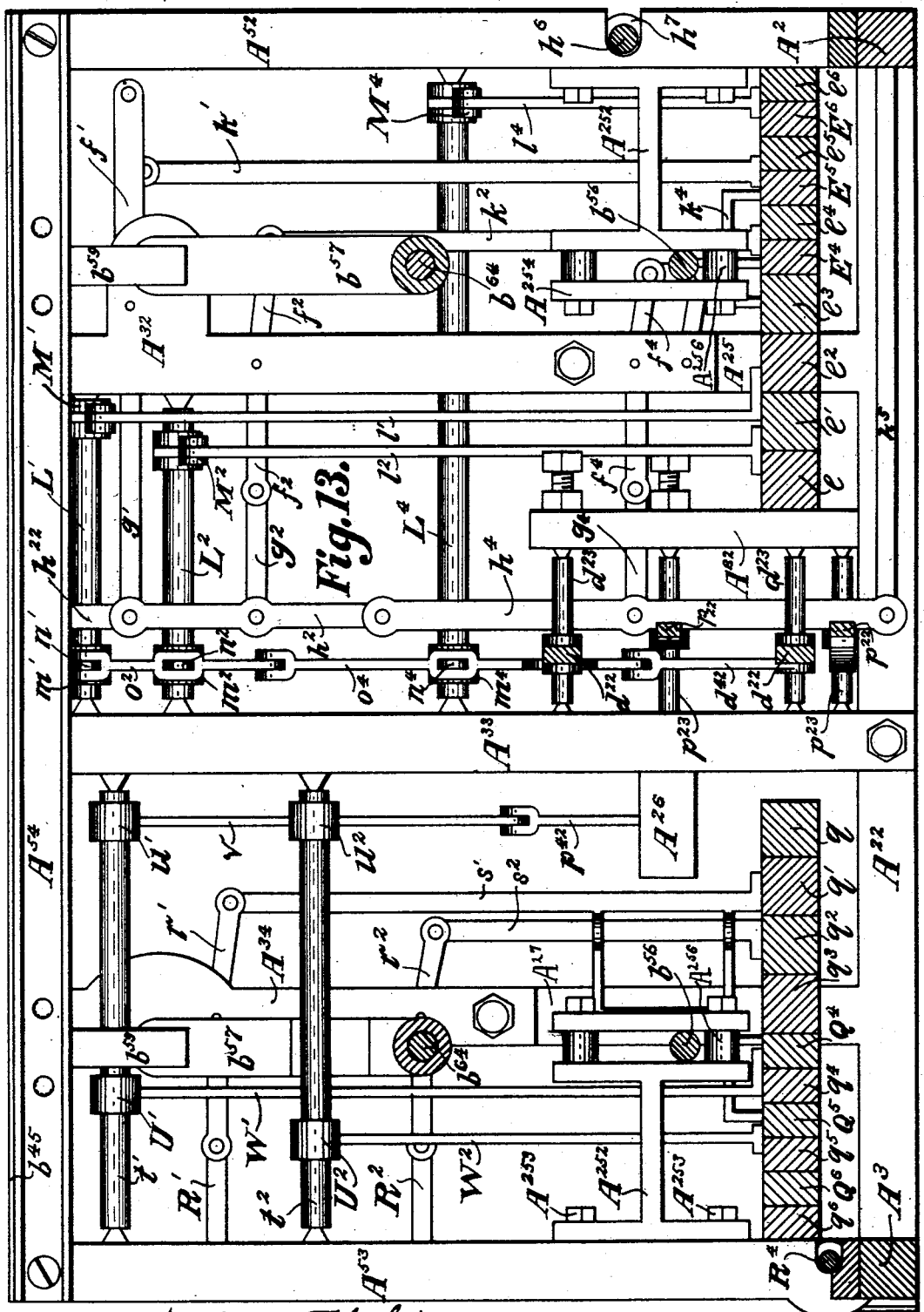

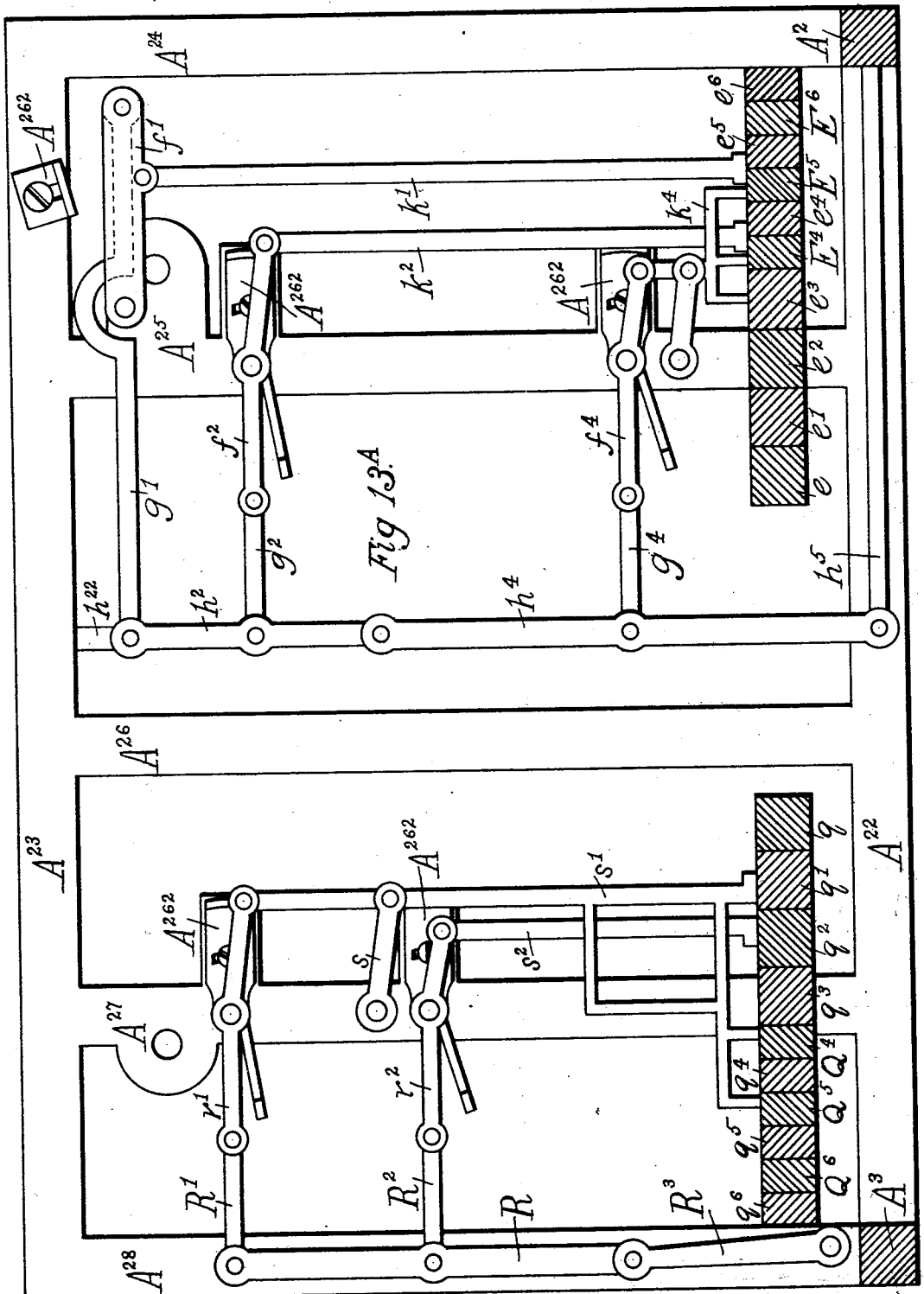

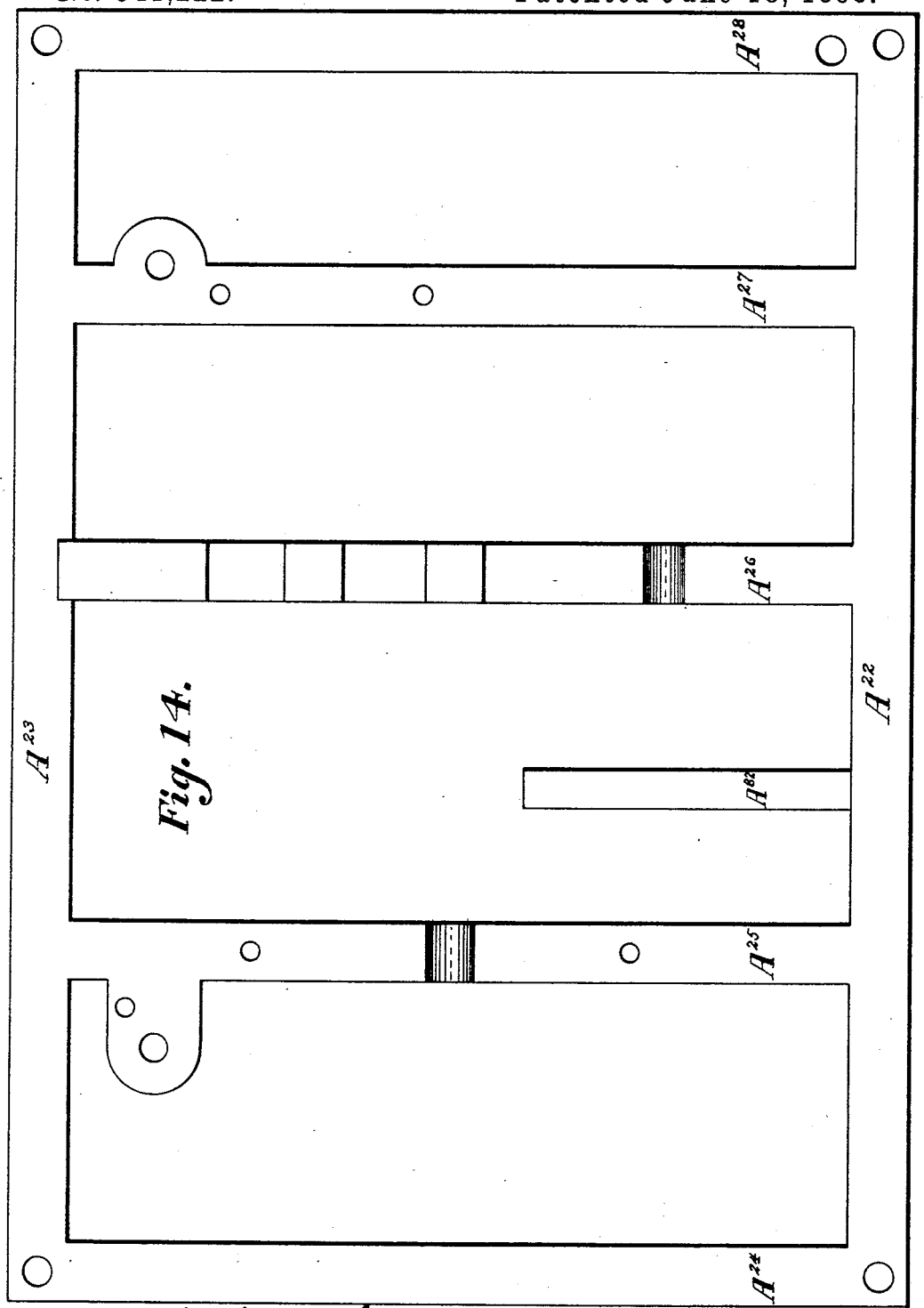

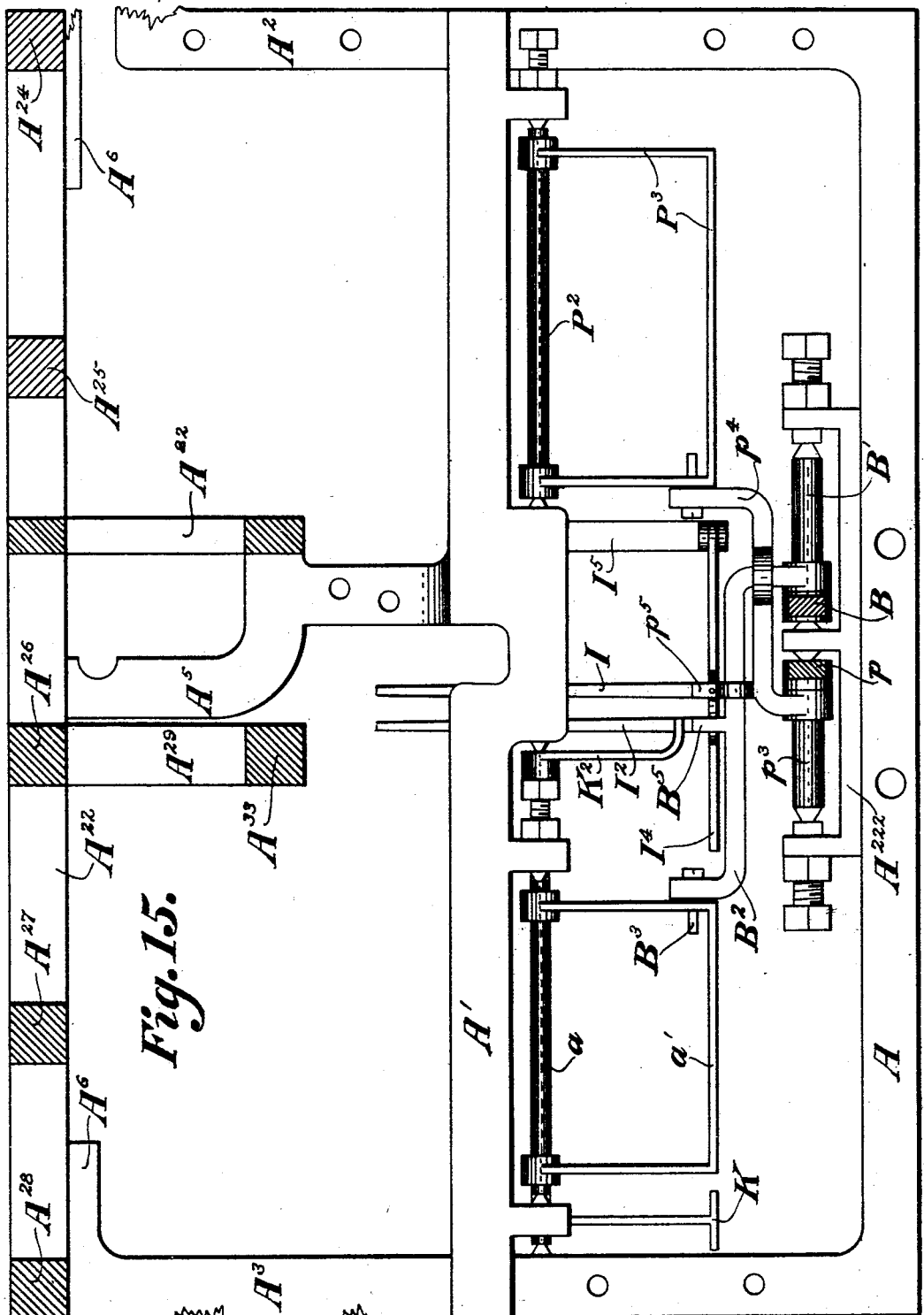

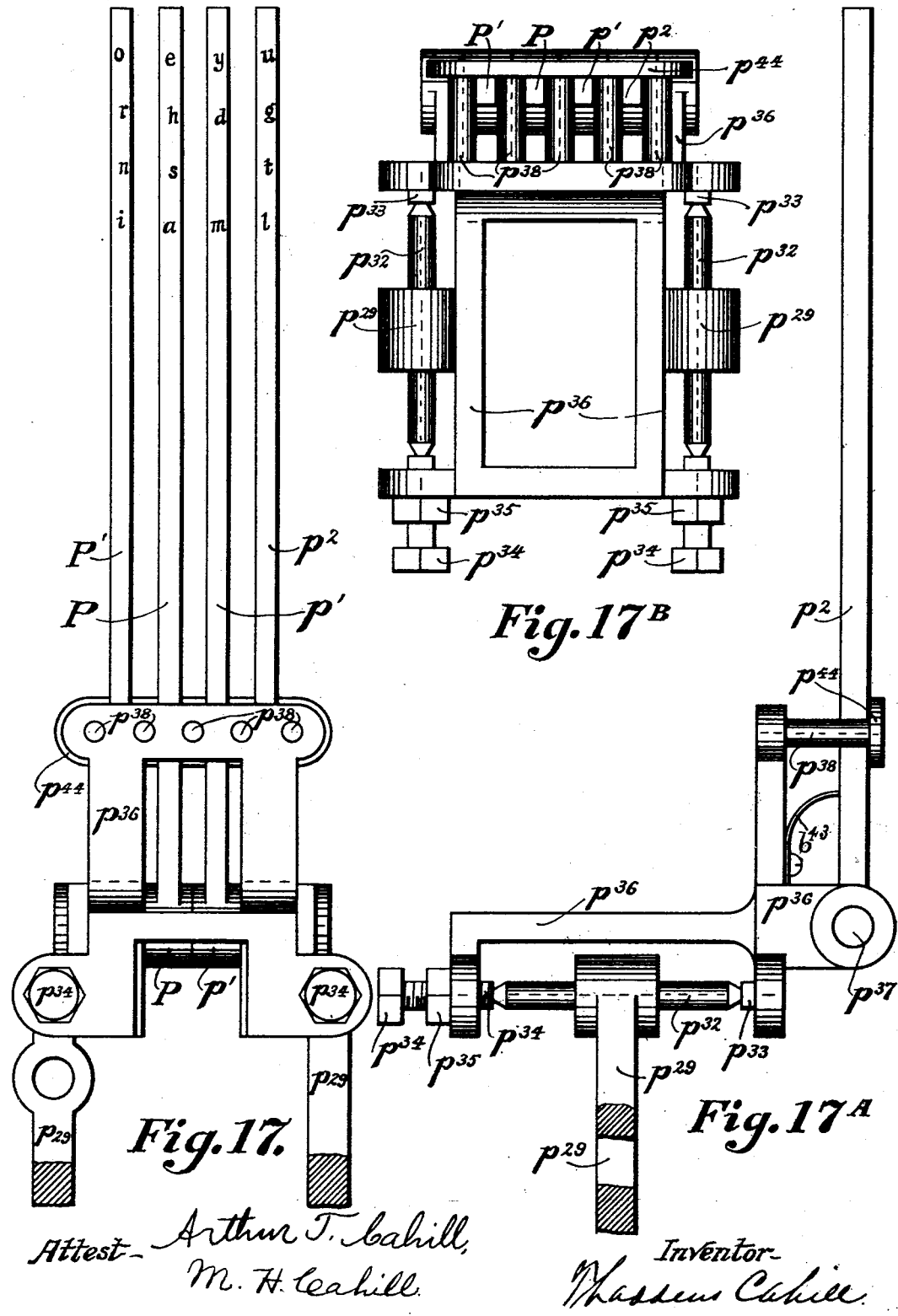

(No Model.) 32 Sheets—Sheet 24.
T. CAHILL.
TYPE WRITING MACHINE.
No. 541,222. Patented June 18, 1895.
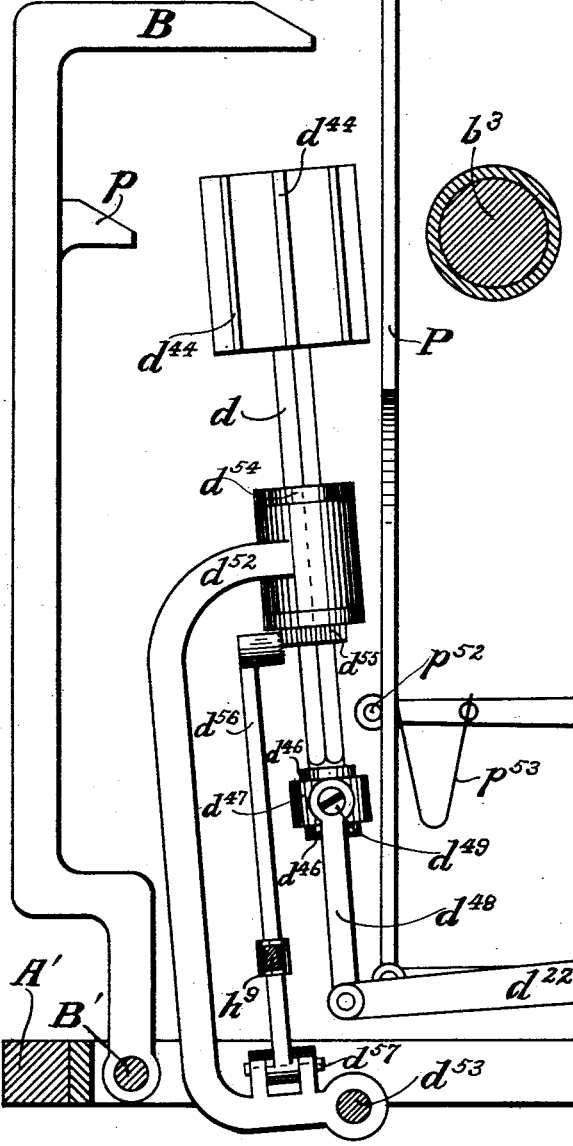
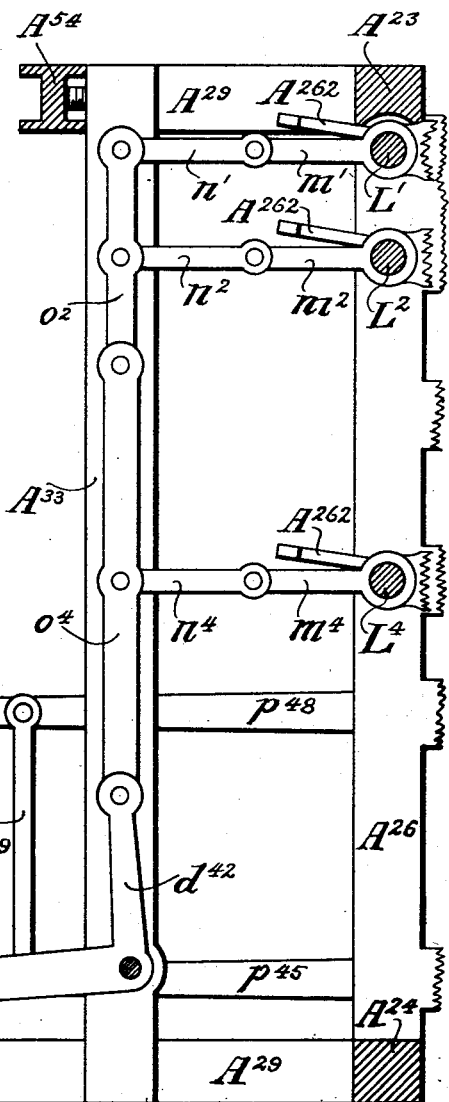

(No Model.) 32 Sheets—Sheet 25.
T. CAHILL.
TYPE WRITING MACHINE.
No. 541,222. Patented June 18, 1895.
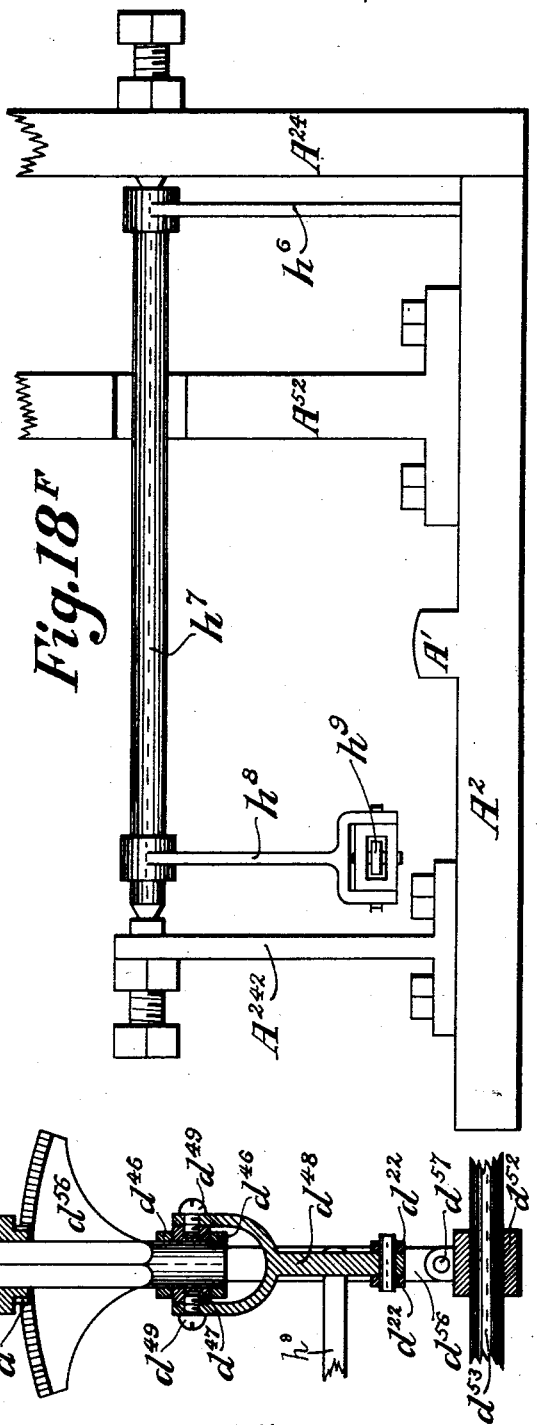
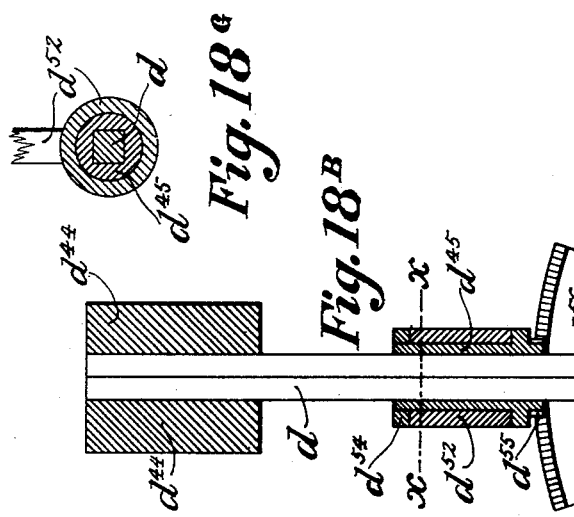
Attest—
Arthur T. Cahill.
M. H. Cahill
Inventor—
Thaddeus Cahill

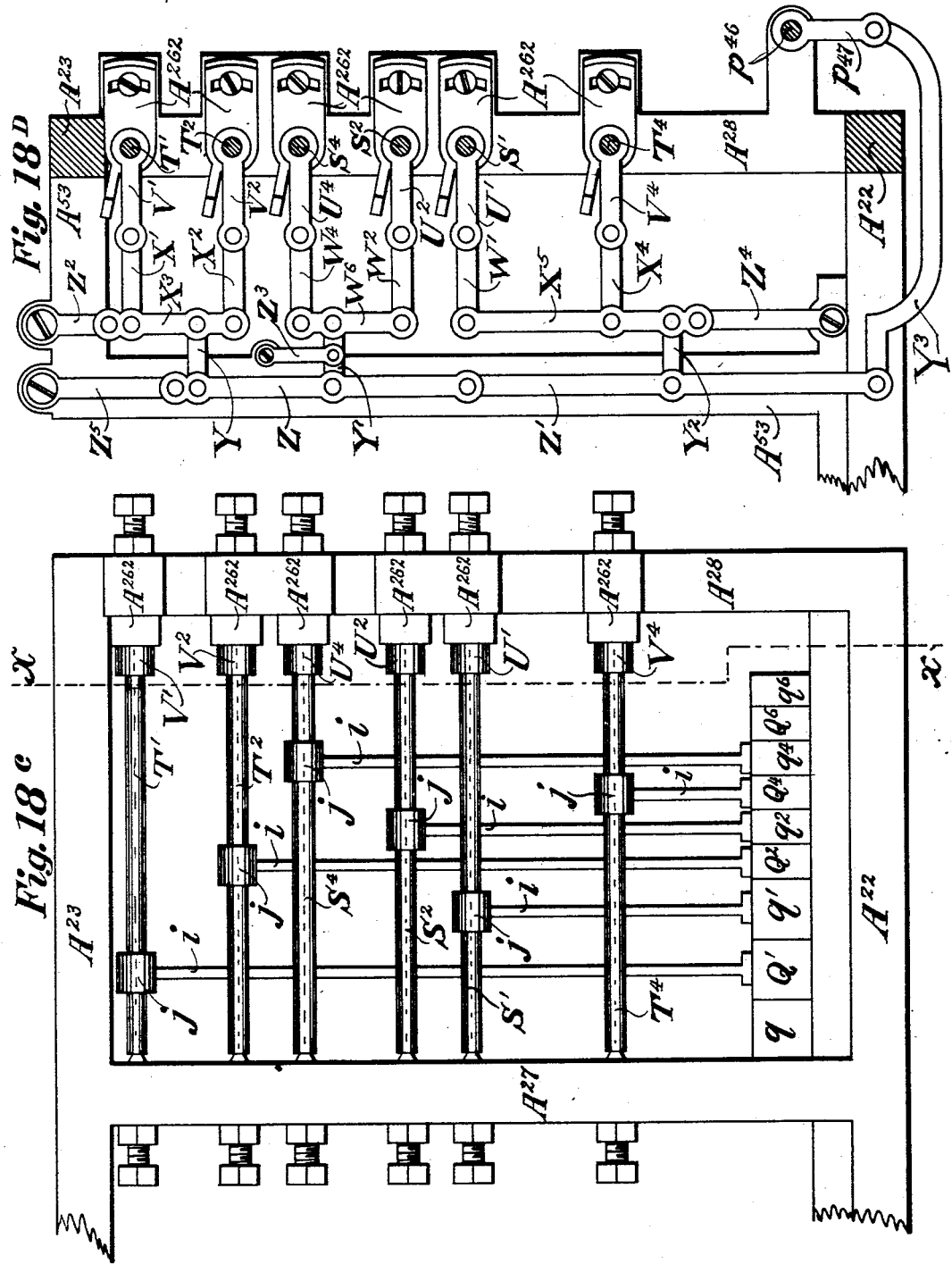

(No Model.)   32 Sheets—Sheet 27.
T. CAHILL.
TYPE WRITING MACHINE.
No. 541,222.   Patented June 18, 1895.
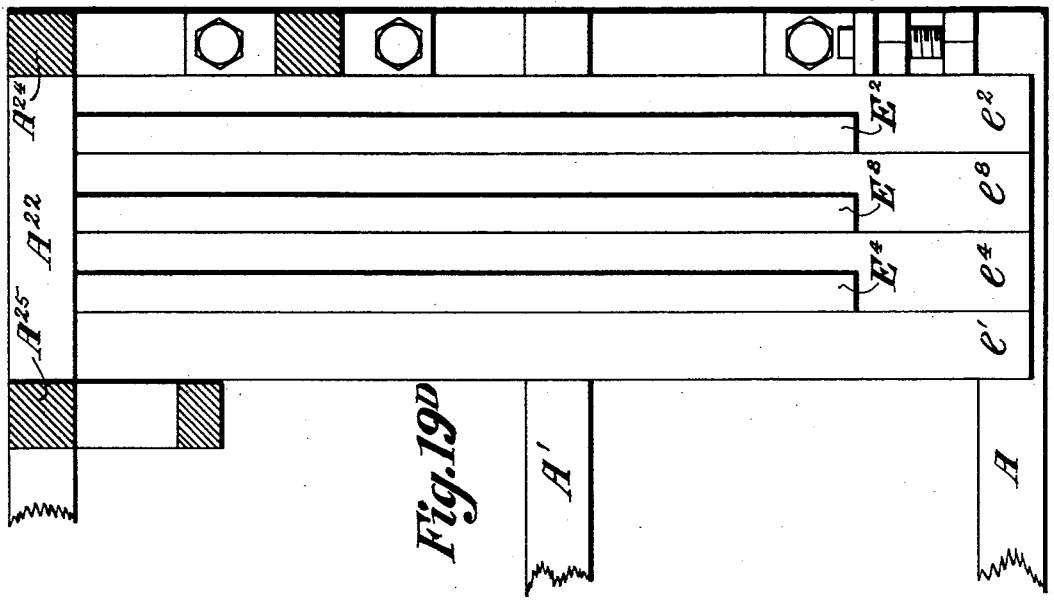
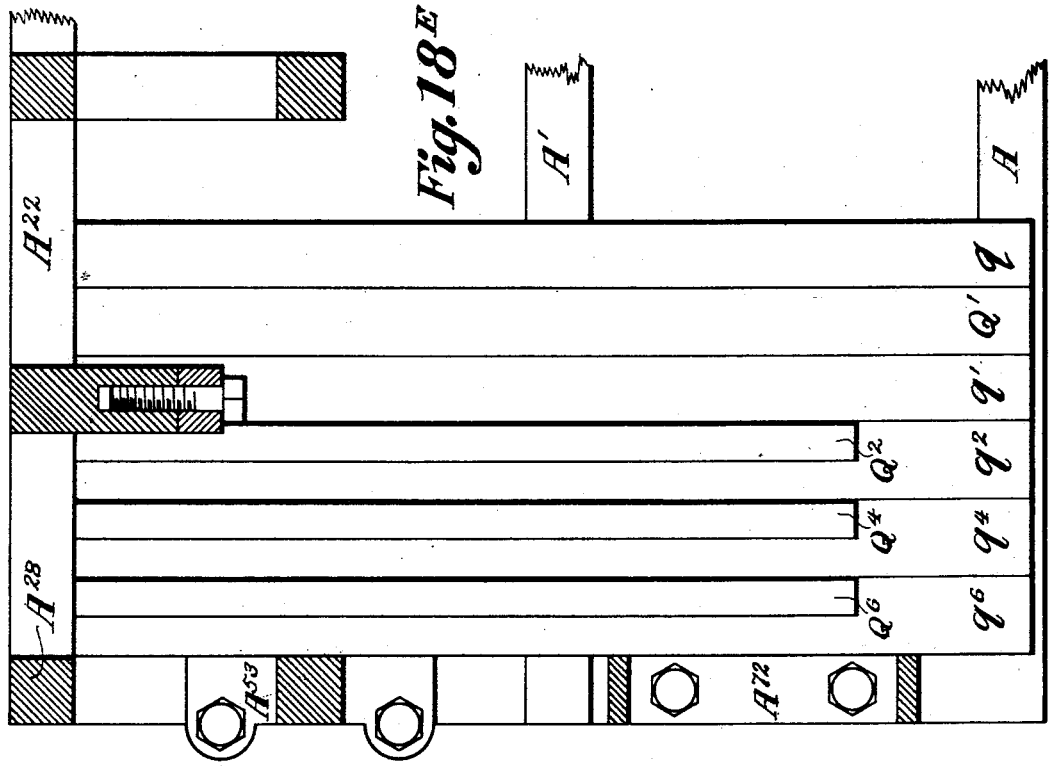
Attest— Arthur T. Cahill,
M. H. Cahill
Inventor—
Thaddeus Cahill (No Model.) 32 Sheets—Sheet 28.
T. CAHILL.
TYPE WRITING MACHINE.
No. 541,222. Patented June 18, 1895.
Fig. 18.ᴴ
Attest:—
Arthur T. Cahill.
M. H. Cahill.
Inventor:—
Thaddeus Cahill

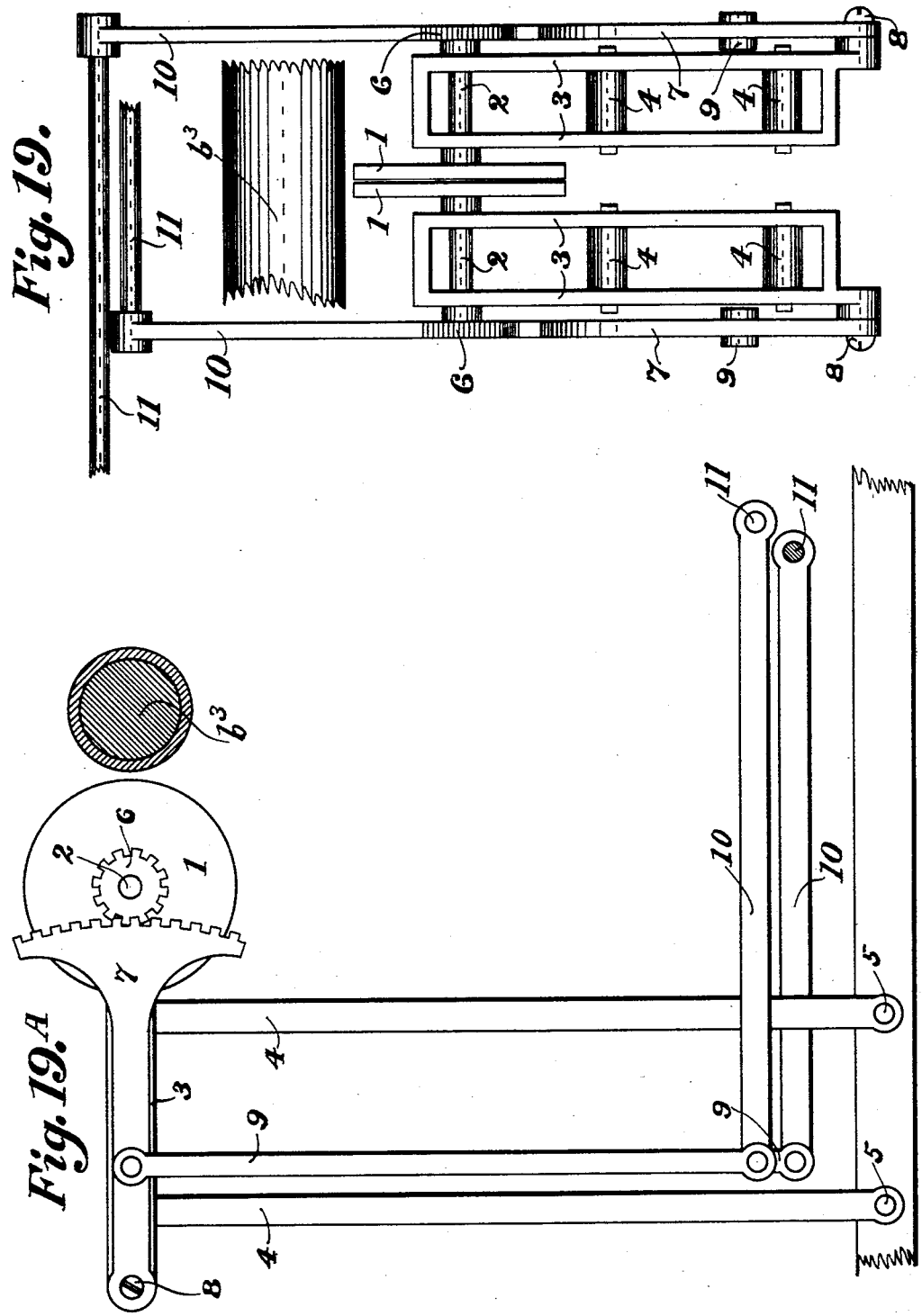

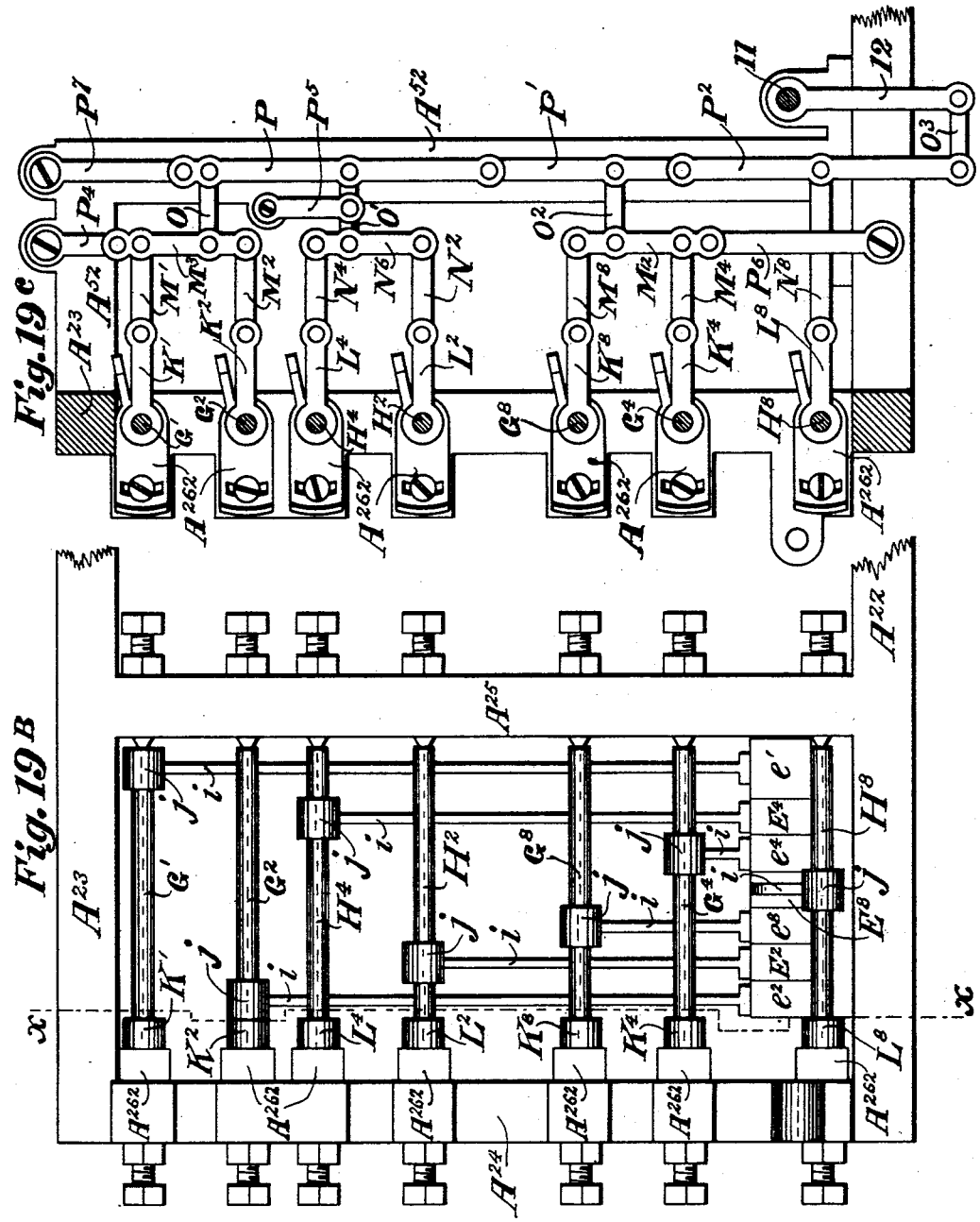

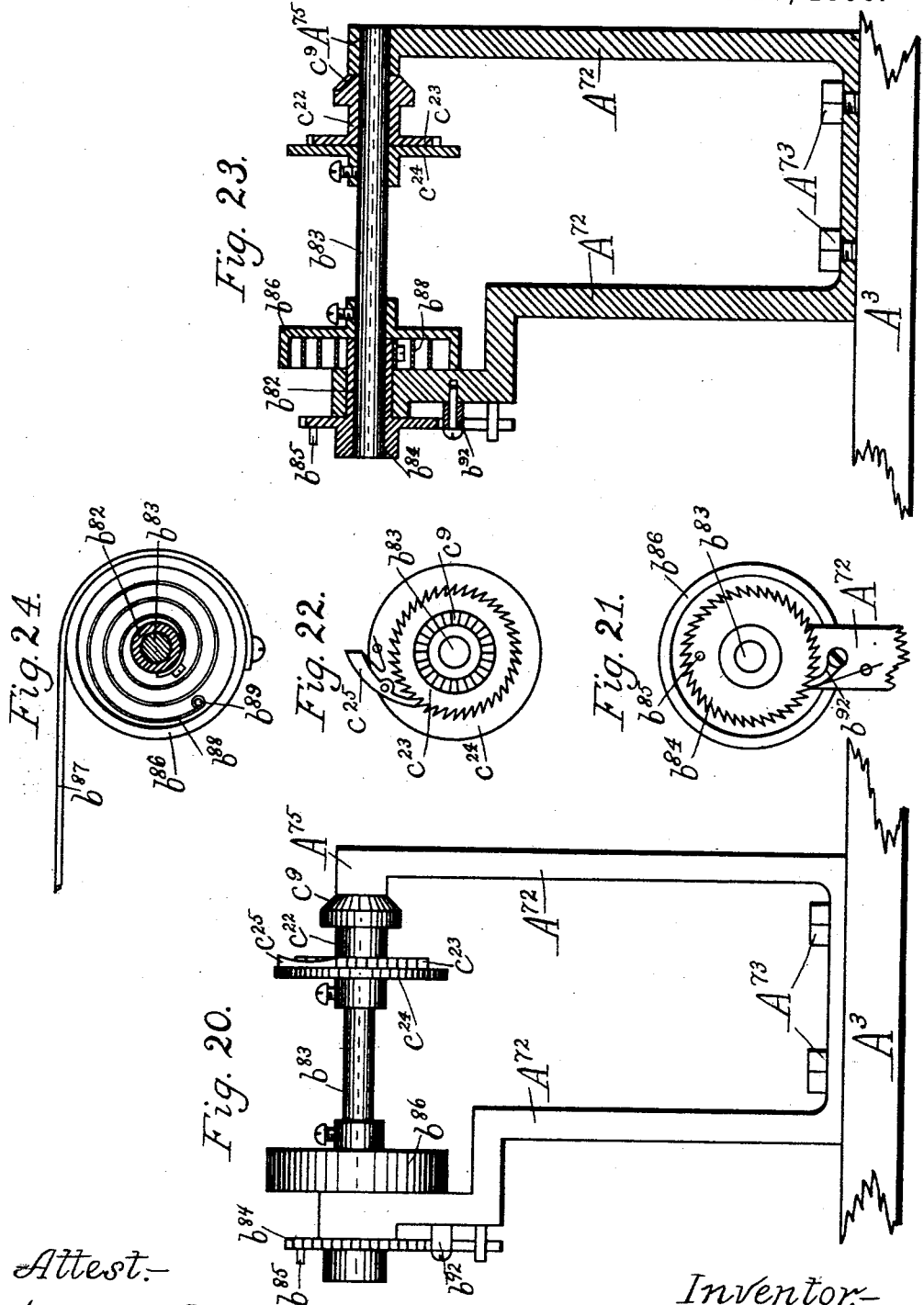

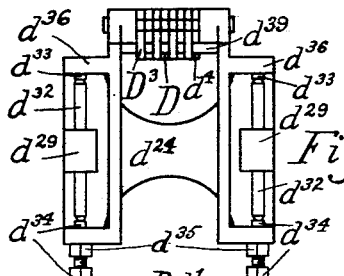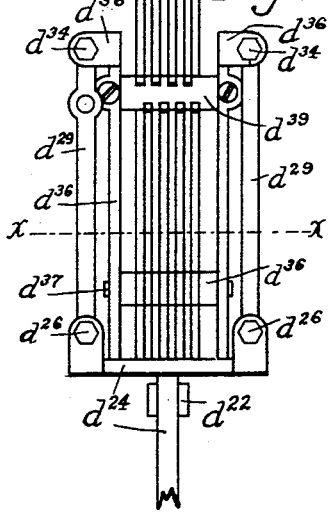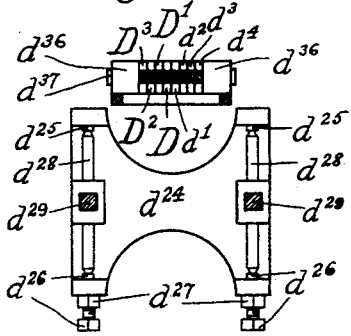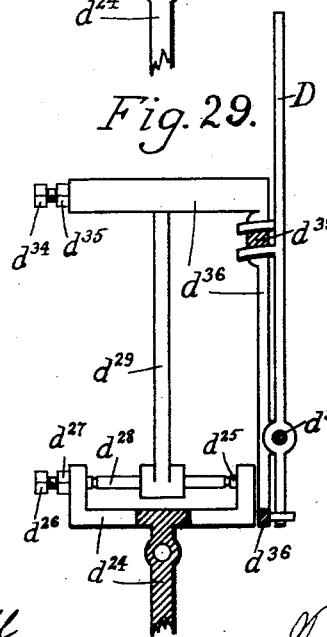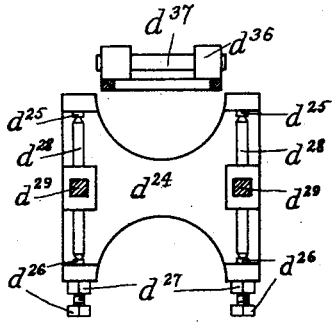

UNITED STATES PATENT OFFICE.

THADDEUS CAHILL, OF NEW YORK, N. Y.

TYPE-WRITING MACHINE.

SPECIFICATION forming part of Letters Patent No. 541,222, dated June 18, 1895.

Application filed July 30, 1894. Serial No. 518,913. (No model.)

*To all whom it may concern:*

Be it known that I, THADDEUS CAHILL, a citizen of the United States, and a resident of the city, county, and State of New York, temporarily residing at Washington, in the District of Columbia, have invented certain new and useful Improvements in Type-Writing Machines and other Similar Instruments, of which the following is a specification.

The object of my invention is to increase the ease and rapidity with which such machines may be operated; and my invention consists in the parts, improvements and combinations hereinafter set forth and claimed.

The mechanism illustrated in the accompanying drawings and hereinafter described, resembles in many particulars that described in Letters Patent of the United States No. 502,700, granted to me on August 8, 1893, for improvements in type-writing machines, and in my pending applications for United States Letters Patent for improvements in type-writing machines, Serial Nos. 446,990, 446,991 and 446,992, filed September 24, 1892; Serial No. 511,633, filed May 18, 1894, and Serial No. 518,912, filed of even date herewith.

The mechanism figured in the accompanying drawings may be described briefly as consisting of (*a*) a main-frame of cast-iron, or other suitable material; (*b*) a paper carriage, suitably mounted, for carrying the paper to be printed; (*c*) spacing mechanism, for controlling the movements of the paper-carriage; (*d*) a ribbon, ribbon-spools and ribbon-feed mechanism; (*e*) keys for the right hand, a type-form connected therewith, and suitable type-form positioning mechanism intermediate said right-hand keys, and the type-form connected therewith, and (*f*) keys for the left hand, another type-form connected therewith, and suitable type-form positioning mechanism intermediate the left-hand keys and the type-form corresponding thereto.

The main-frame bears a general resemblance to the main-frames of the machines illustrated in the before mentioned patent and pending applications for patents. No importance whatever is attached to the peculiar construction of main-frame illustrated.

The form of carriage, and particularly the means of mounting the same, are believed to be novel; but they form the subject matter of another application of mine for improvements in type-writing machines, filed May 18, 1894, Serial No. 511,633. They are not claimed herein.

The spacing mechanism herein described is in its essential features identical with that described in the before mentioned Letters Patent, No. 502,700, and in the before mentioned application, Serial No. 446,992, filed September 24, 1892. The ribbon spools and ribbon-feed mechanism are also substantially the same as described in the before mentioned patent and pending applications. They are not claimed as novel, and no importance is attached to them.

The peculiar construction and arrangement of type-form herein described is believed to be novel. It forms, however, by itself alone, no part of the subject matter of the present application, but is the subject matter of another application for Letters Patent for improvements in type-writing machines, filed July 30, 1894, Serial No. 518,912.

The peculiar construction and arrangement of type-form positioning mechanism herein illustrated are of the movement synthesizer genus described in the before mentioned patent and pending applications. They are not claimed herein by themselves alone.

The novel features of the present application relate to two printing mechanisms (preferably two type-forms arranged and connected in such a manner that one serves for the right hand and the other for the left hand), each printing at a printing-point of its own, the printing-points being, however, adjacent, and the two printing mechanisms co-operating to print successive letters of a word simultaneously or substantially simultaneously, the one letter being printed from one of the printing mechanisms and determined by the right hand, the other being printed from the other printing mechanism and determined by the left hand; and in the combination of such printing mechanisms with a suitable paper carriage and letter-spacing mechanism therefor.

I illustrate the whole working machine so that my present invention may be made clear in a useful and practical form. From the explanation given, however, it will now be easy for the reader to distinguish that which forms the subject matter of the present application from that which is only collateral and related to it.

In the before mentioned application, Serial No. 446,992, I illustrate a type-writing machine capable of writing two letters at a time. The main difference between that and this is that in that machine the printing of two letters at a time is made possible by furnishing one type-form with a plurality of groups of compound or double-letter characters, while in this two type-forms are made to coact; and the principal advantage of the present method is that it makes it possible to use lighter type-forms, with fewer characters, gives a lighter touch to the machine, and requires less delicate adjustment of the movement synthesizers or other type-form positioning mechanism.

Figure 2:
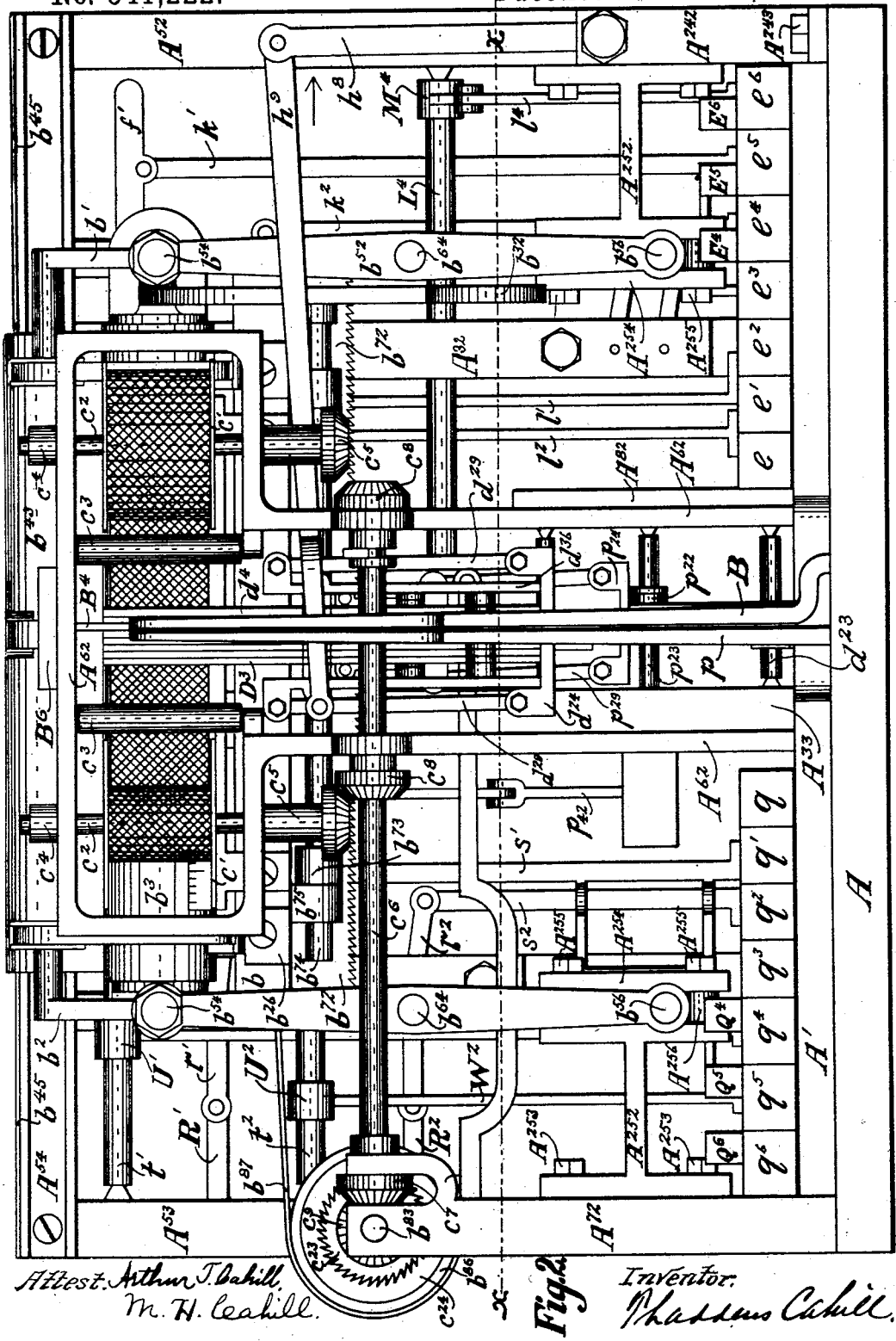
Figure 4:
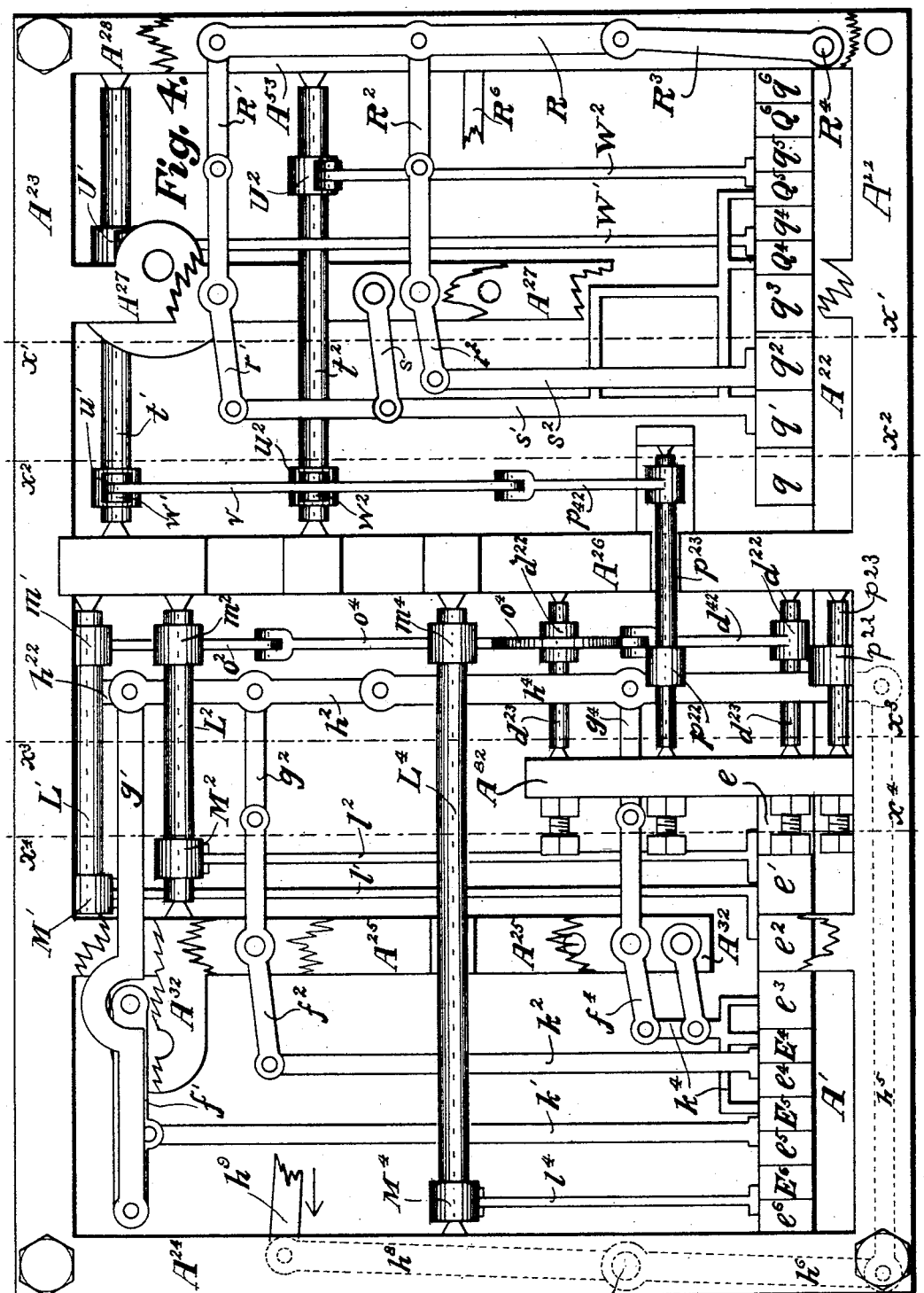
Figure 12E:
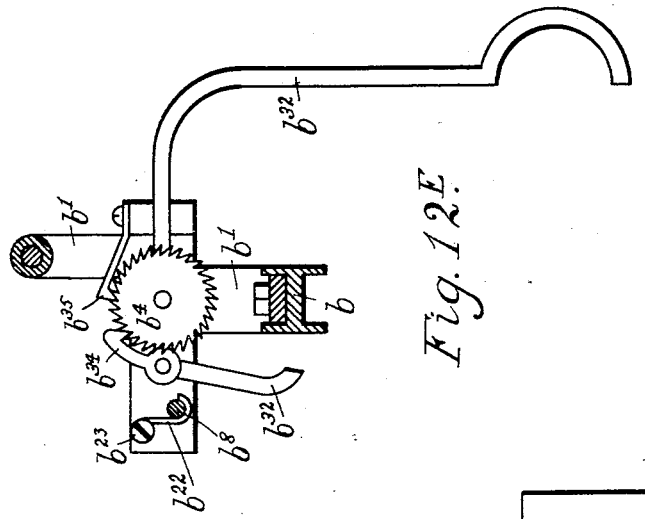
Figure 31:
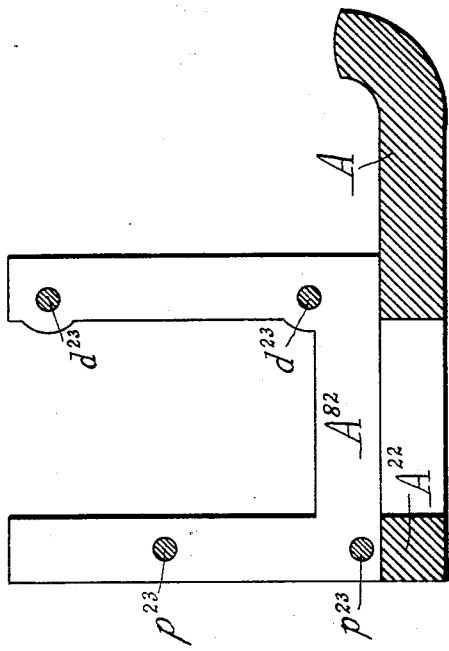
Figure 12D:
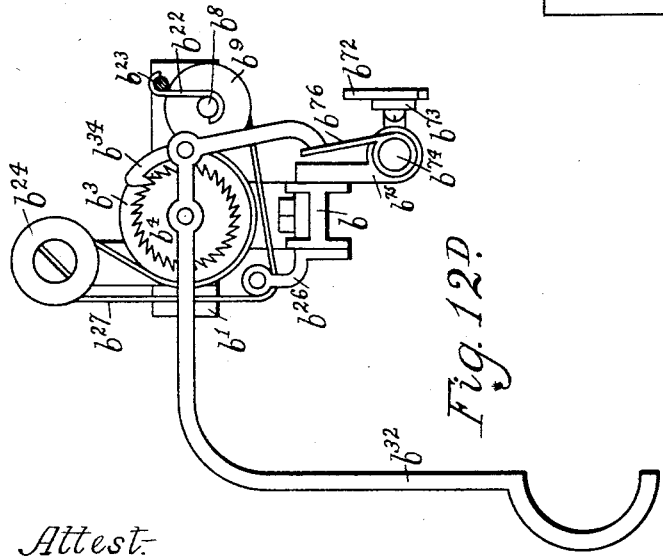
Figure 16:
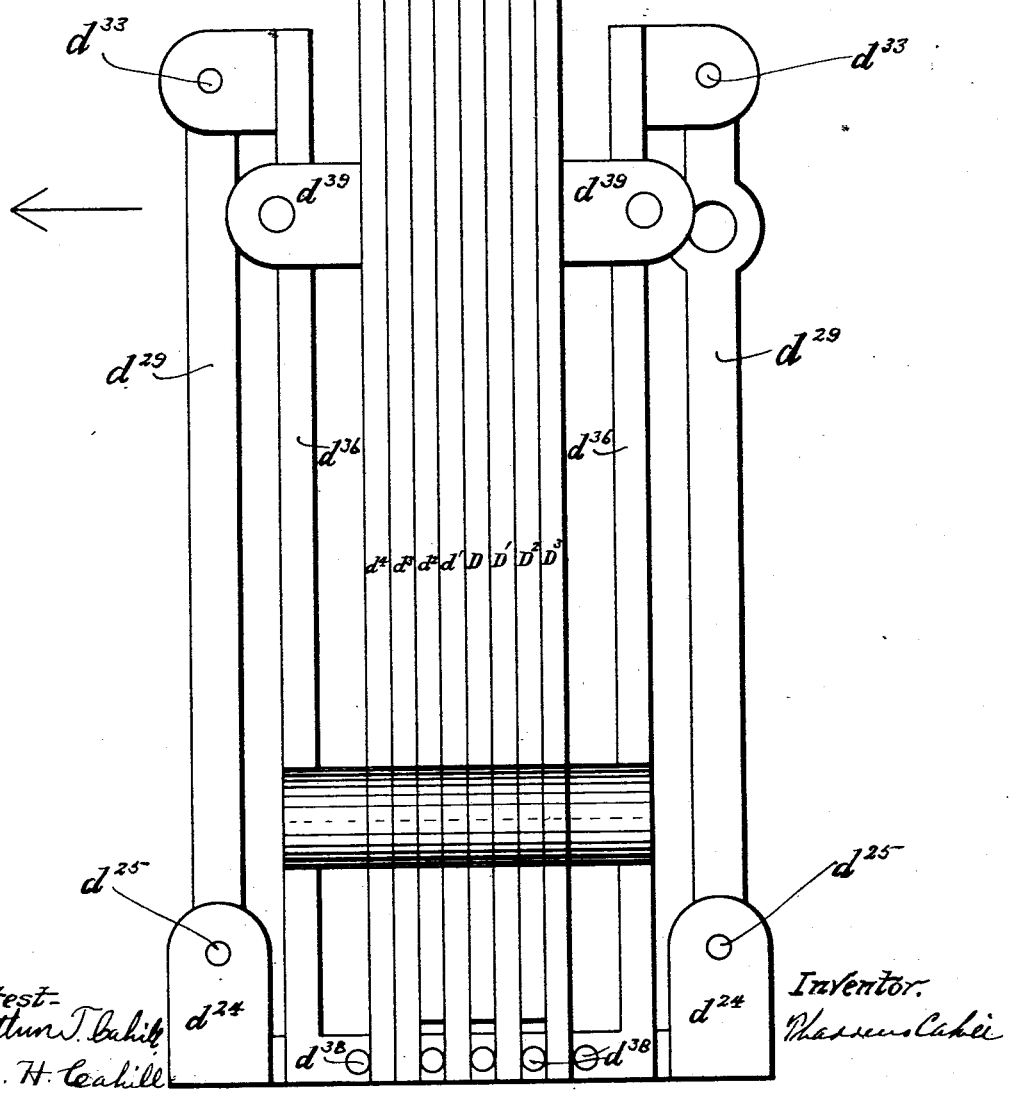

In the accompanying drawings, Figure 1 is a top view of my improved type-writing machine. Fig. 2 is a front elevation. Fig. $2^A$ is a detail illustrating the ribbon-reversing mechanism illustrated in Fig. 2. Fig. $2^B$ is a detail sectional elevation on the line $xx$, Fig. $2^A$, also illustrating the ribbon-reversing mechanism. Fig. 3 is a side elevation, a portion of the main frame being broken away. Fig. $3^A$ is a detail elevation illustrating the right-hand side piece of the main frame. Fig. 4 is a rear elevation illustrating the movement-synthesizers at the back of the machine, the carriage, spacing mechanism, type-forms, and ribbon mechanism being omitted for the sake of more clearly illustrating what is shown and different portions of the back plate being broken away, also, for the same purpose. Fig. $4^A$ is a detail elevation illustrating the lateral-movement synthesizer seen at the right of Fig. 4. Fig. 5 is a plan view in section on the line $xx$, Fig. 2. Fig. $5^A$ is a detail section on the line $xx$, Fig. 5. Fig. 6 is a sectional view in elevation on the line $x'x'$, Fig. 4, looking to the right of said figure. Fig. 7 is a sectional view in elevation on the line $x^2 x^2$, Fig. 4, looking to the left of said figure. Fig. 8 is a sectional view in elevation on the line $x^3 x^3$, Fig. 4, looking to the right of said figure. Fig. 9 is a sectional view in elevation on the line $x^4 x^4$, Fig. 4, looking to the left of said figure. Fig. 10 is a sectional view in elevation on the line $xx$, Fig. 1, looking to the front of the machine, and in this view the type-form is shown one letter-space to the right of its normal position. Fig. 11 is a similar view on the same line $xx$, looking to the back of the machine, the spacing mechanism, movement-synthesizers, and other mechanism at the back of the machine being omitted. Fig. 12 is a vertical elevation in a plane parallel to the plane of Figs. 2 and 4 on the back line of the brace-rail $A^{54}$, looking to the front of the machine, said brace-rail $A^{54}$, however, and the parts connected therewith and serving as bearings for the carriage hanger-shafts not being shown. Fig. $12^A$ is a sectional elevation in a plane parallel to the plane of Fig. 12, illustrating the spacing mechanism. Fig. $12^B$ is also a detail of the spacing mechanism illustrated in Fig. 12, as viewed from the right of Fig. 12. Fig. $12^C$ is a sectional detail on the line $xx$, Fig. $12^B$. Fig. $12^D$ is a detail elevation illustrating the carriage line-spacing mechanism, the parts being viewed from the right-hand side of the machine, the right-hand end piece being removed. Fig. $12^E$ is a detail sectional elevation also illustrating the interlinear spacing mechanism, the plane of section being the surface of the ratchet proximate to the paper-roll. Fig. 13 is a similar view on the same line, but looking to the back of the machine, the brace-rail $A^{54}$, however, which in reality lies immediately in front of the plane of the drawing, being shown for the sake of greater clearness. Fig. $13^A$ is a view similar to Fig. 13, but illustrating the arrangement of stops for the lateral-movement synthesizers omitted from the other views. Fig. $13^B$ is a detail illustrating the shape of the left-hand side piece of the main frame. Fig. 14 is a vertical elevation corresponding to Fig. 4 and illustrating the back plate of the main frame, much of which is broken away in Fig. 4. Fig. 15 is a plan view corresponding to Figs. 1 and 5, illustrating the bed-plate of the main frame, most of the mechanism being removed and the back plate being shown partly in section to illustrate the manner of connecting this part with the bed-plate. Figs. $15^A$ and $15^B$ are detail plan views illustrating portions of the bed-plate necessarily omitted from Fig. 15 and from other figures on account of the size of the sheet. Fig. $15^C$ is a similar view illustrating a portion of the mechanism lying below the rib $A'$, Fig. 15, a part of said rib being broken away. Fig. 16 is a rear elevation of the principal type-form, drawn to a larger scale than the preceding figures, illustrating the arrangement of the characters, each character, however, being shown, for the sake of clearness, naturally as it prints, instead of inverted, as formed on the bar. Fig. 17 is a rear elevation of the auxiliary or left-hand-operated type-form. Fig. $17^A$ is a side elevation, and Fig. $17^B$ a top view, of said type-form, the three figures last mentioned being, like Fig. 16, drawn to a larger scale than the other views. Figs. 18, $18^A$, $18^B$, $18^C$, $18^D$, $18^E$, and $18^F$ represent a modified construction of the co-operating type-forms. Fig. 18 is a sectional view through the machine, corresponding to Fig. 8. Fig. $18^A$ is a detail top view of the modified duplex type-forms. Fig. $18^B$ is a vertical section through the principal type-form in a plane at a right angle to the plane of Fig. 18, the type-form standing in its vertical position. Fig. $18^C$ is a detail rear elevation illustrating the modified movement-synthesizer mechanism employed for positioning the auxiliary type-form. Fig. $18^D$ is a sectional view in elevation on the line $xx$, Fig. $18^C$, also illustrating said movement-synthesizer mechanism. Fig. $18^E$ is a detail top view illustrating the modified arrangement of keys employed in connection with the movement-synthesizer mechanism last mentioned for the positioning of the modified auxiliary type-form; and Fig. 18$^F$ is a detail side view (corresponding with Fig. 3) illustrating the modified rock-shaft employed to connect one of the movement-synthesizers illustrated in Figs. 4 and 8 (but omitted from Fig. 18) with the toothed segment, hereinafter described, by which the principal type-form (illustrated in Fig. 18) is rotated. Fig. 18$^G$ is a cross-section on the line $xx$, Fig. 18$^B$; and Fig. 18$^H$ is an elevation of the auxiliary or bar type-form of Fig. 18, viewed at a right angle to Fig. 18. Figs. 19, 19$^A$, 19$^B$, 19$^C$, and 19$^D$ are detail views representing another modified arrangement of type-forms for printing successive letters of a word at adjacent printing-points simultaneously. Fig. 19 is a top view. Fig. 19$^A$ is a side elevation, partly in section, illustrating the co-operating type-forms. Fig. 19$^B$ is a detail back view illustrating one of the modified movement-synthesizers employed in positioning said type-forms. Fig. 19$^C$ is a sectional elevation on the line $xx$, Fig. 19$^B$, also illustrating said movement-synthesizer mechanism; and Fig. 19$^D$ is a top view of one of the sets of keys employed in positioning said type-forms, there being a set of keys for each of the two type-forms. Fig. 20 is a detail side elevation illustrating the carriage motor mechanism. Fig. 21 is a rear elevation of the carriage motor mechanism. Fig. 22 is a detail front elevation of the same. Fig. 23 is a sectional elevation, in a plane parallel to the plane of Fig. 20, through the center of the mechanism illustrated in Fig. 20. Fig. 24 is a cross-section, in a plane parallel to the planes of Figs. 21 and 22, through the center of the part $b^{86}$, Fig. 20. Fig. 25 is a top view of the type-form. Fig. 26 is a front elevation of the type-form. Fig. 27 is a cross-section on the line $xx$, Fig. 26. Fig. 27$^A$ is a view similar to Fig. 27, the type-bars being omitted. Fig. 28 is a side elevation of the type-form. Fig. 29 is a vertical section through the type-form in a plane parallel to the plane of the preceding figure. Fig. 30 is a top view, and Fig. 30$^A$ a front elevation, of the casting to which the type-bars are hinged and by which they are carried. Fig. 31 is a detail side elevation illustrating the casting $A^{82}$. Fig. 32 is a detail rear elevation illustrating a modified connection between a key and the corresponding rock-arm. Fig. 33 is a detail side elevation illustrating another modification for the same purpose; and Figs. 34, 35, and 36 are details illustrating the arrangement of a movement-synthesizer stop, Fig. 34 being a top view, Fig. 35 a side elevation, and Fig. 36 a perspective.

The drawings are intended to represent the mechanism clearly, so as to enable a mechanic skilled in the art to reduce to practice the invention herein described of co-operating type-forms printing successive letters of a word at adjacent printing-points simultaneously or substantially simultaneously, without other information than is contained herein. The drawings do not pretend however, to represent all the parts in every minute particular with photographic accuracy; and in many of the views (and particularly in the detail views, Figs. 18, 18$^A$, 18$^B$, 18$^C$, 18$^D$, 18$^E$, 18$^F$, 19, 19$^A$, 19$^B$, 19$^C$, and 19$^D$) parts which would be seen in an exact projection are omitted.

My invention, or at least, most important features of my invention may be carried out in a variety of different ways.

I shall first describe the structure illustrated in Figs. 1 to 17 inclusive, which represent my preferred arrangement of type-forms and operating mechanism; and after that has been made clear, I shall describe certain alternative constructions.

The Main-Frame.

The main-frame is formed of cast-iron or other suitable material, and consists of ($a$) a bed-plate; ($b$) a back-piece; ($c$) two side-pieces; ($d$) a brace-rail, connecting the two side-pieces, and ($e$) various minor parts attached to those named. The bed-plate (see particularly Figs. 5 and 15), has a front rib, A, a key-supporting rib, A'; side-ribs, A$^2$ and A$^3$; and a rearward-extending rib, A$^5$. The back-plate (see particularly Figs. 3, 4, 6, 7, 8, 9, 14 and 15) has a bottom rib, A$^{22}$; a top rib, A$^{23}$; and vertical connecting ribs, A$^{24}$, A$^{25}$, A$^{26}$, A$^{27}$ and A$^{28}$. The ribs A$^{25}$, A$^{26}$ and A$^{27}$, are furnished with forward extending projections, A$^{29}$, A$^{29}$, &c. A bar, A$^{32}$, is bolted to the projections A$^{29}$, A$^{29}$, of the rib, A$^{25}$, parallel to said rib. A bar, A$^{33}$, is bolted to the projections A$^{29}$, A$^{29}$, of the rib, A$^{26}$, parallel to said rib, A$^{26}$; and a bar, A$^{34}$, is bolted to the projections, A$^{29}$, A$^{29}$, of the rib, A$^{27}$, parallel to said rib, A$^{27}$. The side ribs, A$^2$ and A$^3$ of the bed-plate, are furnished at their rear ends with inwardly-facing projections, A$^6$, A$^6$. The back-piece is connected with the bed-plate by means of bolts which pass through the lower rib, A$^{22}$, of the back-piece, into the parts, A$^6$, A$^5$, A$^6$, of the latter, binding them firmly together. The side-pieces, A$^{52}$, A$^{53}$, (see particularly Figs. 1, 2, 3, 6 and 9,) of the main-frame, are castings, having each a lower, horizontal part or foot; a vertical or upright part; and an upper, horizontal, backwardly extending part. The lower horizontal part or foot, is secured by bolts to one of the side ribs of the bed-plate, and the upper, horizontal, backwardly extending part is secured by a bolt to the top rib, A$^{23}$, of the back-piece. A brace-rail, A$^{54}$, is bolted to the side-pieces, A$^{52}$, A$^{53}$, at their tops in front. Thus the bed-plate, back-piece and side-pieces are all firmly bound together.

A casting, A$^{62}$ of the form illustrated in the drawings, (see particularly, Figs. 1, 2, 3, 5 and 10,) is attached by bolts, A$^{63}$, A$^{63}$, to the front rib, A. Said casting, A$^{62}$, serves as a bearing for the horizontal ribbon-feed shaft hereinafter described; and also as a bearing for the vertical ribbon-spool shafts and quarter-turn pulleys hereinafter described.

A casting $A^{72}$, of the form illustrated in the drawings, (see particularly Figs. 1, 2 and 20) is attached by bolts, $A^{73}$, $A^{73}$, to the side rib, $A^3$. Said casting, $A^{72}$, serves to support the shaft upon which the wheel that moves the carriage is mounted, and also to support one end of the ribbon-feed shaft hereinbefore mentioned and hereinafter described. It serves, moreover, to support one end of the rock-shaft hereinafter described, by which lateral motion is imparted to the left-hand type-form.

A casting, $A^{82}$, of the form illustrated in the drawings, (see particularly, Figs. 1, 2, 4, 5, 13 and 31,) is attached by machine-screws, (not seen in the drawings,) to the backward extending part, $A^5$, of the bed-plate, and the rib $A^{22}$ of the back-plate. Said casting, $A^{82}$, serves to support one end of the shafts hereinafter described by which the type-form elevating levers are mounted.

A casting, $A^{92}$, of the form shown in the drawings, (see particularly, Figs. 5, 12 and $12^B$) is attached by bolts, $A^{93}$, $A^{93}$, to the backward-extending part $A^5$ of the bed-plate. Said casting serves to support the levers on which the spacing-dogs hereinafter described, and certain other parts of the spacing mechanism are mounted.

A casting, $A^{222}$, of the form illustrated in the drawings, (see particularly, Figs. 5 and 15,) is attached by bolts or machine screws to the inside of the front rib, A. Said casting, $A^{222}$, serves to support the impression-hammers hereinafter described, by which the type-levers of the two type-forms are thrown in against their respective printing-points.

A casting, $B^6$, of the form illustrated in the drawings, (see particularly, Figs. 1, 2, 3, 7, 8 and 10,) is attached by bolts or machine screws to the top of the casting $A^{62}$. Said casting, $B^6$, serves to support the pressure-transmitter by which motion is communicated from one of the hammers to the proper type-lever of the inner or left-hand type-form.

A casting, $A^{242}$, of the form illustrated in the drawings, (see particularly, Figs. 1, 2, 3 and 10,) is attached by bolts, $A^{243}$, $A^{243}$, to the side rib, $A^2$. Said casting, $A^{242}$, serves to support one end of the rock-shaft hereinafter described, by which lateral motion is transmitted to the right-hand type-form.

Castings, $A^{252}$, $A^{252}$, of the form illustrated in the drawings, (see particularly, Figs. 2, 5, 11 and 13,) are attached by bolts, $A^{253}$, $A^{253}$, to the proximate faces of the side-pieces $A^{52}$ and $A^{53}$. Parallel bars, $A^{254}$, are bolted on to the proximate planed faces of each casting, $A^{252}$, $A^{252}$, by bolts $A^{255}$ $A^{255}$. Plinths or washers, $A^{256}$, $A^{256}$, encircle the bolts, $A^{255}$, $A^{255}$, and serve to keep the bar, $A^{254}$, the appropriate distance from the surface of the casting which it faces, and with which it is parallel. The castings, $A^{252}$, $A^{252}$, with their parallel plates $A^{254}$, $A^{254}$, serve as guides to permit of the vertical movement of the axes or center of the radius-pieces or hangers, by which the carriage is supported, without admitting any displacement of said parts.

$A^{262}$, $A^{262}$, $A^{262}$, &c., are adjustable stops, attached fast to the main-frame, and serving to limit the play of the rock-arms or rock-shafts of the movement synthesizers hereinafter described.

Other minor parts of or attached to the main-frame, will be described in other parts of this specification.

The Carriage Mechanism.

The paper carriage illustrated herein is a modification of the well known old style "Remington" paper carriage, to which it is essentially similar in respect of the means for holding the paper and for advancing it from line to line. The novelty consists in the means for mounting the carriage. That, however, is not claimed herein, for it constitutes the subject matter of a prior application of mine, Serial No. 511,633.

The paper carriage (see particularly, Figs. 1, 3, 6, 9, 11, 12, $12^D$, and $12^E$) is adapted and arranged to carry the paper to be printed. The carriage mechanism consists in its most essential elements of a carriage frame; an impression cylinder around which the paper passes and against which the type-levers strike, when the letters and other characters are printed; a pressure-roller and elastic bands, running on pulleys, and serving to feed the paper to the impression-cylinder; interlinear spacing mechanism, whereby the impression cylinder is rotated and the paper fed forward from line to line; suitable hangers or mountings for the paper-carriage, to permit of its play as the printing is done; a space-rack for the letter spacing; and mechanism for impelling the carriage. Of these in their order.

The carriage frame consists of a horizontal double-T rail, $b$, of metal or other suitable material, and cast metal end pieces, $b'$, $b^2$, firmly attached to the rail by bolts or screws. The impression-cylinder or paper roll, $b^3$, is made preferably of wood, covered with vulcanite, according to the usual practice. Metal disks, or end pieces, $b^4$ and $b^5$, the first of which has a toothed periphery, are attached fast to the end of the paper roll by screws. The roll $b^3$, is concentrically mounted by means of screws, $b^6$, $b^6$, passing through holes in the carriage end pieces, $b'$ and $b^2$, and set fast in the impression-cylinder end-pieces, $b^4$ and $b^5$. The pressure-roll, $b^7$, has a metal shaft, $b^8$, passing through its center. Small pulleys or band-wheels, $b^9$, $b^9$, are attached fast to said shaft at each end of the roll $b^7$. The shaft $b^8$, is mounted in little hangers, $b^{22}$, $b^{22}$, which are fulcrumed upon shoulder screws, $b^{23}$, $b^{23}$, set fast in the end-pieces $b'$ and $b^2$. Band-wheels $b^{24}$ and $b^{25}$, respectively, lie at each end of the carriage, in the same plane with the wheels, $b^9$, $b^9$. The upper wheels, $b^{24}$, $b^{24}$, are centered upon shoulder-screws set fast in projections of the end-pieces $b'$ and $b^2$. The lower band-wheels, $b^{25}$, $b^{25}$, are fulcrumed upon centers set fast in little castings, $b^{26}$, $b^{26}$, which are themselves screwed fast to the front surface of the double-T rail, $b$. Strong elastic bands, $b^{27}$, $b^{27}$, pass around the sets of band wheels, $b^9$, $b^{24}$, $b^{25}$, and $b^9$, $b^{24}$, $b^{25}$, respectively, in the manner illustrated in the drawings. They serve to hold the paper in contact with the impression cylinder, $b^3$, and to feed it forward from line to line as the cylinder rotates.

As before stated, the right-hand end-piece, $b^4$, of the cylinder $b^3$, is furnished with teeth. A space-handle, $b^{32}$, is fulcrumed upon one of the screws, $b^6$. A dog, $b^{34}$, is pivotally attached to the space-handle. This dog is in engagement with the toothed periphery of the end-piece, $b^4$, so that when the lower end of the space-handle is pulled toward the operator, the dog, $b^{34}$, acts upon the toothed periphery of the wheel, $b^4$, and rotates the impression-cylinder, $b^3$, a line space. A check-spring, or lock-spring, $b^{35}$, attached to the end-piece, $b'$, with its free end bearing upon and into the teeth of the ratchet-wheel, $b^4$, serves to lock the wheel, $b^4$, and the impression cylinder connected therewith, when not acted upon by the dog or feed-pawl, $b^{34}$, and to insure a uniform movement from line to line.

The construction and arrangement of the space-handle, $b^{32}$, feed-pawl, $b^{34}$, ratchet, $b^4$, and lock-spring, $b^{35}$, have been long in use in the art, and require no further description.

$b^{42}$ is a spring index-plate. It is made of sheet steel or other suitable material, and is screwed fast to the front surface of the double-T rail, $b$. It serves both to assist in holding the paper against the paper-roll, $b^3$, and as an index.

$b^{43}$ is a paper shelf or table. It is formed of sheet metal, attached in a suitable manner to little castings, $b^{44}$, $b^{44}$, which are screwed to the end pieces, $b'$, and $b^2$. A plate, $b^{45}$, (omitted in Figs. 1 and 4,) covers the space bounded by the top surfaces of $A^{52}$, $A^{54}$, $A^{53}$, and $A^{23}$, and serves to prevent the paper carried by the carriage from becoming caught on the frame of the machine or entangled in the movement synthesizer mechanism.

$b^{52}$, $b^{52}$, are parallel levers, which are sometimes termed herein radius-pieces or hangers. The carriage end-pieces, $b'$ and $b^2$, are pivotally mounted in these levers by means of points, $b^{53}$, $b^{53}$, and pointed bolts, $b^{54}$, $b^{54}$, furnished with lock-nuts, $b^{55}$, $b^{55}$. A tempered steel rod, $b^{56}$, is fixed fast in each of the levers, $b^{52}$, $b^{52}$. Said rod serves as a fulcrum to the lever. A guide, formed by one of the castings, $A^{252}$, with its parallel bar, $A^{254}$, before described, serves to permit movement of the fulcrum rod, $b^{56}$, vertically, and to prevent its displacement from right to left. Another lever, radius-piece or hanger, $b^{57}$, is furnished with a shaft, $b^{58}$, firmly attached to it in a suitable manner, as for instance, by shrinking. Said shaft is made pointed at one end, the point being tempered and set in a hole in a bar, $b^{59}$, which is screwed fast to the brace-rail, $A^{54}$. The other end of said shaft has a hole bored into it, and is supported by a pointed bolt, $b^{62}$, furnished with a lock-nut, $b^{63}$. Thus the shaft $b^{58}$, and lever, $b^{57}$, are mounted easily, but firmly. A steel rod, $b^{64}$, lying parallel with the shaft, $b^{58}$, and the rod, $b^{56}$, is firmly attached by shrinking or otherwise to the free end of the radius-piece or hanger, $b^{57}$. This rod is journaled in the lever $b^{52}$, before mentioned, and held in place by a collar, $b^{65}$.

The three distances ($a$) from the fulcrum of the shorter radius-piece, $b^{57}$, to the center of attachment of said piece with the longer radius piece, $b^{52}$, ($b$) from the center of attachment of the longer and shorter radius-pieces to the center of attachment of the longer radius-piece, $b^{52}$, with the carriage end-piece, $b'$ or $b^2$, and ($c$) from the center of attachment of the longer and shorter radius-piece to the axis or center of the longer radius-piece to wit, the center of the rod, $b^{56}$, are all exactly equal, so that the carriage moves in a right line, the fulcrums, $b^{56}$, $b^{56}$, rising as the radius-pieces, $b^{52}$, $b^{52}$, depart from the vertical exactly the distance which the carriage would fall, if the radius-pieces, $b^{52}$, $b^{52}$, moved upon fixed centers.

$b^{72}$ is the space-rack, which is firmly attached by screws to little castings, $b^{73}$, $b^{73}$, which are themselves attached by shrinking to a rod, $b^{74}$. Said rod is journaled in little castings, $b^{75}$, $b^{75}$, which are screwed to the rear surface of the double-T rail, $b$. An arm, $b^{76}$, is attached to the right-hand end of the shaft, $b^{74}$. The arm, $b^{76}$, lies in front of the lower back end of the space-handle, $b^{32}$, so that when the space-handle is pulled by the operator toward him, it acts upon the arm, $b^{76}$, so lifting the rack, $b^{72}$, away from the space-dogs hereinafter described, by which its movement is controlled.

The Carriage Motor.

The carriage motor arrangement herein described is exactly similar to that described in the specification of my before mentioned Letters Patent, No. 502,700; and involves nothing new. See particularly Figs. 2, 11, 20, 21, 22, 23, and 24. A very brief description will suffice. A sleeve, $b^{82}$, is journaled in the casting, $A^{72}$, before mentioned. A shaft, $b^{83}$, is journaled in this sleeve, and in the part, $A^{75}$, of the casting, $A^{72}$. A ratchet wheel, $b^{84}$, provided with a handle, $b^{85}$, is formed integral with or otherwise suitably attached to the sleeve, $b^{82}$. A wheel, $b^{86}$, of the section shown, is firmly attached to the shaft, $b^{83}$, by shrinking, or otherwise. A band or strap, $b^{87}$, connects the wheel, $b^{86}$, with the carriage, one end of said strap being connected with the carriage, while the other end is wound around the periphery of the wheel. A coiled spring, $b^{88}$, having its inner end attached to the sleeve, $b^{82}$, and its outer end attached to the wheel, $b^{86}$, by a pin, $b^{89}$, driven into the wheel, $b^{86}$, serves to urge the wheel, $b^{86}$, in the direction of the arrow, and thus to urge the carriage from right to left. A stop-pawl or catch, $b^{92}$, serves to hold the ratchet-wheel, $b^{84}$, and sleeve, $b^{82}$, in any position that may be necessary to give the spring, $b^{88}$, the required tension.

The spacing mechanism will be described after the type-form and type-form controlling mechanism have been described.

The Ribbon Arrangement.

The ribbon arrangement herein described, is as before stated, substantially similar to that described in my before mentioned Letters Patent, No. 502,700. A rearrangement and alteration of some of the parts have been made to conform to other parts of the mechanism; but no importance is attached to this ribbon mechanism, and a brief description of it will suffice. See Figs. 1, 2, 2$^A$, 2$^B$, 3 and 10.

The inking ribbon, $c$, is wound on two spools, $c'$, $c'$. These spools are mounted respectively on shafts, $c^2$, $c^2$. The casting A$^{62}$, forms a bearing for these shafts. The ribbon passes also around, (that is, turns at an angle of about ninety degrees on,) little quarter-turn pulleys, $c^3$, $c^3$, which are journaled between points supported by the forward projecting arms, A$^{64}$, A$^{64}$, A$^{64}$, A$^{64}$, of the casting, A$^{62}$. Each of the shafts, $c'$, $c'$, has a collar, $c^4$, suitably attached to it, (as for instance, by a set screw,) immediately above the top of the casting, A$^{62}$, and a miter-gear, $c^5$, in like manner attached to it immediately below the casting, A$^{62}$. In this manner, displacement of the ribbon-spool shafts, $c'$, $c'$, is prevented.

$c^6$ is the horizontal ribbon-spool-driving-shaft, carrying three miters, $c^7$, $c^8$ and $c^8$, hereinafter described.

The casting, A$^{62}$, and the parts, A$^{74}$, A$^{75}$ of the casting A$^{72}$, form bearings for the ribbon spool-driving-shaft, $c^6$, that is to say, one end of said shaft is supported by the parts, A$^{74}$, A$^{75}$, of the casting, A$^{72}$, and the other end is supported by the hub of the rightmost miter, $c^5$, the miter being attached fast to the shaft $c^6$, and the hub of the miter journaled in the casting, A$^{62}$; and the shaft, $c^6$, is movable longitudinally in the direction of its axis in said bearings, as well as rotatively mounted therein. A miter-wheel, $c^7$, lying between the parts, A$^{74}$ and A$^{75}$, of the casting, A$^{72}$, is loosely keyed or feathered to the shaft, $c^6$, in such a manner that the two rotate together, while the shaft, notwithstanding, is free to move somewhat in the direction of its longitudinal axis, without moving the wheel, $c^7$. Said miter-wheel, $c^7$, meshes with another miter-wheel, $c^9$, which last mentioned miter is formed at one end of a sleeve, $c^{22}$, at the other end of which is an escapement or ratchet-wheel, $c^{23}$. This escapement $c^{23}$, is formed as a part of the sleeve, $c^{22}$, and miter, $c^9$, before mentioned, and lies in close proximity to the flange, $c^{24}$, and is connected therewith by means of a pawl or detent, $c^{25}$, carried by the flange, $c^{24}$, and normally spring-pressed against the ratchet-wheel, $c^{23}$. The flange, $c^{24}$, on which the detent $c^{25}$ is centered, is suitably attached to the shaft, $b^{83}$, (as for instance, by a set-screw,) so that it moves with said shaft. The sleeve, $c^{22}$, on the contrary, and the miter-wheel, $c^9$, and ratchet-wheel, $c^{23}$, formed integral therewith, are mounted loosely upon said shaft, $b^{83}$. The detent, $c^{25}$, before mentioned connects the parts in such a manner that the ratchet-wheel, $c^{23}$, sleeve, $c^{22}$, and miter, $c^9$, move with the flange, $c^{24}$, and shaft, $b^{83}$, when the wheel, $b^{86}$, mounted fast on said shaft, urges the carriage from right to left, (as viewed from in front,) but not when the carriage moves in the opposite direction. This movement of the escapement, $c^{23}$, sleeve, $c^{22}$, and miter, $c^9$, in turn moves the miter-wheel, $c^7$, and ribbon-spool-driving-shaft, $c^6$, and miter-wheels, $c^8$, $c^8$, which are firmly attached to the shaft, $c^6$, in a suitable manner, (as for instance, by shrinking.) Said miter-wheels, $c^8$, $c^8$, are arranged in such a manner that they mesh respectively with the miter-wheels, $c^5$, $c^5$, attached to the ribbon-spool shafts, $c^2$, $c^2$. The miters, $c^8$, $c^8$, however, are placed such a distance apart upon the ribbon-spool-driving-shaft, $c^6$, that when the right-hand miter-wheels, $c^8$ and $c^5$, mesh with each other, the left-hand pair, $c^8$ and $c^5$, are disengaged, and vice versa; and the before mentioned movement of the shaft, $c^6$, in the direction of its longitudinal axis, is for the purpose of bringing the miters, $c^8$, $c^8$, carried by said shaft, $c^6$, alternately into engagement with the right-hand and left-hand ribbon-spool-shaft-miters, $c^5$, $c^5$, so that the ribbon is first wound, say, from the right-hand spool on to the left-hand spool, and then vice versa, and so on alternately.

The means provided for moving the shaft, $c^6$, longitudinally, and for locking it in its right-hand and left-hand positions, are the following: $c^{26}$ is a collar attached fast to the shaft, $c$. A little lever, $c^{27}$, serves as a detent. Said lever is supported by, and fulcrumed upon, a shoulder screw set fast in the arm, A$^{65}$, of the casting, A$^{62}$. When said detent, $c^{27}$, is dropped down on the right-hand side of the collar, $c^{26}$, the left-hand pair of miters, $c^8$ and $c^5$, are held in mesh with each other; and so in like manner, when the detent is lifted and the shaft, $c^6$, pushed to the right, and the detent then dropped down on the left-hand side of the collar, $c^{26}$, the right-hand pair of miters, $c^8$ and $c^5$, are held in mesh with each other. Thus the ribbon is wound first one way and then the other, as desired.

It is now proper to describe the right-hand keys, the type-form corresponding thereto, and the means connecting the keys and type-form; and it will be best to describe first the type-form, and then the keys, and after that the connecting mechanism.

The Type-Form Corresponding to the Right Hand.

(See particularly Figs. 7, 10, 16, 25, 26, 27, 27$^A$, 28, 29, 30 and 30$^A$.) The type-form for the right hand, which is the principal type-form, consists, as figured in the drawings, of eight type-bars, suitably mounted, and carrying each eight characters. These bars are marked respectively D, D', $D^2$, $D^3$, $d'$, $d^2$, $d^3$ and $d^4$, of which the type-bar, D, lies normally immediately in front of the printing-point. Said bars are mounted for movement together up and down, and from right to left for the positioning of the characters, and for play individually in-and-out for the printing of the character brought to the printing-point, in the following manner, that is to say, parallel levers, $d^{22}$, $d^{22}$, are mounted on shafts or trunnions, $d^{23}$, $d^{23}$, supported by points or pointed screws, set respectively in the bar, $A^{33}$, before mentioned and the casting, $A^{82}$.

$d^{24}$ is a casting having a vertical arm, or leg and a horizontal body. The vertical arm of $d^{24}$ is pin-jointed to the outer ends of the levers, $d^{22}$, $d^{22}$, so that it is moved up and down as they move up and down. The horizontal body of the casting, $d^{24}$, serves to support points, $d^{25}$, $d^{25}$, and screws, $d^{26}$, $d^{26}$, furnished with lock-nuts, $d^{27}$, $d^{27}$, between which horizontal shafts, $d^{28}$, $d^{28}$, are mounted. The shafts, $d^{28}$, $d^{28}$, serve to mount parallel guide-levers, $d^{29}$, $d^{29}$, which carry at their tops, shafts or trunnions, $d^{32}$, $d^{32}$, which latter are pivotally connected by points, $d^{33}$ $d^{33}$, and screws, $d^{34}$, $d^{34}$, (furnished with lock-nuts, $d^{35}$, $d^{35}$,) with a casting, $d^{36}$, which carries a fixed shaft, $d^{37}$, on which the type-bars, D, D', $D^2$, $D^3$, $d'$, $d^2$, $d^3$ and $d^4$, are mounted.

Steel pins, $d^{38}$, $d^{38}$, &c., serve to hold the various type-bars apart in their proper places, below the center, $d^{37}$; and above the center, each bar is furnished with a tail-piece, which lies in one of the recesses of the slotted cross-bar, $d^{39}$.

Steel type-bar springs, (not shown in the drawings,) serve to keep the type-bars normally in the positions shown in the drawings with reference to the casting $d^{36}$, and to return them to their normal positions, when moved therefrom. It will be seen that by the parallel levers, $d^{22}$, $d^{22}$, the type-form is mounted for movement in the direction of the length of the type-bars. By the other parallel levers, $d^{29}$, $d^{29}$, the type-form is mounted for movement in a direction transverse to the length of the type-bars, and across the type-form as a whole; while each individual type-bar has an in-and-out movement of its own, on the shaft, $d^{37}$, for printing. It remains now to describe how these various movements are effected.

The mechanism figured in the drawings for positioning the type-forms belongs to the genus movement synthesizer described in the specification of the before mentioned Letters Patent No. 502,700, granted to me on August 8, 1893, for improvements in type-writing machines, to which specification reference is hereby had and made for a fuller description of movement synthesizer mechanism. By such mechanism, a few keys are used individually and in various combinations to print numerous characters.

In the drawings, (see particularly Figs. 1, 2, 4, 5 and 13,) there are ten keys for the right hand, $e$, $e'$, $e^2$, $e^3$, $E^4$, $e^4$, $E^5$, $e^5$, $E^6$ and $e^6$. These keys serve to control two movement synthesizers at the back of the machine, one of which serves to move the type-form up and down, while the other serves to move the type-form from side to side. The keys, $e$, $e'$, $e^2$, $E^6$ and $e^6$, are connected with the movement synthesizer that moves the type-form up and down, and with that movement synthesizer only. The keys, $e^3$, $E^4$, $e^4$, $E^5$ and $e^5$, are connected with the movement synthesizer that serves to move the type-form transversely, and with that movement synthesizer only, the keys $e^3$, $e^4$ and $e^5$, being each connected with one movement synthesizer element only, while the keys $E^4$ and $E^5$, are each connected with two elements of the same movement synthesizer.

The movement synthesizer for moving the type-forms transversely, (see particularly, Figs. 4, 8 and 13,) consists most essentially of three rock-levers, or rock-arms, $f'$, $f^2$, and $f^4$, two levers, $h^2$ and $h^4$, and three links, $g'$, $g^2$ and $g^4$, connecting the rock-arms, $f'$, $f^2$ and $f^4$, respectively with the levers, $h^2$ and $h^4$. The lever, $h^2$, is connected at one point with the link, $g'$, at another point with the link, $g^2$, and at a third point with the lever, $h^4$. The lever, $h^4$, is connected at one point with the lever, $h^2$, as just stated, at another point with the link, $g^4$, and at a third point, by a link, $h^5$, with the arm, $h^6$, of the rock-shaft, $h^7$, whose other arm, $h^8$, is connected by a link, $h^9$, with one of the levers, $d^{29}$, $d^{29}$, by which the type-form is mounted for transverse or lateral movement. A hanger, or hanging lever, $h^{22}$, centered on a shoulder screw, $h^{23}$, screwed fast into the top rib, $A^{23}$ of the back-piece, is connected with the lever, $h^2$, at the point at which said lever is connected with the link, $g'$, and serves to hold the levers, $h^2$ and $h^4$, in their proper vertical positions. The rock-arm, $f'$, is connected by a push-up, $k'$, with the keys, $E^5$ and $e^5$. The rock-lever, $f^2$, is connected by the push-up, $k^2$, with the keys, $e^4$ and $E^4$; and the rock-lever, $f^4$, is connected by the push-up, $k^4$, with the keys, $e^3$, $E^4$ and $E^5$. The key, $e^5$, when pressed down by the operator in front of the fulcrum, rises back of the fulcrum, and through the reach-up, $k'$, moves the arm, $f'$, and link, $g'$, from their normal position of parallelism with each other, rocking the lever, $h^2$, on its point of connection with the link, $g^2$, as a fulcrum, rocking the lever, $h^4$, on its point of connection with the link, $g^4$, as a fulcrum, rocking the rock-shaft, $h^7$, and moving the link, $h^9$, and the type-form, one letter-space, or type-bar space in the direction of the arrow, thus bringing the type-bar, D', in front of the printing-point. The key, $e^4$, when pressed down by the operator in front of the fulcrum, rises back of the fulcrum, and through the reach-up, $k^2$, moves the arm, $f^2$, and the link, $g^2$, from their normal positions of alignment with each other, rocking the lever, $h^2$, on its point of connection with the link, $g'$, as a fulcrum, rocking the lever, $h^4$, on its point of connection with the link, $g^4$, as a fulcrum, rocking the rock-shaft, $h^7$, and moving the link, $h^9$ and type-form two letter-spaces or type-bar spaces, in the direction of the arrow, thus bringing the type-bar, $D^3$ in front of the printing-point. The keys, $e^4$ and $e^5$, when pressed down simultaneously, by the operator, in front of the fulcrum, rise back of the fulcrum, and each in the manner described effects the movement already described, so that the type-form is moved three type-bar spaces, in the direction of the arrow, and the type-bar, $D^3$, brought in front of the printing-point. The key, $e^3$, when pressed down by the operator in front of the fulcrum, rises back of the fulcrum, and through the reach-up, $k^4$, moves the arm, $f^4$, and link, $g^4$, from their normal positions of alignment with each other, rocking the lever, $h^4$, on its point of connection with the lever, $h^2$, as a fulcrum, rocking the rock-shaft, $h^7$, and moving the link, $h^9$ and type-form four letter spaces in the direction contrary to the arrow, thus bringing the type-bar, $d^4$, in front of the printing-point.

The key, $E^5$, is a combination key, exactly equivalent to the keys, $e^5$ and $e^3$; and the same effect may be produced by depressing $e^5$ and $e^3$ simultaneously, or by depressing $E^5$ alone; for $E^5$, when depressed, acts through the reach-up, $k'$, upon the rock-arm, $f'$ and link, $g'$, and through the reach-up, $k^4$, upon the rock-lever, $f^4$ and link, $g^4$; and the movement of one letter-space in the direction of the arrow, belonging to the rock-arm, $f'$, and link, $g'$, is subtracted from the movement of four letter spaces in the contrary direction, belonging to the rock-arm, $f^4$ and link, $g^4$, and the type-form is given a resultant movement of three letter-spaces, which brings the type-bar, $d^3$, in front of the printing-point. The key, $E^4$, is also a combination key, exactly equivalent to the keys, $e^4$ and $e^3$; and the same effect may be produced by depressing $e^4$ and $e^3$ simultaneously or by depressing $E^4$ alone, for the key, $E^4$, when depressed, acts through the reach-up, $k^3$, upon the rock-lever, $f^2$ and link, $g^2$, and through the reach-up, $k^4$, upon the rock-lever, $f^4$, and link, $g^4$; and the movement of two letter-spaces in the direction of the arrow, belonging to the rock-lever, $f^2$, and link, $g^2$, is subtracted from the movement of four letter spaces in the contrary direction belonging to the rock-lever, $f^4$, and link, $g^4$, so that the type-form is given a net or resultant movement of two letter-spaces, in the direction opposite to that of the arrow, which brings the type-bar, $d^2$, in front of the printing-point.

The keys, $E^4$ and $E^5$, are together equal to the keys, $e^3$, $e^4$ and $e^5$, so that the same effect may be produced by depressing, $e^3$, $e^4$ and $e^5$ together, or by depressing $E^4$ and $E^5$ together. In either case, the rock-levers, $f'$, $f^2$ and $f^4$ and links, $g'$, $g^2$ and $g^4$, are moved from their normal positions; and the movement of one letter-space in the direction of the arrow belonging to the arm $f'$ and link $g'$, and the movement of two letter-spaces in the direction of the arrow belonging to the rock-lever, $f^2$ and link, $g^2$, are both subtracted from the movement of four letter spaces in the contrary direction, belonging to the rock-lever, $f^4$, and link, $g^4$, so that the type-form is moved but one letter-space in the direction contrary to the arrow, which brings the type-bar, $d'$, in front of the printing-point. So much in this place for the lateral positioning of the type-form.

The keys, $e$, $e'$, $e^2$, $E^6$ and $e^6$, as before stated, serve to position the type-form vertically. The movement synthesizer employed for this purpose (see particularly, Figs. 4, 8, 9, 13, 13$^A$,) consists most essentially of three rock-shafts $L'$, $L^2$ and $L^4$, with rock-arms marked respectively $m'$, $M'$, $m^2$, $M^2$, and $m^4$, $M^4$; levers $o^2$ and $o^4$; and links, $n'$, $n^2$ and $n^4$, connecting the arms, $m'$, $m^2$ and $m^4$ respectively of the rock-shafts, $L'$, $L^2$ and $L^4$, with the levers, $o^2$ and $o^4$. The lever, $o^2$, is connected at one point with the link, $n'$, at another point, with the link, $n^2$, and at a third point with the lever $o^4$. The lever $o^4$ is connected at one point with the lever, $o^2$, as just stated, at another point with the link, $n^4$; and at a third point said lever $o^4$ is connected with the vertical arm, $d^{42}$, of the type-bar raising lever, $d^{22}$. The arm, $M'$, of the rock-shaft, $L'$, is connected by the reach-up, $l'$, with the keys, $e^2$ and $e'$; the arm, $M^2$ of the rock-shaft, $L^2$, is connected by the reach-up, $l^2$, with the keys, $e$ and $e'$; and the arm, $M^4$ of the rock-shaft, $L^4$, is connected by the reach-up, $l^4$, with the keys, $E^6$ and $e^6$. When the key, $e^2$, is depressed by the operator in front of the fulcrum it rises back of the fulcrum, and through the reach-up, $l'$, and arm, $M'$, rocks the rock-shaft, $L'$, moves the arm, $m'$, and link, $n'$, from their normal positions of alignment with each other, and moves the lever, $o^2$, on its point of connection with the link, $n^2$, as a fulcrum, which in turn moves the lever, $o^4$, on its point of connection with the link, $n^4$, as a fulcrum, and raises the type-bar-raising levers, $d^{22}$, $d^{22}$, and the type-form, one letter-space. When the key $e$ is depressed by the operator in front of the fulcrum it rises back of the fulcrum, and through the reach-up, $l^2$, and arm, $M^2$, rocks the rock-shaft, $L^2$, moves the arm, $m^2$, and link, $n^2$, from their normal position of alignment with each other, and moves the lever, $o^2$, on its point of connection with the link, $n'$, as a fulcrum, which in turn moves the lever, $o^4$, on its point of connection with the link, $n^4$, as a fulcrum, and depresses the type-bar-raising levers, $d^{22}$, $d^{22}$, and the type-form, two letter-spaces. When the key, $e'$, is depressed by the operator in front of the fulcrum, it rises back of the fulcrum, and through the reach-ups, $l'$ and $l^2$, and arms $M'$ and $M^2$, rocks the rock-shafts, $L'$ and $L^2$, moving the arms, $m'$ and $m^2$, from their normal positions of alignment with their respective links, $n'$ and $n^2$, giving the lever, $o^2$, a movement compounded of the individual movements given to it by the links, $n'$ and $n^2$, and moving the lever, $o^4$, on its point of connection with the link, $n^4$, as a fulcrum, and depressing the type-form-raising levers, $d^{22}$, $d^{22}$, and the type-form, one letter space. When either of the keys, $e^6$, $E^6$, is depressed by the operator in front of the fulcrum, it rises back of the fulcrum, and through the reach up, $l^4$, and arm, $M^4$, rocks the rock-shaft, $L^4$, moving the arm, $m^4$, and link, $n^4$, from their normal positions of alignment with each other, moving the lever, $o^4$, on its point of connection with the lever, $o^2$, as a fulcrum, and raising the type-form-raising levers, $d^{22}$, $d^{22}$, four letter-spaces. If either of the keys, $e^6$, or $E^6$, be depressed by the operator simultaneously with the key, $e^2$, the movement of one letter-space given to the type-form by the key, $e^2$, is added to that of four letter-spaces given by the key $e^6$, or $E^6$, and the type-form is raised five letter-spaces. If either of the keys, $e^6$, or $E^6$, be depressed by the operator simultaneously with the key, $e$, the movement of two letter-spaces downward belonging to the key $e$, is subtracted from the movement of four letter-spaces upward belonging to the key, $E^6$, or $e^6$, so that there is a net upward movement of the type-form of two letter-spaces; and if either of the keys, $e^6$ or $E^6$, be depressed simultaneously with the key, $e'$, the movement of one letter-space downward, belonging to the key, $e'$, (and being the algebraic sum of the upward movement of one letter-space due to the operation of the reach up $l'$, rock-arm, $M'$ and rock-shaft $L'$, upon the arm $m'$ and link $n'$, and the movement downward of two letter-spaces, due to the operation of the reach-up $l^2$ through the rock-arm $M^2$ and rock-shaft $L^2$ upon the arm $m^2$ and link $n^2$,) is subtracted from the movement of four letter-spaces upward belonging to the key, $e^6$ or $E^6$, leaving a net upward movement of three letter-spaces.

To recapitulate, the type-bar, D, stands normally in front of the printing-point. The type-bar, D', is brought in front of the printing-point by depressing the key, $e^5$. The type-bar, $D^2$, is brought in front of the printing-point by depressing the key, $e^4$. The type-bar $D^3$, is brought in front of the printing-point by depressing the keys, $e^4$ and $e^5$. The type-bar, $d'$, is brought in front of the printing-point by depressing the keys, $e^3$, $e^4$ and $e^5$, or by depressing the combination keys, $E^4$ and $E^5$. The type-bar, $d^2$, is brought in front of the printing-point by depressing the keys $e^3$ and $e^4$, or by depressing the combination key, $E^4$. the type-bar, $d^3$, is brought in front of the printing-point by depressing the keys, $e^3$ and $e^5$, or by depressing the combination key, $E^5$; and the type-bar, $d^4$, is brought in front of the printing-point by depressing the key, $e^3$.

Each type-bar carries, as before mentioned, eight characters, arranged vertically one above the other. Counting from the bottom upward, the first, or lowest character on each type-bar is brought to the level of the printing-point by depressing the keys, $e^2$ and $e^6$, or $E^6$, simultaneously. The second character on each type-bar is brought to the level of the printing-point by depressing the key $e^6$, or the key, $E^6$. The third character on each type-bar is brought to the level of the printing-point by depressing the key $e^6$, or the key, $E^6$, with the keys, $e$ and $e^2$, or with the key, $e'$, (which is equivalent to $e$ and $e^2$, because it operates the parts belonging to both these keys.) The fourth character on each type-bar is brought to the level of the printing-point by depressing the key, $e^6$, or the key, $E^6$, simultaneously with the key, $e$. The fifth character on each type-bar is brought to the level of the printing-point by depressing the key, $e^2$. The sixth character on each type-bar lies normally on a level with the printing-point. The seventh character on each type-bar is brought to the level of the printing-point by depressing the keys, $e$ and $e^2$, or the key, $e'$, which is equivalent to them; and, the eighth character on each type-bar is brought to the level of the printing-point by depressing the key, $e$.

The characters may be arranged upon the type-form in the order represented in the diagrammatic view, Fig. 16, (which represents each character naturally as it prints instead of showing them inverted as they stand on the type-form,) or in any other manner desired.

Whatever the arrangement, to print any given character, depress the key or keys, if any, necessary to bring the particular type-bar on which the character is formed in front of the printing-point, and depress also, at the same time, the key or keys, if any, necessary to bring a character on the level of the particular character to be printed to the level of the printing-point, as already explained.

With the characters arranged as represented in Fig. 16, the various letters and other characters are brought to the printing-point by the various keys as set forth in the following table, (the combination keys, $e'$, $E^4$ and $E^5$, being in all cases given instead of the simple keys, $e'$ and $e^2$, $e^3$ and $e^4$, and $e^3$ and $e^5$, to which said combination keys are respectively equal,) to-wit: a by the key $e^4$; b by the keys $e'$ and $e^5$; c by the key $e$; d by the keys $e^2$, $E^4$ and $E^5$; e by the key $e^5$; f by the keys $e^2$ and $e^3$; g by the keys $e^2$, $e^4$ and $e^5$; h by the keys $e^4$ and $e^5$; i by the key $E^4$; j by the keys $e'$, $E^4$ and $E^5$; k by the keys $e'$ and $e^3$; l by the keys $e^2$ and $e^4$; m by the keys $e^2$ and $E^4$; n by the key $e'$; o by the key $E^5$; p by the keys $e'$ and $E^4$; q by the keys $e'$ and $e^4$; r by the keys $E^4$ and $E^5$; s by the key $e^3$; t by the key $e^2$; u by the keys $e^3$ and $e^5$; v by the keys $e'$, $e^4$ and $e^5$; w by the keys $e'$ and $E^5$; x by the keys $e$ and $e^4$; y by the keys $e^2$ and $e^5$; z by the keys $e$ and $e^5$.

To produce any capital letter, depress the key or keys that produce that letter lower case, and depress also at the same time, the key $e^6$ or the key $E^6$.

The various marks of punctuation are produced by the various keys as follows, to-wit: , by the keys, $e$ and $E^4$; . by the keys $e$ and $E^5$; ' by the keys $e$, $e^4$ and $e^5$; - by the keys $e$, $E^4$ and $E^5$; ? by the keys $e$ and $e^3$; ; by the keys $e$, $E^4$ and $E^6$; : by the keys $e$, $E^5$ and $E^6$; " by the keys $e$, $e^4$, $e^5$ and $e^6$; ( by the keys $e$, $E^4$, $E^5$ and $E^6$;.) by the keys $e$, $e^3$ and $e^6$; — by the key $e^6$.

Numbers may be written by the Roman notation, or spelled out in full; or, if desired, an additional row of characters may be added to the type-form for the numerals 2 to 9 inclusive, and an additional element added to the movement synthesizer, and an additional key to the key-board for the controlling of such element. This will be readily understood.

The Impression Mechanism for the Type-Form Operated by the Right Hand.

It remains to describe the manner in which the character is printed after it has been brought to the printing-point in the manner already described. See particularly Figs. 2, 5, 5ᴬ and 15.

Underneath the right-hand keys is a frame formed of a shaft, $P^2$, and a front-and-side piece, $P^3$. The shaft, $P^2$, is fulcrumed between points, as shown in the drawings, and the part, $P^3$, is so placed that it is acted on by any key that is depressed. A hammer, $p$, is mounted on a shaft or trunnion, $p^3$, which latter is supported between centers or points, as shown in the drawings, which points are set fast in the casting $A^{222}$, attached to the front-rib, A, of the main-frame. On the shaft, $p^3$, is an arm, $p^4$. A screw, having the portion remote from the head threadless, is set fast in the arm, $p^4$, and projects under the part $P^3$, of the frame before mentioned, so that whenever any of the right-hand keys are depressed, the frame formed of parts $P^2$ and $P^3$ is moved thereby, the arm $p^4$ is moved downward, and the hammer, $p$, thrown in. The parts are so adjusted that the hammer, $p$, when moved in as far as it is impelled by the keys, (that is, as far as it would be carried by the keys if depressed very slowly,) still stands some distance in front of the type-bar to be struck, so that when the keys have been depressed as far as they are depressed, an instant is left for the arresting of the type-form in its proper position before the hammer, which continues to move in under the influence of the momentum imparted to it by the keys, strikes the type-bar lying in front of the printing-point from which the printing is to be done, and carries it in against the printing-point with sufficient force to print. The hammer and type-bar, of course, rebound immediately after the impact, and return to their normal positions as the keys are released.

The Left-Hand Type-Form, Keys, and Type-Form Positioning Mechanism.

(See particularly, Figs. 7, 8, 11, 17, 17ᴬ and 17ᴮ.) The left-hand type-form has four type-bars, P, P', $p'$ and $p^2$, each carrying four characters. The type-bar, P, lies normally in front of the printing-point. The four type-bars are mounted for movement together up and down, and from right to left, for the positioning of the characters, and for play individually in and out, for the printing of the haracter brought to the printing-point, in he following manner, that is to say:

$p^{22}$, $p^{22}$, are parallel levers, of equal length, mounted on shafts or trunnions, $p^{23}$, $p^{23}$, supported by points or pointed screws set respectively in the rib, $A^{26}$, before mentioned and the casting, $A^{32}$.

$p^{24}$ is a casting having a vertical arm or leg, and a horizontal part or body. The vertical arm of said casting, $p^{24}$, is pin-jointed to the free ends of the levers, $p^{22}$, $p^{22}$, so that it is moved up and down as said levers move up and down. The horizontal body of the casting, $p^{24}$, serves to support points, $p^{25}$, $p^{25}$, and screws, $p^{26}$, $p^{26}$, furnished with lock-nuts, $p^{27}$, $p^{27}$, between which small horizontal shafts, $p^{28}$, $p^{28}$, are mounted. The shafts, $p^{28}$, $p^{28}$, serve to mount parallel guide-levers, $p^{29}$, $p^{29}$, of equal length, which carry at their tops, shafts or trunnions, $p^{32}$, $p^{32}$, which latter are pivotally connected by points, $p^{33}$, $p^{33}$, and screws, $p^{34}$, $p^{34}$, (furnished with lock-nuts, $p^{35}$, $p^{35}$,) with a casting, $p^{36}$, which carries a fast shaft or rod, $p^{37}$, on which the type-bars, P, P', $p'$, and $p^2$, are mounted.

Steel pins, $p^{38}$, $p^{38}$, &c., set fast in the casting, $p^{36}$, serve to hold the type-bars apart in their proper places.

$b^{43}$, &c., are small type-bar returning-springs, serving to keep the type-bars in their normal positions remote from the paper-roll, $b^3$, and to return them to their normal positions after printing. A plate $p^{44}$, (omitted in some of the views,) serves to limit the play of the type-bars.

It will be seen that by the levers, $p^{22}$, $p^{22}$, the type-form is given a movement in the direction of the length of the type-bars, and by the levers $p^{29}$, $p^{29}$, the type-form is given a movement in a direction transverse to the length of the type-bars; while each individual type-bar has also an in-and-out motion of its own, on the rod, $p^{37}$, as a center, for printing. It remains now to describe how these various movements are effected.

There are ten keys for the left hand, $q$, $q'$, $q^2$, $q^3$, $Q^4$, $q^4$, $Q^5$, $q^5$, $Q^6$ and $q^6$. The keys, $q$, $Q^6$ and $q^6$, are space keys, that is, they print nothing, but make spaces only, and will be described hereinafter. The keys, $q'$, $q^2$, $Q^4$, $q^4$, $Q^5$ and $q^5$, serve to control two movement synthesizers at the back of the machine, one of which serves to move the type-form up and down, and the other to move it from side to side. The keys, $q'$ and $q^2$, are connected with the movement synthesizer for moving the type-form from right to left, and with that movement synthesizer only. The keys, $q^4$ and $q^5$, are connected with the movement synthesizer for moving the type-form up and down, and with that movement synthesizer only; while the keys, $Q^4$ and $Q^5$, are connected both with the movement synthesizer for moving the type-form up and down, and with that for moving it transversely. The keys, $Q^4$ and $Q^5$, are, it will be observed, in reality combination keys; $Q^4$ being exactly equivalent to $q^4$ and $q'$, and $Q^5$ being exactly equivalent to $q^5$ and $q'$. The key, $q^3$, is not connected with either of the movement synthesizers, and does not move the type-form at all. It serves only to print the character at the "dead-point," as hereinafter described.

The movement synthesizer for moving the type-form transversely, (see particularly Figs. 4, 6 and 13,) consists most essentially of two rock-levers, $r'$ and $r^2$, a lever, R, and two links, R' and R², connecting the levers, $r'$ and $r^2$, respectively with the lever, R. Said lever, R, is connected at one point with the link, R', at another point with the link, R², and at a third point with the arm, R³, of the rock-shaft, R⁴, whose other arm, R⁵, is connected by a link, R⁶, with one of the vertical guide-levers, $p^{29}$. The rock-shaft, R⁴, is supported between points, set respectively in the rib A²⁸ of the back-plate and in the casting A⁷². The rock-lever, $r'$, is connected with its keys, $q'$, $Q^4$ and $Q^5$, by a push-up, $s'$, furnished with a foot shaped as shown in the drawings, so that it overlies the keys, $q'$, $Q^4$ and $Q^5$, by which it is worked, while lying so far remote from the keys, $q^2$, $q^3$ and $q^4$, that it is not affected by their motion. A guide-lever, $s$, lying parallel with the rock-lever, $r'$, serves to keep the push-up mentioned in its proper position. The rock-lever, $r^2$, is connected with the key, $q^2$, by a push-up, $s^2$. When any of the keys, $q'$, $Q^4$ or $Q^5$, is pressed down by the operator in front of the fulcrum, it rises back of the fulcrum, and through the push-up, $s'$, rocks the lever, $r'$, moving it and the link, R', from their normal position of alignment with each other, moving the lever, R, on its point of connection with the link, R² as a fulcrum, and moving the rock-arm, R³, shaft, R⁴, rock-arm, R⁵, and link, R⁶, so moving the type-form connected therewith one letter-space, (that is, the distance from the center of one type-bar to the center of the next proximate type-bar,) toward the left hand side of the machine, which brings the type-bar, P', in front of the printing-point. When the key, $q^2$, is pressed down by the operator in front of the fulcrum, it rises back of the fulcrum, and through the push-up, $s^2$, rocks the lever, $r^2$, moving it and the link, R², from their normal position of alignment with each other, moving the lever, R, on its point of connection with the link, R', as a fulcrum, and moving the rock-shaft, R⁴, and type-form connected therewith, two letter-spaces toward the right-hand side of the machine, which brings the type-bar, $p^2$, in front of the printing-point. When the key, $q^2$, is depressed by the operator simultaneously with one of the keys, $q'$, $Q^4$ or $Q^5$, the movement of one letter space in the direction of the arrow, belonging to the rock-lever, $r'$, and link, R', is subtracted from the movement of two letter-spaces in the contrary direction belonging to the rock-lever, $r^2$, and link, R²; so that the type-form is moved one letter-space toward the right-hand side of the machine, which brings the type-bar, $p'$, in front of the printing-point.

The keys, $Q^4$, $q^4$, $Q^5$ and $q^5$, as before mentioned, serve to position the type-form vertically. The movement synthesizer employed for this purpose consists most essentially of two rock-shafts, $t'$ and $t^2$ furnished with rock-arms, marked respectively, $u'$ and $U'$, and $u^2$ and $U^2$; a lever, $v$; and links, $w'$, $w^2$, connecting the arms $u'$ and $u^2$, respectively, of the shafts, $t'$ and $t^2$, with the lever $v$. Said lever is connected at one point with the link, $w'$, at another point with the link, $w^2$, and at a third point with the arm, $p^{42}$, which is connected fast with the lever, $p^{23}$, by means of the shaft $p^{23}$. The arm, U' of the rock-shaft, $t'$, is connected by a push-up, W', with the keys, $Q^4$ and $q^4$; and the arm, $U^2$, of the rock-shaft, $t^2$, is connected by a push-up, W², with the keys, $Q^5$ and $q^5$. The key, $q^4$ or $Q^4$, when pressed down by the operator in front of the fulcrum, rises back of the fulcrum, and through the push-up, W', and arm, U', rocks the shaft, $t'$, moving the arm, $u'$ and link, $w'$, from their normal position of alignment with each other, moving the lever, $v$, on its point of connection with the link, $w^2$, as a fulcrum, and moving the type-form upward one letter-space. The key, $q^5$ or $Q^5$, when pressed down by the operator in front of the fulcrum rises back of the fulcrum, and through the push-up, W², and arm, U², rocks the rock-shaft, $t^2$, moving the arm, $u^2$, and link, $w^2$, from their normal positions of alignment with each other, moving the lever, $v$, on its point of connection with the link, $w'$, as a fulcrum, and moving the type-form downward two letter-spaces. When either of the keys, $q^4$ or $Q^4$, is depressed simultaneously with either of the keys $q^5$ or $Q^5$, the upward movement of one letter-space belonging to the key, $q^4$ or $Q^4$, rock-arm, $u'$ and link, $w'$, is subtracted from the downward movement of two letter-spaces belonging to the key, $q^5$ or $Q^5$, rock-arm, $u^2$ and link $w^2$, so that the type-form is moved downward one letter-space.

In brief, there are, as before mentioned, four type-bars, P, P', $p'$ and $p^2$, each carrying four characters, so that the characters of one type-bar form with the characters of the other type-bars four horizontal rows, of four characters each. The type-bar P lies normally in front of the printing-point. The type-bar, P', is brought to the printing-point by depressing the key, $q'$. The type-bar, $p^2$, is brought to the printing-point by depressing the key, $q^2$. The type-bar, $p'$, is brought to the printing-point by depressing simultaneously the keys, $q'$ and $q^2$. The lowest row of characters on the type-form is brought to the level of the printing-point by depressing the key, $q^4$. The second row of characters, counting from the bottom, lies normally on a level with the printing point. The third row of characters, counting from the bottom, is brought to the level of the printing point by depressing simultaneously the key, $q^4$ and $q^5$; and the fourth or highest row of characters is brought to the level of the printing-point by depressing the key, $q^5$.

The characters may be arranged up in the type-form in any manner desired. The arrangement shown in Fig. 17, (in which each character is represented naturally as it prints, instead of being shown inverted as it stands upon the type-form,) is perhaps as good as any. The characters thus arranged are brought to the printing-point by the various keys, as follows: a by the key, $q^4$; d by the keys, $q^2$, $Q^4$ and $Q^5$; e by the key, $q^5$; g by the keys, $q^2$, $q^4$ and $q^5$; h by the keys, $q^4$ and $q^5$; i by the key, $Q^4$; l by the keys, $q^2$ and $q^4$; m by the keys, $q^2$ and $Q^4$; n by the key, $q'$; o by the key, $Q^5$; r by the keys, $Q^4$ and $Q^5$; s by the key, $q^3$; t by the key, $q^2$; u by the keys, $q^2$ and $q^5$; y by the keys, $q^2$ and $Q^5$.

It will be observed that the left-hand type-form, as illustrated in the drawings, is not furnished with a complete alphabet of characters. It will be seen that it is furnished with a considerable majority of the letters of the alphabet, and that the letters given a place on the left-hand or auxiliary type-form are all of them frequently-occurring letters, and that the letters omitted are all or nearly all of them letters that are, speaking comparatively, letters of infrequent occurrence. I consider such an arrangement best. When the left-hand type-form is furnished with the say fifteen or twenty most frequently occurring letters of the alphabet, no substantial gain of speed (not, it is believed, so much as one per cent.,) could be made by furnishing it with a complete alphabet of characters, and with complete sets of figures and punctuation marks.

The sole object of the left-hand or auxiliary type-form is to increase the speed of the machine; and that object is substantially attained by a left-hand or auxiliary type-form furnished with say fifteen or twenty of the most frequently occurring letters of the alphabet. Furnishing the left-hand type-form with a complete set of characters would increase the complexity and cost of the machine, and the weight of the left-hand type-form. It would be more difficult to learn to operate such a machine, as there would be more characters for the left-hand to learn, and on account of the increased weight of the left-hand type-form, the touch would be much heavier—considerable disadvantages, with no compensating advantage. If, however, any one desires to construct a machine in accordance with the principle of my invention, and to furnish the left-hand or auxiliary type-form with a complete set of characters, he has only to reduplicate as it were for the left-hand the right-hand type-form, or the lower case part thereof, that is to say: make the left-hand type-form with eight type-bars, corresponding to the eight of the right-hand; and substitute for the lateral type-form-positioning mechanism shown for the left hand type-form in the drawings, and formed by the arms, $r'$ and $r^2$, links, $R'$ and $R^2$, and lever, $R$, a movement synthesizer exactly similar to that shown to the left of Fig. 4 for positioning the right-hand type-form, and consisting of the rock-levers, $f'$, $f^2$ and $f^4$, links, $g'$, $g^2$ and $g^4$, and levers, $h^2$ and $h^4$; and make the key-board for the left hand, so far as it consists of printing keys, a duplicate in all respects of the key board for the right hand. All this will be readily understood by any one who has mastered the description heretofore given.

The Impression Mechanism for the Left-Hand Type-Form.

(See particularly Figs. 2, 5, 8, and 15.) Underneath the left-hand keys is a frame formed of a shaft, $a$, and a front and side-piece, $a'$. Said shaft, $a$, is supported by points, as shown in the drawings; and the part, $a'$, is so placed that it is acted on by any of the printing keys of the left-hand set ($q'$, $q^2$, $q^3$, $q^4$, $Q^4$, $q^5$, $Q^5$), when depressed, but not by the space keys, $q$, $q^4$, $Q^6$. A hammer, B, is mounted on a shaft or trunnion, $B'$, which latter is supported between centers or points, as shown in the drawings, which points are set fast in the casting, $A^{222}$, which is attached to the front rib, A, of the main-frame. An arm, $B^2$, is attached fast to the shaft, B. A screw, $B^3$, having the portion remote from the head threadless, is set fast in the arm, $B^2$, and projects under the part, $a'$, of the frame before mentioned, so that whenever any of the left-hand printing-keys is depressed, the frame formed of parts, $a$ and $a'$, is moved thereby, the arm, $B^2$, is moved downward, and the hammer, B, thrown in toward the type form. A piece of tempered steel, $B^4$, V-shaped as shown in the drawings, is fulcrumed by means of a center-pin set fast in a little casting, $B^6$, which latter is screwed fast to the top of the casting, $A^{62}$. The V-shaped piece, $B^4$, straddles the outer or right-hand type-form, one leg of the V lying between the outer or right-hand type-form, and the inner or left-hand type-form in close proximity to the latter, while the other leg of the V, lies outside the outer type-form in a position to be struck by the hammer, B, but so far remote from the outer type-form that the V, when pressed in so far that its inner leg presses one of the inner or left-hand type-bars against the paper cylinder, $b^3$, has its outer leg still clear of the right-hand type-form. The parts are so adjusted that the hammer, B, when moved in as far as it is impelled by the keys (that is, as far as it would be carried by the keys, if they were depressed very slowly), still stands some distance in front of the outer leg of the V-shaped piece, $B^4$, so that when the keys have been depressed to their utmost limit, an instant is left for the arresting of the type-form in its proper position in front of the printing-point, before the hammer, B, which continues to move in under the influence of the momentum imparted to it by the keys, strikes the piece, $B^4$, which in turn strikes the type-bar of the inner or left-hand type-form lying in front of the printing-point, from which the printing is to be done, and carries it in against the printing-point with sufficient force to print. The hammer and type-bar, of course, rebound immediately after the impact, and return to their normal position as the keys are released, suitable springs being furnished to return said parts to their normal positions, which springs are not shown in the drawings.

It will be observed that the arm, $B^2$, connected with the shaft, $B'$, and hammer B, works under the arms $p^4$ and $p^5$ connected with the shaft $p^3$ and hammer $p$; the arms $p^4$ and $p^5$ connected with the right-hand operated hammer, being curved upward to allow of the parts playing freely without engaging or interfering with the arm $B^3$, connected with the left-hand-controlled hammer.

*The Spacing Mechanism for the Type-form Operated by the Right Hand.*

(See particularly Figs. $12^A$, $12^B$, and $12^C$.) $b^{72}$ is the space-rack, before mentioned. The carriage is urged in the direction of the arrow by the motor spring arrangement hereinbefore described, and the movements of the carriage necessary for the letter-spacing are controlled by a pair of dogs—a loose dog and a fast-dog—mounted upon a dog-carrying lever, the movements of which are controlled by the keys. Said dog-carrying lever is formed of two parts, H and $H'$, connected together by machine screws, the holes in the part, $H'$, through which said screws pass, being made elliptical or elongated to permit of the adjustment of the part, H, upon the part, $H'$, so as to bring the space dogs hereinafter described closer together or farther apart, as desired; suitable washers being placed between the part, $H'$, and the heads of the screws. There are, as before said, two space dogs, a fast-dog and a loose-dog; the former being so called because it has no movement in the line of motion of the rack, $b^{72}$, and the latter being so termed because it has a movement in the same plane and tangent to the line of motion of said rack, $b^{72}$. Both dogs have an up-and-down movement. To this end, the fast-dog, $H^3$, is connected with the part, H, of the dog-carrying lever, by a little center pin; and the loose-dog, $H^4$, is in like manner connected with the part, $H'$, of the aforesaid dog-carrying lever, by another little center pin. The fast-dog, $H^3$, is also connected by a center pin or pin-joint, with a bridle lever, $H^5$, lying substantially parallel with the dog-carrying lever. A lever, I, pivoted upon a fulcrum rod, $I'$, (said rod, $I'$, being set in a casting, $I^3$, screwed fast to the lower surface of the rail, $A'$,) lies with its rear end under the lower end of the fast-dog, $H^3$, and with its front end under the extension, $p^5$, of the arm, $p^4$, so that whenever said arm, $p^4$, is moved by the action of any of the right-hand keys upon the part, $P^3$, the extension, $p^5$, presses down the front end of the lever, I, raising the rear end of said lever, and raising the dog, $H^3$. Another lever, $I^2$, similar to the lever, I, before mentioned, and fulcrumed upon the same pivot, $I'$, lies with its rear end under the lower end of the link, $H^8$, and with its front end under the extension, $B^5$, of the arm, $B^2$, so that whenever said arm, $B^2$, is moved by the action of any of the left-hand printing keys, ($q'$, $q^2$, $q^3$, $q^4$, $Q^4$, $q^5$, or $Q^5$,) upon the part, $a'$, the extension, $B^5$, presses down the front end of the lever, $I^2$, raising the rear end of said lever, and raising the link, $H^8$. Said link is connected by center pins or pin-joints with parallel levers, $H^9$ and $H^{22}$. A lever, $H^{23}$, lies above the dog-carrying lever; and said lever, $H^{23}$, is connected with the dog-carrying lever by means of a link, $H^{24}$, said link being pin-jointed to the parts, $H'$ and $H^{23}$, respectively. The levers, H, $H^5$, $H^9$, $H^{22}$ and $H^{23}$ respectively are provided with centers or trunnions, marked respectively, $H^{25}$, $H^{26}$, $H^{27}$, $H^{28}$ and $H^{29}$; and each of these trunnions is supported by centers screws, $H^{32}$, $H^{32}$, said screws being provided with check-nuts for adjustment. Adjustable stops, $H^{33}$, $H^{34}$ and $H^{35}$, respectively, are attached to the levers, $H^5$, $H^9$ and $H^{23}$, respectively, by machine screws.

To admit of adjustment, the holes in the stops, $H^{33}$, $H^{34}$ and $H^{35}$, through which the machine screws last mentioned pass, are made elongated or elliptical; and washers are interposed between the heads of such screws and the stops, $H^{33}$, $H^{34}$ and $H^{35}$. The loose-dog, $H^4$, is arrested by and rests against the stop, $H^{35}$, when the rack, $b^{72}$, rests against said dog. When said dog, $H^4$, is free from the rack, said dog is arrested by the stop, $H^{34}$; but if the link, $H^8$, is elevated and the stop, $H^{34}$ moved down thereby, then the loose-dog, $H^4$, moves on, under the influence of the spring, $H^{36}$, until it (said dog) is arrested by the stop, $H^{33}$.

Normally the various parts occupy substantially the positions in which they are shown in Fig. $12^A$. The rack rests in contact with the loose-dog, $H^4$, whose point is well up into the pitch of the rack. The fast-dog, $H^3$, lies with its point below a line tangent to the teeth of the rack, $b^{72}$, a less distance than the point of the loose-dog, $H^4$, is above such a line.

The keys, e, $e'$, $e^2$, $e^3$, $E^4$, $e^4$, $E^5$, $e^5$, $E^6$ and $e^6$, as we have already seen, when depressed, act upon the frame, $P^3$, which in turn moves the arm, $p^4$, and hammer, $p$, throwing the latter in toward the printing-point in the manner already described; and at the same time the projection, $p^5$, of the arm, $p^4$, depresses the front end of the lever, I, raising the rear end of said lever, elevating the fast-dog, $H^3$, and tilting the dog-carrying lever, thus drawing the loose-dog, $H^4$, down out of the rack, $b^{72}$, and pressing the fast-dog, $H^3$, up into it. The points of the dogs, $H^3$ and $H^4$, stand, when the loose dog, $H^4$, is pressed by the rack, $b^{72}$, against the stop, $H^{35}$, a certain number of rack-tooth-spaces and a small fraction of a rack-tooth-space apart, so that when the loose dog, $H^4$, moves down, away from the rack, $b^{72}$, said rack moves a short distance in the direction of the arrow, under the influence of the motor spring arrangement hereinafter described, until one of the teeth of said rack, $b^{72}$, comes in contact with the fast-dog, $H^3$, whereby the rack, and carriage connected therewith are thereupon arrested. Meantime, the loose-dog, $H^4$, moves on, under the influence of the contractile spring, $H^{36}$, until said dog, $H^4$, is arrested by the stop, $H^{34}$, when the point of the dog, $H^4$, stands not quite one rack-tooth space to the left of its former position, in close proximity to the rack-tooth next to the left of the tooth with which it was last in contact. As the keys are released and return to their normal positions, the fast-dog, $H^3$, moves down out of the rack, and at the same time the loose dog, $H^4$, moves up into it, and as soon as the fast-dog, $H^3$, clears the rack, said rack moves in the direction of the arrow, under the influence of the motor spring hereinafter described, until it is arrested by the loose-dog, $H^4$, which is pressed by the rack, $b^{72}$, against the stop, $H^{35}$.

When any of the left-hand printing-keys, $q'$, $q^2$, $q^3$, $Q^4$, $q^4$, $Q^5$, $q^5$, are depressed, they act, as we have already seen, upon the part, $a'$, which in turn moves the arm, $B^2$ and hammer, B, throwing the latter in toward the printing-point in the manner already described; and at the same time the projection, $B^5$, of the arm, $B^2$, depresses the front end of the lever, $I^2$, raising the rear end of said lever, elevating the link, $H^8$, and rocking the levers, $H^9$ and $H^{22}$. The lever, $H^9$, when thus moved comes in contact with the pin, $H^{37}$, set in the fast-dog, $H^3$, and so raises said dog, $H^3$, moving the dog-carrying lever, and the loose dog, $H^4$, and causing the parts to operate in the manner just described. The lever, $H^9$, when thus moved by the depressing of the left-hand printing-keys, also serves to throw the end of the stop, $H^{34}$, down below the end of the loose-dog, $H^4$, so that said loose-dog, when it is moved by the contractible spring, $H^{36}$, after its (said loose-dog's), point has been moved down below the teeth of the rack, moves on until it is arrested by the stop, $H^{33}$; and, as the stop, $H^{34}$, is so adjusted that when the loose-dog is arrested by it, the point of said loose-dog lies one rack-tooth space to the left of its normal position, so, in like manner, the stop, $H^{33}$, is adjusted in such a position that when the loose dog is arrested by it the point of said loose-dog lies near two rack-tooth spaces to the left of its normal position; so that when the dog-carrying lever returns to its normal position, the carriage moves two rack-tooth spaces to the right, as viewed from behind. Thus, it will be seen, the depressing of any of the right-hand keys, causes the carriage to move one rack-tooth space; while the depressing of any of the left-hand printing-keys, causes it to move two rack-tooth spaces, so providing room for two letters.

It remains to describe the space-keys, $q$, $Q^6$ and $q^6$. The space key, $q$, is intended to make a single space. When depressed, its front end depresses a lever, $I^4$, fulcrumed upon a center-pin set fast in the casting $I^5$, and connected with the lever, I, moving the said lever I, downward in the same manner that said lever, I, is moved by the projection, $p^5$, of the arm, $p^4$, and thus producing a single space in the manner already described. The keys, $Q^6$ and $q^6$, are arranged to make two spaces, and are intended to be used principally for making the space at the end of a word simultaneously with the last letter thereof, the letter being made by the right hand and the space by the left. Said keys, $Q^6$, $q^6$, when depressed, act upon an arm, K, of a rock-shaft, $K'$, centered in points as shown, rocking said shaft and depressing its other arm, $K^2$, which acts upon the lever, $I^2$, depressing said lever, and thus raising the link, $H^8$, moving the dogs $H^3$ and $H^4$ and stop, $H^{34}$, and causing the carriage to move two letter spaces in the manner already described.

*Remarks as to the Type-Form Positioning Mechanism.*

The type-form positioning mechanism figured in the drawings is of the genus movement synthesizer described in the specification of the before mentioned Letters Patent of the United States No. 502,700, to which specification reference is hereby had and made for a fuller description of what I mean by movement synthesizer mechanism, and of the proper mode of constructing and arranging the same; but I shall endeavor to state briefly in this place a few facts in connection with the movement synthesizer mechanism which should be borne in mind in constructing the machine.

First. The pairs of arms and links, $f'$ and $g'$, $f^2$ and $g^2$, $f^4$ and $g^4$, $m'$ and $n'$, $m^2$ and $n^2$, $m^4$ and $n^4$, $r'$ and $R'$, $r^2$ and $R^2$, $u'$ and $w'$, and $u^2$ and $w^2$, should be arranged in such a manner that when in their normal positions, each of said arms lies parallel or in line with the link with which it is connected, so that the movement synthesizer is locked against thrusts and strains and lost motion prevented, as described more at length in the specification of the before mentioned Letters Patent No. 502,700, so that no movement of the type-form can take place, either vertically or laterally, unless there is a corresponding movement of some of the before mentioned movement synthesizer elements, by which it is controlled. The rock-shaft arms, $f'$, $f^2$ $f^4$, &c., may be made to occupy normally the position mentioned of parallelism or alignment with their respective links, $g'$, $g^2$, $g^4$, &c., by adjusting the length of the various reach-ups, $k'$, $k^2$, $k^4$, &c., so that when the key is in its normal position and the reach-up resting down upon it, the rock-arm will occupy a position of alignment or parallelism with its link. A suitably arranged spring may of course, be used to assist the weight of the reach-up, in holding the parts in their normal positions.

Second. All the parts of the mechanism should be arranged in such a manner that each particular key, when depressed, moves on until its motion is arrested by the rock-lever which it operates, as $f'$, $f^2$, $f^4$, or the rock-shaft arm, as $m'$, $m^2$, $m^4$, coming in contact with the adjustable stop $A^{262}$, against which the key must press it firmly, in order that the parts may be locked and held against any thrusts or strains resulting from the operation of other parts of the movement synthesizer, or from the moving or arresting of the type-form, as more fully described in the specification of the before mentioned Letters Patent No. 502,700. Very little care or adjustment is necessary for this purpose in connection with those keys which move but one rock-lever or rock-shaft, (such as $e$, $e^2$, $e^3$, $e^4$, $e^5$, $e^6$, $E^6$, $q'$, $q^2$, $q^4$, $q^5$); but more care is required in connection with those which, (like $e'$, $E^4$, $E^5$, $Q^4$, $Q^5$,) move two rock-levers, or rock shafts simultaneously, to insure that each of the rock-arms shall be forced firmly against its stop. To this end, the lengths of the two reach-ups controlled by the same key must be very carefully adjusted to suit the position of their respective stops, so that the same key will force each of the two rock-arms firmly against its appropriate stop; and to this end a reach-up formed in two parts, as in the detail Fig. 32 adjustable upon each other by means of screws, as shown, so that the length of the reach-up may be increased or diminished as required for adjustment, may be used as the reach-up peculiar say to the keys $e$, $e^2$, $e^4$, $e^5$, $q^4$, $q^5$, or the same effect may be produced by the adjustment of the different arms of the rock-lever or rock-shaft; or by cutting the keys at the points at which they act upon the reach-ups. Still another mode is illustrated in the detail, Fig. 33, in which a little lever, $E^{22}$, is fulcrumed on the key and made to act at one end say on the reach-up, $k'$, and at the other end on the reach-up, $k^4$, thus insuring the pressing of each of the two rock-arms controlled by the key firmly against its own stop.

Third. It is to be borne in mind that the movement of the type-form effected by a plurality of the movement synthesizer elements acting simultaneously for the positioning of the type-form in the same arc or plane, while nearly equal, is not in fact exactly equal, (measured in inches or millimeters,) to the algebraic sum of the movements produced by those elements acting singly, all which is explained more at length in the specification of the before mentioned Letters Patent No. 502,700, on pages 16 and 17 of said specification. In consequence, the various parallel rows of type should not be placed exactly the same distance apart, measured in inches or millimeters. The true rule is to ascertain the exact position to which the type-form is moved by each key and combination of keys, and then to place the row of type corresponding to such key or combination of keys upon that portion of the type-form which is brought in front of the printing-point by such key or combination of keys. To illustrate with reference to the drawings the course to be pursued in arranging the type upon a pattern type-form: The stop for the arm, $m'$, should be so set that said arm, when moved, will raise the type-form exactly one letter-space; the stop for the arm, $m^2$, should be so set that said arm, $m^2$, will move the type-form downward two letter-spaces; and the stop for the arm, $m^4$, should be so set that said arm, $m^4$, will raise the type-form four letter-spaces. The type-form should now be marked, when in its normal position and at a point immediately in front of the printing-point. It should then be moved downward one letter-space by the simultaneous action of the couples $m'$, $n'$, and $m^2$, $n^2$, and marked in that position. It should then be moved downward two letter-spaces by the action of the couples $m^2$, $n^2$, and marked in that position. It should then be moved up one letter-space by the action of the couple, $m'$, $n'$, and marked in that position. It should next be moved upward two letter-spaces by the action of the couples, $m^2$, $n^2$, and $m^4$, $n^4$, and marked in that position. Then it should be moved upward three letter-spaces by the action of the couples, $m'$, $n'$, $m^2$, $n^2$ and $m^4$, $n^4$, and marked in that position. Then it should be moved upward four letter-spaces by the action of the couple $m^4$, $n^4$, and marked in that position; and finally it should be moved upward five letter-spaces by the action of the couples $m'$, $n'$, and $m^4$, $n^4$. The rows of characters should be placed upon the levels of these marks. The rows will not be exactly equidistant, measured in inches or millimeters, but the alignment will be perfect. The magnitude of the letter-spaces will vary slightly, measured in inches, and the movement given to the type-form by a plurality of couples acting simultaneously, will not be exactly equal, measured in inches, to the algebraic sum of the individual movements of such couples; but the movement given to the type-form, counted in letter-spaces, or rows of type on the type-form, (which is the important point,) will always be exactly equal to the algebraic sum of the movements of the various couples acting; and the alignment will be perfect. The distances between the various vertical rows should be determined in a like manner, the type-bars being made of different thicknesses, or placed different distances apart, so that each type-bar will be brought correctly to the printing point by the particular key or combination of keys that is designed to bring it there, as before described.

When a perfect pattern type-form is once made in the manner described, it will only be necessary in adjusting machines thereafter to adjust the various simple elements of the movement synthesizer, as $m'$, $m^2$, $m^4$, $f'$, $f^2$, and $f^4$. The combinations will always come right, when the simple elements are rightly adjusted, if the type-form be made exactly like the pattern type-form.

*The Arrangement of the Characters upon the Type-Form in Curves.*

It will be observed that the rows of characters upon the type-forms are not arranged in straight lines, but in curves. It will be observed also that the movements of the type-forms for positioning the characters are not in straight lines, but in curves. The arrangement of the rows of characters in curves, is to justify or compensate the curving movement of the type-form. Thus it will be observed that when the right-hand type-form moves laterally from right to left or vice versa, it moves in an arc, the length of whose radius is the length of the levers, $d^{29}$, $d^{29}$, between centers; and it will be seen that the curves in which the various horizontal rows of characters are arranged are the reverse of the curve described by the motion of the type-form carried by the aforesaid guide-levers; so that each character is made to stand at the exact level of the printing-point, when brought in front of the printing-point. It will be observed also, that when the type-form moves vertically, its connection with the link, $h^9$, causes it to move in a curve whose radius is the same as the link, $h^9$; and it will be seen that the curves in which the vertical rows of characters are arranged are curves the reverse of the curve described by the type-form when moving up and down under the restraining influence of the link, $h^9$, so that each character in the same vertical row stands in exactly the correct right-and-left position in front of the printing-point, when moved to the level of the printing-point. In brief, the purpose of arranging the characters in curved rows upon the type-form is to compensate for the curving motion of the type-form. The curves must, therefore, be described upon a radius of the same length as the radius in which the type-form moves for positioning the row curved, and the curve of each row of type must be made opposite to the curve described by the type-form in positioning such row, that is to say, as the line of lateral movement of the type-form curves downward, the horizontal lines or rows of type must curve exactly the same distance upward, and vice versa; and as the type-form, moving vertically, curves say to the right, the vertical rows of characters must curve just the same amount to the left, and vice versa; so that the curving movement of the type-form is perfectly compensated, and each character brought to exactly the same printing-point.

It will be observed that in the preferred form of device already described both the principal and the auxiliary type-forms are furnished each with a plurality of rows of characters; and the peculiar form of type-form illustrated in Figs. 17, 17$^A$, 17$^B$, 25, 26, 27, 28, 29, 30 and 30$^A$, and forming the subject-matter of the before mentioned application has been devised to allow of the proper working and coaction, at adjacent printing-points, of two type-forms each having the characters arranged in a plurality of rows; for with such a type-form the movements for positioning the characters, and the power required to effect such movements, are reduced to a minimum.

It is of great importance that the principal type-form (that is, the type-form furnished with a complete set of characters), have its characters arranged in a plurality of rows; for otherwise its movements would be very great and correspondingly difficult to control.
It is not, however, so important that the auxiliary type-form have its characters arranged in a plurality of rows; for, as we have already seen, the auxiliary type-form does not require a great number of characters. All the characters that it requires can be arranged in one row, without requiring very large movements of the type-form to bring said characters to position in front of the printing-point. In fact, an effective device for duplex printing, (that is, the simultaneous printing of two successive characters by two type-forms, each at its own printing-point,) may be made with a principal type-form having its characters arranged in a plurality of rows, and an auxiliary type-form having its characters disposed in a single row. Such a device is illustrated in the details, Figs. 18, 18$^A$, 18$^B$, 18$^C$, 18$^D$, 18$^E$, 18$^F$ and 18$^G$. The principal type-form consists of a central rod, bar, or body, $d$, and four pieces, $d^{44}$, $d^{44}$, $d^{44}$, $d^{44}$, attached thereto and carrying each two parallel rows of characters; the whole being so formed that there is a considerable space between the adjacent rows. The bar $d$, is of square cross-section, and is mounted in a sleeve, $d^{45}$, being arranged in such a manner that it is free to move up and down in said sleeve while it rotates with the sleeve. The lower part of the bar $d$, is round in cross-section, and is furnished with two collars, $d^{46}$, $d^{46}$, attached fast to it in a suitable manner, as for instance by set-screws, and a loose-collar, $d^{47}$, lying between the collars, $d^{46}$, $d^{46}$. A link, $d^{48}$, is connected at one end, by shoulder-screws, $d^{49}$, $d^{49}$, with the loose collar, $d^{47}$, and at the other end with the lever, $d^{42}$, whose upright arm, $d^{42}$, is connected with the movement synthesizer mechanism already described, by which the type-form is moved up and down. The sleeve $d^{45}$ is mounted in a casting, $d^{52}$, which casting is itself mounted upon a shaft, $d^{53}$, by which the type-form is given facility for movement to and from the printing-point for printing. A collar, $d^{54}$, is suitably attached to the sleeve, $d^{45}$, immediately above the top of the casting, $d^{52}$; and a miter-gear, $d^{55}$, is formed upon said sleeve, immediately below the casting, $d^{52}$. A segment, $d^{56}$, furnished with teeth at its top, cut to gear with those of the wheel, $d^{55}$, is centered upon a pin, $d^{57}$, set fast in the casting, $d^{52}$, as shown in the drawings. The segment, $d^{56}$, serves to rotate the sleeve, $d^{45}$, which in turn rotates the shaft, $d$, and type-carriers, $d^{44}$, $d^{44}$, $d^{44}$, $d^{44}$, attached thereto. To this end said segment is connected by the link, $h^9$, with the arm, $h^8$, of the rock-shaft, $h^7$, whose other arm, $h^6$, is connected as before described, by the link, $h^5$, with the part, $h^4$, of the movement synthesizer hereinbefore fully described, by which the various vertical rows of type are brought to position before the printing-point; the rock-shaft, $h^7$, with its arms, $h^8$ and $h^6$, being modified, however, as illustrated in the side-elevation detail, Fig. 18$^F$.

The auxiliary type-form consists of a single bar, P, on which fifteen characters are formed. Said bar is pin-jointed to the arm, $p^{45}$, of the rock-shaft, $p^{46}$, which rock-shaft is connected by another arm, $p^{47}$, with the lever, Z', forming part of the movement synthesizer to be presently described, by which the type-form, P, is moved up and down for the positioning of its characters. A guide-lever, $p^{48}$, parallel with the rock-arm, $p^{45}$, and connected therewith by a link, $p^{49}$, carries a pin, $p^{52}$, against which the bar, P, is normally pressed by a spring, $p^{53}$.

The movement synthesizer for positioning the auxiliary type-form is illustrated in Figs. 18$^C$ and 18$^D$. The key-board is modified as illustrated in Figure 18$^E$. In this modification there are, at the back of the machine, six rock-shafts, S', S$^2$, S$^4$, T', T$^2$, and T$^4$, supported by screws and points set in the ribs, A$^{27}$ and A$^{28}$. Said rock-shafts, S', S$^2$, S$^4$, T', T$^2$, and T$^4$, respectively correspond with the keys, $q'$, $q^2$, $q^4$, Q', Q$^2$ and Q$^4$, and are connected with said keys so as to be moved thereby, the connection being made in each case by means of an arm, $j$, firmly attached to the rock-shaft, and a push-up, $i$, connected with said rock-arm, $j$, and interposed between it and the corresponding key. The rock-shafts, S', S$^2$, S$^4$, T', T$^2$, and T$^4$, respectively, have arms, U', U$^2$, U$^4$, V', V$^2$ and V$^4$, respectively connected with them in a suitable manner, (as for instance, by shrinking,) so that they move with their respective rock-shafts, whenever said rock-shafts are moved by the keys with which they are connected. The rock-shaft arms, V' and V$^2$, respectively are connected by links, X' and X$^2$ respectively with the opposite ends of a lever, X$^3$. The rock arms, U$^2$ and U$^4$, respectively are connected by links W$^2$ and W$^4$, respectively, with the opposite ends of a lever, W$^6$; and the arms, U' and V$^4$, respectively, are connected by links, W' and X$^4$, respectively, with a lever, X$^5$. The levers, X$^3$ and W$^6$, respectively are connected by links, Y and Y', respectively, with the top and middle of the lever, Z, and the lever, X$^5$, is connected by a link, Y$^2$, with a lever, Z', whose upper end is connected with the lower end of the lever, Z, and whose lower end is connected by a link, Y$^3$, with the arm, $p^{47}$, of the rock-shaft, $p^{46}$, whose other arm, $p^{45}$, carries the type-bar, P. The levers, X$^3$, W$^6$, X$^5$ and Z, respectively, are supported and held in their proper vertical positions by supporting levers, Z$^2$, Z$^3$, Z$^4$ and Z$^5$, respectively. Said supporting levers are centered or fulcrumed upon shoulder screws, and are pin-jointed to the parts which they support.

The *modus operandi* of the movement synthesizer illustrated in Figs. 18$^C$ and 18$^D$ requires no description after the descriptions already given of other substantially similar movement synthesizer mechanisms herein, and in the specification of Letters Patent No. 502,700, hereinbefore referred to, further than to say that the various stops, A$^{262}$, A$^{262}$, &c., are so adjusted that the couple, V', X', lowers the type-bar one letter-space; the couple, V$^2$, X$^2$, moves it down two letter-spaces; the couple, V$^4$, X$^4$, moves it down four letter-spaces; the couple, U', W', moves it up one letter-space; the couple, U$^2$ and W$^2$, moves it up two letter-spaces; and the couple, U$^4$ and W$^4$, moves it up four letter-spaces; so that the type-form is moved downward one letter-space by the key, Q'; two letter-spaces by the key, Q$^2$; three letter-spaces by the keys, Q' and Q$^2$, acting simultaneously; four letter-spaces by the key, Q$^4$; five letter-spaces by the keys, Q' and Q$^4$, acting simultaneously; six letter-spaces by the keys, Q$^2$ and Q$^4$, acting simultaneously, and seven letter-spaces by the keys, Q', Q$^2$ and Q$^4$, acting simultaneously; and is moved upward one letter-space by the key, $q'$; two letter-spaces by the key, $q^2$; three letter-spaces by the keys, $q'$ and $q^2$, acting simultaneously; four letter-spaces by the key, $q^4$; five letter-spaces by the keys, $q'$ and $q^4$, acting simultaneously; six letter-spaces by the keys, $q^2$ and $q^4$, acting simultaneously and seven letter-spaces by the keys, $q'$, $q^2$ and $q^4$, acting simultaneously. The letter at the central point is printed by depressing the keys $q^2$ and Q$^2$, simultaneously.

The two type-forms are struck in against their printing-points by the hammers, $p$ and B, already described, which are connected with and controlled by the keys, as already described; but the V-shaped transmitter, B$^4$, is omitted. The bar P, is made of such a length that when in its lowest position its top is still above the top of the other type-form when the last mentioned type-form is in its highest position; and the hammer, B, is brought up above the top of the principal type-form, and strikes the type-bar, P, over the top of the principal type-form.

Very obviously the hammer, $p$, might be dispensed with, and the principal type-form connected with the keys, so that they would throw it in directly the same as the hammer, $p$; for the principal type-form has sufficient mass to serve as its own hammer.

I have before said that it was very advantageous to make the principal type-form with its characters arranged in a plurality of rows, thereby reducing the magnitude of travel for positioning the characters and the difficulty of controlling the movements of the type-form. It is not, however, absolutely indispensable to make even the principal type-form with a plurality of rows of characters; for both the principal type-form and the auxiliary type-form may be made with a single row of characters each; and there is one advantage resulting from making them with a single row of characters each, to wit, the most perfect possible lateral alignment—an advantage, however, which is entirely outweighed by the very greatly increased difficulty of obtaining proper vertical alignment.

A device of co-operating type-forms, having the characters of each type-form arranged in a single row, is illustrated in Figs. 19, $19^A$, $19^B$, $19^C$, and $19^D$. The two type-form devices are similar. Each consists of a type-wheel, 1, mounted on a shaft, 2, said shaft being itself mounted in a casting, 3, which latter is mounted for in and out movement by means of two parallel levers, 4, 4, of equal length, centered upon pins, 5, 5. A gear-wheel, 6, is attached to the shaft, 2. A segment 7, fulcrumed in a shoulder-screw, 8, screwed fast into the casting, 3, meshes with the gear, 6. A link, 9, connects the segment, 7, with the arm, 10, of the rock-shaft, 11, whose other arm, 12, is connected with the movement synthesizer mechanism hereinafter described.

It will be seen that any movement of the rock-shaft, 11, and arm, 10, causes a corresponding movement of the link, 9, segment, 7, gear-wheel, 6, and type-wheel, 1. The movement synthesizer mechanism for the type-wheel arrangement is represented in Figs. $19^B$ and $19^C$, and the arrangement of keys is represented in Fig. $19^D$ (that is, the arrangement for the right-hand, the arrangement of printing-keys for the left-hand being the same but inverted, and the left-hand having also one or more space-keys as already described). The key-board consists of seven keys, $e'$, $e^2$, $e^4$, $e^8$, $E^2$, $E^4$ and $E^8$. There are at the back of the machine seven rock-shafts, $G'$, $G^2$, $G^4$, $G^8$, $H^2$, $H^4$ and $H^8$, corresponding respectively with the keys $e'$, $e^2$, $e^4$, $e^8$, $E^2$, $E^4$ and $E^8$, and connected with said keys so that they are moved by them; the connection being made in each case by means of an arm, $j$, firmly attached to the rock-shaft, and a push-up, $i$, connected with said rock-arm, and interposed between it and the corresponding key. The rock shafts, $G'$, $G^2$, $G^4$, $G^8$, $H^2$, $H^4$ and $H^8$, respectively, have arms, $K'$, $K^2$, $K^4$, $K^8$, $L^2$, $L^4$ and $L^8$, respectively connected with them in a suitable manner, (as for instance, by shrinking,) so that they move with their respective rock-shafts whenever said rock-shafts are moved by the keys with which they are connected. The rock-arms, $K'$ and $K^2$, are connected by links, $M'$ and $M^2$, respectively with opposite ends of a lever, $M^3$. The rock-arms, $L^2$ and $L^4$, respectively, are connected by links, $N^2$ and $N^4$ respectively, with opposite ends of a lever, $N^6$; and the rock-arms, $K^4$ and $K^8$, respectively are connected by links, $M^4$ and $M^8$, respectively, with opposite ends of a lever, $M^{12}$. The lever $M^3$ is connected by a link, O, with a lever, P. The lever, $N^6$, is likewise connected with said lever P, by a link, $O'$. The lever, $M^{12}$, is connected by a link, $O^2$, with a lever, $P'$, whose upper end is connected with the lower end of the lever, P, and whose lower end is connected with the upper end of a similar lever, $P^2$. The link, $N^8$, connected with the rock-arm, $L^8$, is also connected with the lever, $P^2$. A link, $O^3$, serves to connect the lever, $P^2$, with the arm 12 of the rock-shaft, 11, whose other arm, 10, is connected by the link, 9, with the segment, 7, by which the gear, 6, and type-wheel, 1, are rotated. The levers, $M^3$, $N^6$, $M^{12}$ and P, respectively are supported and held in their proper vertical positions by supporting-levers, $P^4$, $P^5$, $P^6$ and $P^7$, respectively. Said supporting levers are centered or fulcrumed upon shoulder screws and are pin-jointed to the parts which they support.

The *modus operandi* of the movement synthesizer illustrated in Figs. $19^B$ and $19^C$ will require no description after the descriptions already given of other movement synthesizer mechanism herein and in the specification of Letters Patent No. 502,700, hereinbefore referred to, further than to say that the various stops, $A^{262}$, $A^{262}$, &c., are so adjusted that the keys, $e'$, $e^2$, $e^4$ and $e^8$ rotate the type-form respectively one, two, four and eight letter-spaces in the one direction, while the keys $E^2$, $E^4$ and $E^8$ rotate it respectively two, four and eight letter spaces in the opposite direction; the key, $e'$, serving to add one letter-space movement of the type-wheel to that given by any of the keys, $e^2$, $e^4$ and $e^8$, or any combination of them, and to subtract one letter-space from the movements imparted to the type-wheel by any of the keys, $E^2$, $E^4$ and $E^8$, or any combination of the last mentioned keys. The arrangement of movement synthesizer mechanism for the left hand keys is the same. The right hand keys are connected with the type-form that stands to the left, and the left hand keys with the type-form that stands to the right. Each type-wheel carries thirty characters, being the twenty-six letters and four marks of punctuation for the principal or right-hand-operated type-wheel, and any convenient number, say fifteen, of the most frequently occurring letters for the auxiliary or left-hand-operated type-wheel, the figures and a few marks of punctuation being also assigned to the left-hand-operated type-form. It would obviously be possible (but very difficult, on account of the great movement of the type-wheel and the difficulty of controlling the same), to furnish the principal type-form with a complete set of characters, upper and lower case, letters, figures and marks of punctuation. It would be necessary to add one or two elements to the movement synthesizer for this purpose. This will be understood without further explanation. The type-wheels lie close side by side so as to print simultaneously at adjacent printing-points, and are thrown in by the hammers $p$ and B, before described, (but omitted in the details, Figs. 19 and 19$^A$,) acting on the casting, 3, 3, in which the type-wheels are journaled.

I do not recommend the device illustrated in Figs. 19, 19$^A$, 19$^B$, 19$^C$, and 19$^D$, to the public on account of the difficulty of adjusting the parts so accurately as to secure a really perfect alignment, and the power required to move the parts with rapidity. Nor do I consider the device illustrated in Figs. 18, 18$^A$, 18$^B$, 18$^C$, 18$^D$, 18$^E$, 18$^F$ and 18$^G$, as good as that illustrated in the preceding figures and described in the body of this specification. I have illustrated these modifications as possible modes of carrying out certain features of my invention.

I wish it to be very distinctly understood that the ribbon mechanism, the spacing mechanism, and the carriage-motor mechanism herein described are not new, and form no part of this invention; that they have been shown and described herein only for the purpose of illustrating a complete machine; that no importance whatever is attached to them; and that other arrangements for inking the type, making the spaces, and impelling the carriage might be substituted for them. I wish it to be understood, also, that while certain portions of the carriage mechanism shown herein, to wit, the arrangements of parts for mounting the carriage, are believed to be new, they are not claimed herein, (being claimed in the before mentioned prior application, Serial No. 511,633, filed May 18, 1894,) and are in nowise essential to this present invention, and that other suitable arrangements may be substituted for them. I wish it to be understood, also, that the movement synthesizer mechanism illustrated herein is illustrated as the best means that I have devised for positioning the type-form; that it is not, however, considered indispensable; that I do not confine myself to it, nor to movement synthesizer mechanism of any kind, and that others of the very numerous kinds of type-form positioning mechanism patented and otherwise known in the art might, with a suitably adapted key-board, be substituted for it.

I wish it to be understood further that the peculiar arrangement of type-form herein described, consisting of a plurality of bars connected together in such a manner that they move together for the positioning of the characters, while movable independently of each other for the printing of the character positioned, (that is, brought in front of the printing-point,) though devised specially for the duplex printing arrangement herein described, is not claimed herein, but forms the subject matter of another application of even date herewith, Serial No. 518,912.

My present application, as stated at the commencement of this specification, relates to two printing mechanisms, (preferably two type-forms,) co-operating to print consecutive letters at adjacent printing-points simultaneously or substantially simultaneously. Exact, absolute simultaneousness of printing is not, of course, essential, and while I prefer to use two type-forms, that is not indispensable, for other printing mechanism might be used in place of one if not both type-forms; though not, in my judgment, with so much advantage. Everything else shown in the drawings and described in this specification is collateral to this feature of duplex printing; such collateral things being illustrated and described in order that a skilled mechanic may be enabled to construct an operative machine from the information herein contained, and without having to refer elsewhere.

A great variety of modifications may be made without departing from the essentials—or, at least, from certain of the essentials—of my invention. In particular, it will be readily understood that instead of connecting the right-hand keys with the type-form that prints the first of the two letters printed simultaneously, (that is, the first in position in the word,) and the left-hand keys with the type-form that prints the second of the two letters printed simultaneously, (that is, the second in position in the word,) the left-hand keys might be connected with the type-form that prints the first letter, and the right-hand keys with the type-form that prints the second letter. This would, however, throw upon the left-hand, which is in general less skillful than the right, the burden of learning more and doing more than the right, and vastly more than is required of it in the arrangement figured in the drawings. It will be understood also that instead of arranging the two sets of keys that control the two type-forms such a distance apart that they form, as it were, separate key-boards, they may be placed nearer together so as to form a single key-board. It will be understood also, that instead of arranging all the keys that control one of the type-forms so that they are operated by one hand, while all the keys that control the other type-form are operated by the other hand, the two sets or kinds of keys, (that is, the keys that operate the principal type-form, and the keys that operate the second or auxiliary type-form,) may be intermingled or arranged in juxtaposition, so that one or more of the keys that control the principal type-form would be operated by the right hand, and one or more of them by the left hand; while one or more of the keys that control the left-hand or auxiliary type-form would be operated by the left-hand and one or more of them by the right hand. This will be obvious to a person skilled in the art who has studied carefully the preceding part of this specification, and the specification of the before mentioned Letters Patent, No. 502,700, hereinbefore made by reference a part of this description. Such a modification would be, however, on the whole, much inferior to the arrangement illustrated in the drawings, for it would tend to confuse the operator. It will be understood also, that instead of furnishing either or both of the type-forms with single characters only, they might be furnished either or both of them with a greater or less number of double characters, (as an, en, in, on, un, cl, fl, pl, &c.,) and that with either or both of the type-forms provided with a suitable number of such double characters, it would sometimes be possible to print more than two letters simultaneously.

A type-form is an element of many of the combinations hereinafter claimed. By the term "type-form," as used in this case, is meant the body which carries the type. It is, of course, to be understood that this type-form may be sectional, which is indeed the character of my preferred form. It is difficult to give the word "type-form," an exact definition. A great variety of type-forms are known in the art. Some consist of a cylinder, plate, segment or other single part on which all the characters are formed. Others consist of a plurality of parts, each having characters formed upon or attached to it, and all moving together and only together for the positioning of the characters, (but the several parts, in some cases, having independent motions for printing;) while still other type-forms consist of a plurality of parts each furnished with characters, all the parts having one movement or two movements together for the positioning of the type-form as a whole, and each of the parts having also a motion peculiar to itself for the positioning of its own characters, and in some cases having also an independent motion for printing them. In still other type-forms, there are a plurality of parts each furnished with a single character and all moving together as a type-form for the positioning of the characters, while each is movable independently of the others to and from the printing-point for printing. A great variety of type-forms have been patented and are known in the art. Different as they are among themselves, they are all type-forms and form a class of machines separate and distinct from the so-called type-lever machines, though the type-levers of type-lever machines frequently carry a plurality of characters, and sometimes have one or more motions in common for positioning their characters, and are not always arranged around a circle or an arc. It is difficult to draw a hard and fast line between type-forms (which we have seen are frequently constructed of levers), and type-levers, which shall be correct for all cases; but the essential difference seems to be that in a type-form machine the change from character to character is made mainly by changing the position of the type-form, although, indeed, the successive letters may be printed frequently from different type-levers or type-bars; while in a type-lever machine, the transition from character to character is made in general by bringing different type-levers into action, although indeed different characters may be at times printed from the same type-lever. In the case of the type-form, the main thing in determining the character to be printed is the position into which the type-form is moved with relation to the printing-point, while in a type-lever machine the main thing is what type-lever shall be vibrated. There is also generally another material difference in that in the type-bar machine the fulcra or centers of the various type-bars are, if not fixed, generally at rest during the operating of the machine, while in the case of the type-form composed of type-levers, the levers and their fulcra are commonly moved bodily.

As I have said before it is well nigh impossible to frame a definition that shall be correct for all cases; but from what has been said, what I mean by the word "type-form," will be understood; and at all events, it will be understood that I use "type-form" in contradistinction from the well known arrangement of type-levers disposed around an arc or a circle and striking to a common center. Such an arrangement of type-levers is indeed a kind of printing mechanism, but it is not a type-form as I use the word; and the same is true of the arrangement of type-levers each arranged to strike to a printing-point of its own, the selecting of the letter depending on the type-lever vibrated and not on any motion of the levers as a whole.

By "type-form impelling keys," I mean keys that serve to impel the type-form by the force transmitted from the fingers, as distinguished from arrangements in which the keys serve only to call a motor into action, which motor then impels the type-form. "Type-form controlling keys" is a broader term and includes both sorts of keys.

What I claim as my invention, and desire to secure by Letters Patent, is—

1. In a typewriter or other similar instrument, and in combination, a type-form having its characters arranged in a plurality of rows synchronously-moving for the positioning of the various characters, and another suitable printing mechanism; the two printing mechanisms mentioned co-operating to print consecutive letters at adjacent printing points simultaneously or substantially simultaneously.

2. In a typewriter or other similar instrument, and in combination, a type-form having its characters disposed in a plurality of rows; positioning-mechanism whereby the various rows of characters are brought, each as required, opposite a printing-point common to said rows; and another suitable printing mechanism; the two printing mechanisms mentioned co-acting to print consecutive letters at adjacent printing points, simultaneously or substantially simultaneously.

3. In a typewriter or other similar instrument, and in combination, a type-form having its characters arranged in a plurality of rows; and another suitable printing mechanism; the rows of characters of the type-form hereinbefore-mentioned being placed such a distance apart that they admit characters of the other printing mechanism mentioned between them; the two printing mechanisms mentioned co-operating to print consecutive letters at adjacent printing points simultaneously or substantially simultaneously.

4. In a typewriter or other similar instrument, a type-form having its characters arranged in a plurality of rows, in combination with another suitable printing mechanism, the type-form above-mentioned being placed intermediate the printing mechanism mentioned and the surface to be printed, and having its rows of characters disposed with suitable spaces between them; the printing mechanism more remote from the surface to be printed being arranged and the whole being arranged in such a manner that the characters of the printing mechanism more remote from the surface to be printed are advanced to the printing point through the spaces between the rows of the type-form above-mentioned; the two printing mechanisms mentioned co-operating to print consecutive letters at adjacent printing points simultaneously or substantially simultaneously.

5. In a type-writer or other simular instrument, and in combination, a type-form having its characters disposed in a plurality of rows; positioning mechanism whereby the various rows of characters are brought, each as required, opposite a printing point common to said rows; and another suitable type-form; the two type-forms co-operating to print consecutive letters at adjacent printing points simultaneously or substantially simultaneously.

6. In a typewriter or other similar machine, and in combination, two co-operating type-forms, each having its characters arranged in a plurality of rows, the rows of characters of one of said type-forms being placed a sufficient distance apart to admit a row of characters of the other type-form between them, the rows of one type-form being arranged to play between the rows of the other to the printing point; the two type-forms being arranged to print consecutive letters at adjacent printing points simultaneously or substantially simultaneously.

7. In a typewriter or other similar instrument, a type-form having a plurality of type-bearing sections, said type-bearing sections having one or more motions together as a type-form for positioning the various characters and being also movable independently of each other to and from the printing point for printing; in combination with another suitable printing mechanism; the two printing mechanisms mentioned co-acting to print consecutive letters at adjacent printing points simultaneously or substantially simultaneously.

8. In a typewriter or other similar instrument, and in combination, a type-form having a plurality of type-bearing sections, said type-bearing sections having one or more motions together as a type-form for positioning the various characters, and being movable also each independently of the others to and from the printing point for printing; and another suitable printing mechanism, the two printing mechanisms mentioned co-acting to print consecutive letters at adjacent printing points simultaneously or substantially simultaneously; the type-bearing sections above-mentioned being placed such a distance apart that room is left for the characters of the other printing mechanism mentioned to pass to the printing point between said type-bearing sections.

9. In a typewriter or other similar instrument, and in combination, a type-form having a plurality of type-bearing sections, each furnished with a plurality of characters, said type-form having a motion whereby the type-bearing section carrying the character to be printed is brought opposite the printing point, and another motion whereby the character to be printed is itself brought opposite the printing point; said type-bearing sections being movable independently of each other to and from the printing point for printing; and another suitable printing mechanism; the two printing mechanisms mentioned co-operating to print consecutive letters at adjacent printing points simultaneously or substantially simultaneously.

10. In a typewriter or other similar instrument, and in combination, a type-form having a plurality of type-bearing sections each furnished with a plurality of characters, said typeform having a motion whereby the type-bearing section carrying the character to be printed is brought opposite the printing point, and another motion whereby the character to be printed is itself brought opposite the printing point; said type-bearing sections being movable independently of each other to and from the printing point for printing; and another suitable printing mechanism; the type-bearing sections of the type-form first mentioned being placed such a distance apart that they admit between them characters of the other printing mechanism above-mentioned; the two printing mechanisms mentioned co-operating to print consecutive letters at adjacent printing points simultaneously or substantially simultaneously.

11. In a typewriter or other similar instrument, and in combination, two type-forms each having its characters disposed in a plurality of rows, one at least of said type-forms having a plurality of type-bearing sections, said type-bearing sections having one or more motions together as a type-form for positioning the characters and being movable also independently of each other to and from the printing point for printing; one of said type-forms having its rows of characters disposed such a distance apart that they admit between them a row of characters from the other type-form; the two type-forms co-operating to print consecutive letters at adjacent printing points simultaneously or substantially simultaneously.

12. In a typewriter or other similar instrument, and in combination, two type-forms each having a plurality of type-bearing sections; the type-bearing sections of each type-form having one or more motions together as a type-form for positioning the various characters and being movable also independently of each other to and from the printing point; type-bearing sections of one of the type-forms being disposed such a distance apart that type-bearing sections of the other type-form can strike to the printing point between them, the two type-forms co-operating to print consecutive letters at adjacent printing points simultaneously or substantially simultaneously.

13. In a typewriter or other similar instrument, and in combination, a type-form having a plurality of type-levers furnished each with a plurality of characters disposed longitudinally thereon; said type-form having two motions, one whereby the different type-levers are brought opposite the printing point, each as required, and another whereby the different characters disposed longitudinally upon the type-levers are brought opposite the line of printing, as required; said type-levers being movable independently of each other to and from the printing point for printing; and another suitable printing mechanism co-operating with the type-form above-mentioned for the printing of consecutive letters at adjacent printing points, simultaneously or substantially simultaneously.

14. In a typewriter or other similar instrument, and in combination, a type-form having a plurality of suitable type-bearing sections, said type-form having one or more motions for the positioning of the characters; a second type-form intermediate the first mentioned type-form and the surface to be printed and consisting of a plurality of type-levers each furnished with a plurality of characters, said levers having one or more motions together as a type-form for the positioning of the various characters and being movable independently of each other for the printing of the character positioned, said levers being disposed such a distance apart that the type-bearing sections before mentioned can pass to the printing point between them; the type-bearing sections mentioned being adapted and arranged to move to and from the printing point independently of each other, and to pass to the printing point between the type-levers of the other type-form mentioned, the two type-forms co-operating for the printing of consecutive letters at adjacent printing points simultaneously or substantially simultaneously.

15. In a typewriter or other similar instrument, a type-form having a plurality of suitable type-bearing sections, said type-bearing sections having one or more motions together as a type-form for positioning the various characters and being movable also independently of each other to and from the printing point for printing the character positioned; a second type-form having a plurality of type-levers furnished each with a plurality of characters, said levers having one or more motions together as a typeform for the positioning of the various characters, and being movable independently of each other for printing the characters positioned, said levers being disposed such a distance apart that the type-bearing sections before-mentioned can pass between them to the printing point; the two type-forms co-operating for the printing of consecutive letters at adjacent printing points simultaneously or substantially simultaneously.

16. In a typewriter or other similar instrument, and in combination, two type-forms each movable independently of the other for positioning its various characters and each movable also independently of the other to and from the printing point for producing the impression, said type-forms co-operating to print consecutive letters at adjacent printing points simultaneously or substantially simultaneously.

17. In a typewriter or other similar instrument, and in combination, two type-forms each movable independently of the other for positioning its various characters; and two independent impression mechanisms, one serving to print from one of the typeforms, the other serving to print from the other typeform; the two type-forms co-operating to print consecutive letters at adjacent printing points simultaneously or substantially simultaneously.

18. In a typewriter or other similar instrument, and in combination, a set of independently movable keys disposed in a row or rows extending from right to left, in a position to be acted upon by the right hand; another set of independently movable keys lying to the left of the first mentioned set and disposed in a position to be operated by the left hand; two printing mechanisms, one corresponding to the right-hand keys, the other corresponding to the left-hand keys; mechanical connections intermediate the right-hand keys and the printing mechanism corresponding therewith, whereby the force communicated by the operator to the right-hand keys is conveyed to the printing mechanism corresponding with such keys and whereby such force is employed in operating said printing mechanism; and mechanical connections intermediate the left-hand keys and the printing mechanism corresponding therewith, whereby the force communicated by the operator to the left-hand keys is conveyed to the printing mechanism corresponding with such keys, and whereby such force is employed in operating such printing mechanism; the two printing mechanisms mentioned being arranged each to print its characters at a common printing-point of its own, the two printing-points corresponding respectively with the two printing mechanisms, being adjacent to each other, and the two printing mechanisms mentioned cooperating to print consecutive letters simultaneously or substantially simultaneously at such adjacent printing-points; the whole being arranged in such a manner that one of the two letters to be printed is designated by the right hand and the other by the left hand.

19. In a typewriter or other similar instrument, and in combination, a set of independently movable keys disposed in a row or rows extending from right to left, in a position to be acted upon by the right hand; another set of independently movable keys, placed to the left of the first-mentioned set and disposed in a position to be operated by the left hand; a type-form corresponding to one of the sets of keys before-mentioned; suitable type-form positioning mechanism intermediate said type-form and the keys corresponding thereto, said type-form-positioning mechanism including means whereby the force communicated by the operator to said keys is conveyed to the type-form corresponding thereto and said type-form thereby oscillated to bring the required letter into position for printing, and means whereby the type-form is arrested in the position for printing; another suitable printing mechanism connected with the other set of keys before-mentioned and the type-form corresponding thereto; the two printing mechanisms mentioned co-operating to print consecutive letters at adjacent printing points simultaneously or substantially simultaneously; the whole being arranged in such a manner that one of the letters to be printed is designated by the right hand and the other by the left hand.

20. In a typewriter or other similar instrument, and in combination, a set of independently movable keys disposed in a row or rows extending from right to left, in a position to be acted upon by the right hand; another set of independently movable keys lying to the left of the first-mentioned set and disposed in a position to be operated by the left hand; two type-forms, one corresponding to the right hand keys, the other corresponding to the left hand keys; suitable type-form positioning mechanism intermediate the right hand set of keys and the type-form corresponding thereto, whereby the force communicated by the operator to the right hand keys is conveyed to the corresponding type-form and said type-form moved into different positions so that it presents the required character at the printing point; suitable type-form positioning mechanism intermediate the left hand set of keys and the type-form corresponding thereto whereby the force communicated by the operator to the left hand keys is conveyed to the corresponding type-form, and said type-form moved in such a manner that it presents the required character at the printing point; the two type-forms co operating to print consecutive letters at adjacent printing points simultaneously or substantially simultaneously; the whole being arranged in such a manner that one of the letters to be printed simultaneously is designated by the right hand and the other by the left hand.

21. In a typewriting machine, and in combination, a set of independently movable keys disposed in a position to be operated by the right hand; another set of independently movable keys lying to the left of the first-mentioned set and disposed in a position to be operated by the left hand; two type-forms, one corresponding to the right hand keys, the other corresponding to the left hand keys; suitable type-form-positioning-mechanism intermediate the right hand set of keys and the type-form corresponding therewith; suitable type-form-positioning-mechanism intermediate the left hand set of keys and the type-form corresponding therewith; a suitable paper-carriage and key-controlled letter spacing mechanism therefor; the two type-forms co-operating to print consecutive letters at adjacent printing points simultaneously or substantially simultaneously, the whole being arranged in such a manner that one of the letters to be printed simultaneously is designated by the right hand and the other by the left hand.

22. In a type-writing machine and in combination, a set of independently-movable keys disposed in a position to be operated by the right hand; another set of independently-movably keys lying to the left of the first mentioned set and disposed in a position to be operated by the left hand; two printing mechanisms, one corresponding with and controlled by the right-hand keys, the other corresponding with and controlled by the left-hand keys; suitable connections intermediate the right-hand keys and the printing mechanism corresponding therewith; and suitable connections intermediate the left-hand keys and the printing mechanism corresponding therewith; the two printing mechanisms mentioned being arranged each to print its characters at a common printing-point of its own, the two printing points corresponding respectively with the two printing mechanisms, being adjacent to each other, and the two printing mechanisms mentioned cooperating to print consecutive letters simultaneously or substantially simultaneously at such adjacent printing-points; the whole being constructed and arranged in such a manner that the first of the two letters to be printed simultaneously is determined regularly by one particular hand, the second letter being determined by the other hand.

23. In a type-writing machine and in combination, a set of independently-movable keys disposed in a position to be operated by the right hand; another set of independently-movable keys lying to the left of the first mentioned set, and disposed in a position to be operated by the left hand; a type-form corresponding to one of the sets of keys before mentioned; suitable type-form-positioning mechanism intermediate said type-form and the keys corresponding therewith; another suitable printing mechanism connected with the other set of keys before mentioned; the two printing mechanisms mentioned cooperating to print consecutive letters at adjacent printing-points simultaneously or substantially simultaneously; the whole being arranged in such a manner that the first of the two letters to be printed simultaneously is determined regularly by one particular hand, the second letter being determined by the other hand.

24. In a type-writing machine and in combination, a set of independently-movable keys disposed in a position to be operated by the right hand; another set of independently-movable keys lying to the left of the first mentioned set, and disposed in a position to be operated by the left hand; two type-forms, one corresponding to the right hand keys, the other corresponding to the left-hand keys; suitable type-form positioning mechanism intermediate the right-hand set of keys and the type-form corresponding therewith; and suitable type-form-positioning mechanism intermediate the left hand set of keys and the type-form corresponding therewith; the two type-forms cooperating to print consecutive letters at adjacent printing-points simultaneously or substantially simultaneously; the whole being arranged and constructed in such a manner that the first of the two letters to be printed simultaneously is determined regularly by one particular hand, the second letter being determined by the other hand.

25. In a type-writing machine and in combination, a set of independently-movable keys disposed in a position to be operated by the right hand; another set of independently-movable keys lying to the left of the first mentioned set and disposed in a position to be operated by the left hand; a type-form corresponding to one of the sets of keys before mentioned and furnished with an alphabet and other necessary characters; suitable type-form-positioning mechanism intermediate said type-form and the keys corresponding therewith; another suitable printing mechanism connected with the other set of keys before mentioned; the two printing mechanisms mentioned cooperating to print consecutive letters at adjacent printing-points simultaneously or substantially simultaneously; the whole being arranged in such a manner that the first of the two letters to be printed simultaneously is determined regularly by one particular hand, the second letter being determined by the other hand.

26. In a type-writing machine and in combination, a set of independently-movable keys disposed in a position to be operated by the right hand; another set of independently-movable keys lying to the left of the first mentioned set and disposed in a position to be operated by the left hand; two type-forms, one corresponding to the right hand keys, the other corresponding with the left hand keys; suitable type-form-positioning mechanism intermediate the right-hand keys and the type-form corresponding therewith; suitable type-form-positioning mechanism intermediate the left-hand keys and the type-form corresponding therewith; one of said type-forms being furnished with an alphabet of small letters and an alphabet of capitals and with other necessary characters, all arranged to print at one common printing-point; the two type-forms cooperating to print consecutive letters at adjacent printing-points simultaneously or substantially simultaneously; the whole being arranged in such a manner that the first of the two letters to be printed simultaneously is determined regularly by one particular hand.

27. In a type-writing machine, and in combination, a set of independently-movable keys disposed in a position to be operated by the right hand; another set of independently-movable keys lying to the left of the first mentioned set and disposed in a position to be operated by the left hand; two printing mechanisms, one corresponding to the right hand set of keys and connected therewith, the other corresponding to the left-hand set of keys and connected therewith; the two printing mechanisms mentioned cooperating to print consecutive letters at adjacent printing-points simultaneously or substantially simultaneously; a suitable paper carriage and letter-spacing mechanism therefor whereby a movement of the carriage of a single letter-space is determined on the printing of a single letter and a movement of a larger or double letter-space on the printing of two letters simultaneously; the whole being arranged in such a manner that the first of the two letters to be printed simultaneously is determined regularly by one particular hand, the letter printed at the same time by the other printing mechanism being determined at the same time by the other hand.

28. In a type-writing machine, and in combination, a set of independently-movable keys disposed in a position to be operated by the right hand; another set of independently-movable keys lying to the left of the first mentioned set and disposed in a position to be operated by the left hand; a type-form; suitable type-form-positioning mechanism intermediate said type-form and one of the sets of keys before mentioned, connecting said type-form with said keys; other printing mechanism controlled by the other set of keys before mentioned; a suitable paper carriage and letter-spacing mechanism therefor; the two printing mechanisms before mentioned cooperating to print consecutive letters at adjacent printing-points simultaneously or substantially simultaneously; the whole being arranged in such a manner that the first of the two letters to be printed simultaneously is determined regularly by one particular hand, the letter printed at the same time by the other printing mechanism being determined at the same time by the other hand.

29. In a type-writer or other similar machine, and in combination, a type-form; type-form-controlling keys; movement-combining type-form-positioning mechanism intermediate the keys and the type-form whereby the type-form is moved into different positions for printing different characters as a result of the action of the various keys singly and in divers combinations; another suitable printing mechanism, and other keys suitably connected therewith; the two printing mechanisms mentioned cooperating to print consecutive letters at adjacent printing-points simultaneously or substantially simultaneously.

30. In a type-writer or other similar machine, and in combination, a type-form; a plurality of type-form-controlling keys serving to position the type-form in a particular arc or plane; type-form-positioning mechanism intermediate such keys and the type-form, including means whereby a movement of the type-form in the arc or plane before mentioned for positioning its characters is caused when a plurality of the before mentioned keys are simultaneously depressed, substantially equivalent algebraically to the sum of the movements which each of such keys acting singly would produce, and whereby the type-form when thus moved to the required position is arrested and held from moving on under the influence of its momentum beyond the position required for printing the character positioned until the impression is produced; another suitable printing mechanism and other keys for operating the same; the two printing mechanisms mentioned cooperating to print consecutive letters at adjacent printing-points simultaneously or substantially simultaneously.

31. In a typewriter or other similar instrument, and in combination, a suitable type-form; type-form impelling keys; movement-combining type-form-positioning-mechanism intermediate the keys and the type-form whereby the force communicated by the operator to said keys is employed in oscillating the before-mentioned type-form and whereby said type-form is moved into different positions for printing different characters by the action of the various keys singly and in various combinations; another suitable printing mechanism and other keys suitably connected therewith; the two printing mechanisms mentioned co-operating to print consecutive letters at adjacent printing points simultaneously or substantially simultaneously.

32. In a typewriter or other similar instrument, and in combination, a type-form; type-form impelling keys; direct-acting-self-locking-movement-combining type-form positioning mechanism intermediate the keys and the type-form whereby the force exerted by the operator upon the keys is communicated to the type-form and the type-form moved into different positions for the printing of different characters by the action of the various keys singly and in various combinations, and whereby the type-form is firmly arrested and held from moving on under the influence of its acquired momentum beyond the position required, until the impression is produced; another suitable printing mechanism and other keys for operating the same; the two printing mechanisms mentioned co-operating to print consecutive letters at adjacent printing points simultaneously or substantially simultaneously.

33. In a typewriter or other similar instrument, and in combination, a type-form; keys; movement-combining type-form-positioning mechanism intermediate said keys and the type-form whereby said type-form is moved into different positions for the printing of different characters by the action of the different keys singly and in various combinations; another suitable printing mechanism and other keys suitably connected therewith; the two printing mechanisms mentioned co-operating to print consecutive letters at adjacent printing points simultaneously or substantially simultaneously; a paper-carriage; and variable spacing mechanim therefor whereby a space of one letter is made when but one letter is printed, and a space of two letters made, when the two printing mechanisms mentioned act simultaneously, so that the printed matter is normally spaced.

34. In a typewriting machine, and in combination, a suitable type-form furnished with a complete alphabet of characters including both vowels and consonants; keys; suitable movement combining type-form-positioning mechanism intermediate the keys and the type-form, whereby said type-form is moved into different positions for printing different characters, by or in consequence of the action of the different keys singly and in various combinations; another suitable printing mechanism and other keys therefor; the two printing mechanisms mentioned co-operating to print consecutive letters at adjacent printing points, simultaneously or substantially simultaneously.

35. In a typewriting machine, and in combination, a suitable type-form furnished with a complete alphabet of characters including both vowels and consonants; keys; suitable movement-combining type-form-positioning mechanism intermediate the keys and the type-form, whereby said type-form is moved into different positions for printing different characters, by or in consequence of the action of the different keys singly and in various combinations; another suitable printing mechanism and other keys therefor; the two printing mechanisms mentioned co-operating to print consecutive letters at adjacent printing points, simultaneously or substantially simultaneously; a paper-carriage and suitable letter-spacing mechanism therefor, whereby different points in the same line are successively presented opposite the printing point, and whereby a double space is made when two letters are simultaneously printed.

36. In a typewriting machine, and in combination, a suitable type-form furnished with a complete alphabet of characters including both vowels and consonants; keys; suitable movement-combining type-form-positioning mechanism intermediate the keys and the type-form whereby said type-form is moved into different positions for printing different characters by or in consequence of the action of the different keys singly and in various combinations; another suitable type-form and keys therefor; and suitable movement-combining type-form-positioning mechanism intermediate said second type-form and the keys therefor, whereby said type-form is moved into different positions for printing different characters by or in consequence of the action of the different keys singly and in various combinations; the two type-forms co-operating to print consecutive letters at adjacent printing points simultaneously or substantially simultaneously.

37. In a typewriting machine, and in combination, a suitable type-form furnished with a complete alphabet of characters including both vowels and consonants; keys; suitable movement-combining-type-form-positioning mechanism intermediate the keys and the type-form whereby said type-form is moved into different positions for printing different characters by or in consequence of the action of the different keys singly and in various combinations; another suitable type-form and keys therefor; and suitable movement-combining-type-form-positioning mechanism intermediate said second type-form and the keys therefor, whereby said type-form is moved into different positions for printing different characters by or in consequence of the action of the different keys singly and in various combinations; the two type-forms co-operating to print consecutive letters at adjacent printing points simultaneously or substantially simultaneously; a paper-carriage and suitable letter-spacing mechanism therefor, whereby different points in the same line are successively presented opposite the printing point, and whereby a double space is made when two letters are simultaneously printed.

38. In a typewriter or other similar instrument, and in combination, a type-form movable in opposite directions from a normal point for the positioning of its characters; a plurality of keys; type-form-positioning-mechanism intermediate said keys and the type-form whereby the positioning of the type-form on the one side or the other of its normal position is governed; another suitable printing mechanism and keys controlling the same; the two printing mechanisms mentioned co-operating to print consecutive letters at adjacent printing points simultaneously or substantially simultaneously.

39. In a typewriter or other similar instrument, and in combination, a type-form movable in opposite directions from a normal point for the positioning of its characters; a plurality of keys and movement-combining-type-form-positioning mechanism intermediate said keys and the type-form whereby the positioning of the type-form on the one side or the other of its normal position is governed; another suitable printing mechanism and keys controlling the same; the two printing mechanisms mentioned co-operating to print consecutive letters at adjacent printing points simultaneously or substantially simultaneously.

40. In a typewriter or other similar instrument, and in combination, a type-form having its characters arranged in a plurality of rows, said type-form being made movable in two different arcs or planes for the positioning of the various characters; a plurality of keys and suitable connecting mechanism serving to position the type-form in one of the arcs or planes mentioned; one or more other keys suitably connected with the type-form and serving to position it in the other of the arcs or planes mentioned; another suitable printing mechanism and operating keys connected therewith, the two printing mechanisms mentioned co-operating to print consecutive letters at adjacent printing points simultaneously or substantially simultaneously.

41. In a typewriter or other similar instrument, and in combination, a type-form having its characters arranged in a plurality of rows, said type-form being made movable in two different arcs or planes for the positioning of the various characters; a plurality of keys and suitable connecting mechanism serving to position the type-form in one of the arcs or planes mentioned; one or more other keys suitably connected with the type-form and serving to position it in the other of the arcs or planes mentioned; the key or keys last mentioned being placed in such juxtaposition to the other keys before-mentioned, and the whole being arranged in such a manner that the hand can act with one impulse upon one or more keys serving to position the type-form in one arc or plane and upon one or more keys serving to position the type-form in another arc or plane; another suitable printing mechanism and operating keys connected therewith, the two printing mechanisms mentioned co-operating to print consecutive letters at adjacent printing points simultaneously or substantially simultaneously.

42. In a typewriter or other similar instrument, and in combination, a type-form having a plurality of type-bearing sections connected and arranged in such a manner that they move together for the positioning of the characters, and each mounted in such a manner that it is movable to and from the printing point independently of the others; a plurality of keys and suitable connecting mechanism whereby the different type-bearing sections are brought opposite to the printing point, each as required; one or more other keys, whereby the type-bearing sections are positioned in such a manner that the required character on the particular type-bearing section brought opposite the printing point is itself brought opposite the printing point; suitable impression mechanism whereby the printing is effected from the type-bearing section brought into position opposite the printing point; another suitable printing mechanism and operating keys connected therewith, the two printing mechanisms mentioned, co-operating to print consecutive letters at adjacent printing points simultaneously or substantially simultaneously.

43. In a typewriter or other similar instrument, and in combination, a type-form having a plurality of type-bearing sections connected and arranged in such a manner that they move together for the positioning of the characters, and each mounted in such a manner that it is movable to and from the printing point independently of the other; a plurality of keys and suitable connecting mechanism whereby the different type-bearing sections are brought opposite to the printing point, each as required; one or more other keys, whereby the type-bearing sections are positioned in such a manner that the required character on the particular type-bearing section brought opposite the printing point is itself brought opposite the printing point; the key or keys last mentioned being placed in such juxtaposition to the other keys before-mentioned and the whole being arranged in such a manner that the hand can act with one impulse upon one or more of the keys serving to determine the type-bearing section from which the printing is to take place and upon one or more of the keys serving to determine which of the characters on such type-bearing sections shall be printed; suitable impression mechanism whereby the printing is effected from the type-bearing section brought into position opposite the printing point; another suitable printing mechanism and operating keys connected therewith, the two printing mechanisms mentioned co-operating to print consecutive letters at adjacent printing points simultaneously or substantially simultaneously.

44. In a typewriter or other similar instrument, and in combination, a type-form having its characters arranged in a plurality of rows said type-form being made movable in two different arcs or planes for the positioning of its various characters; a plurality of keys and suitable movement-combining-type-form-positioning mechanism intermediate said keys and the type-form, whereby the type-form is moved into different positions by the depressing of the various keys before-mentioned singly and in divers combinations; one or more other keys suitably connected with the type-form and serving to position it in the other of the arcs or planes before-mentioned; another suitable printing mechanism and operating keys connected therewith: the two printing mechanisms mentioned co-operating to print consecutive letters at adjacent printing points simultaneously or substantially simultaneously.

45. In a typewriter or other similar instrument, and in combination, a type-form having its characters arranged in a plurality of rows, said type-form being made movable in two different arcs or planes for the positioning of its various characters; a plurality of keys and suitable movement-combining-type-form-positioning mechanism intermediate said keys and the type-form, whereby the type-form is moved into different positions by the depressing of the various keys before mentioned singly and in divers combinations; one or more other keys suitably connected with the type-form and serving to position it in the other of the arcs or planes before-mentioned, the key or keys last-mentioned being placed in such juxtaposition to the other keys before-mentioned and the whole being arranged in such a manner that the hand can act with one impulse upon one or more keys serving to position the type-form in one arc or plane and upon one or more other keys serving to position the type-form in the other of the arcs or planes mentioned; another suitable printing mechanism and operating keys connected therewith; the two printing mechanisms mentioned co-operating to print consecutive letters at adjacent printing points simultaneously or substantially simultaneously.

46. In a typewriter or other similar instrument, and in combination, a type-form having type-bearing sections connected in such a manner that they move together for the positioning of the characters and each mounted in such a manner that it is movable to and from the printing point, for printing, independently of the other; a plurality of keys, and suitable movement-combining-type-form-positioning mechanism intermediate said keys and the type-form, whereby different type-bearing sections are brought opposite the printing point by the depression of the various keys singly and in divers combinations; one or more other keys whereby the type-bearing sections are positioned in such a manner that the required character on the particular type-bearing section brought opposite to the printing point is itself brought opposite the printing point; suitable impression mechanism whereby the printing is effected from the type-bearing section brought into position opposite the printing point; another suitable printing mechanism and operating keys connected therewith; the two printing mechanisms mentioned co-operating to print consecutive letters at adjacent printing points simultanueosly or substantially simultaneously.

47. In a typewriter or other similar instrument, and in combination, a type-form having type-bearing sections connected in such a manner that they move together for the positioning of the characters and each mounted in such a manner that it is movable to and from the printing point, for printing, independently of the others; a plurality of keys, and suitable movement-combining-type-form-positioning mechanism intermediate said keys and the type-form, whereby different type-bearing sections are brought opposite the printing point by the depression of the various keys singly and in divers combinations; one or more other keys whereby the type-bearing sections are positioned in such a manner that the required character on the particular type-bearing section brought opposite to the printing point is itself brought opposite the printing point; the key or keys last mentioned being placed in such juxtaposition to the other keys before-mentioned and the whole being arranged in such a manner that the hand can act with one impulse upon one of the keys serving to determine the type-bearing section from which the printing is to take place and upon one or more of the keys serving to determine the character to be printed from such type-bearing section; suitable impression mechanism whereby the printing is effected from the type-bearing section brought into position opposite the printing point; another suitable printing mechanism and operating keys connected therewith; the two printing mechanisms mentioned co-operating to print consecutive letters at adjacent printing points simultaneously or substantially simultaneously.

In testimony whereof I have hereunto set my hand, at Washington, in the District of Columbia, this 30th day of July, A. D. 1894, in the presence of the witnesses whose names are hereto annexed.

THADDEUS CAHILL.

Attest:
ARTHUR T. CAHILL,
M. H. CAHILL.